(12) United States Patent
Booth et al.

(10) Patent No.: US 8,351,584 B2
(45) Date of Patent: Jan. 8, 2013

(54) LEAST COST CALL ROUTING

(75) Inventors: Scott A. Booth, Flower Mound, TX (US); Curtis E. Allen, Colorado Springs, CO (US); Courtney Cepak, Lewisville, TX (US); Daniel Emile Du Toit, Dallas, TX (US); Melinda Brooke Vanderoef, Monument, CO (US); Peter Shotwell, Plano, TX (US); Lulia Barakat, McKinney, TX (US); Bob Artman, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 12/971,524

(22) Filed: Dec. 17, 2010

(65) Prior Publication Data

US 2012/0155628 A1 Jun. 21, 2012

(51) Int. Cl.
*H04M 15/00* (2006.01)
(52) U.S. Cl. ......... 379/114.02; 379/201.01; 379/221.05; 379/272; 379/273
(58) Field of Classification Search ............. 379/114.02, 379/201.01, 221.05, 272, 273
See application file for complete search history.

(56) References Cited

U.S. PATENT DOCUMENTS

2008/0125958 A1* 5/2008 Boss et al. ............. 701/123
2009/0252039 A1* 10/2009 Valdez et al. ............ 370/238

OTHER PUBLICATIONS

Co-pending U.S. Appl. No. 12/395,073 entitled "Jurisdictionally Optimized Call Routing" by John G. Willman, filed Feb. 27, 2009, 84 pages.

* cited by examiner

*Primary Examiner* — Quynh Nguyen

(57) ABSTRACT

A device receives network information, least cost route (LCR) forecast information, network administrator inputs, and looping exceptions, and receives a call, from an originating location, to a terminating location. The device determines a LCR for the call based on the network information, the LCR forecast information, the network administrator inputs, and the looping exceptions. The device generates routing instructions for the determined LCR, and provides the routing instructions to one or more network elements associated with the determined LCR. The call is routed to the terminating location, via the one or more network elements associated with the determined LCR, and based on the routing instructions.

13 Claims, 49 Drawing Sheets

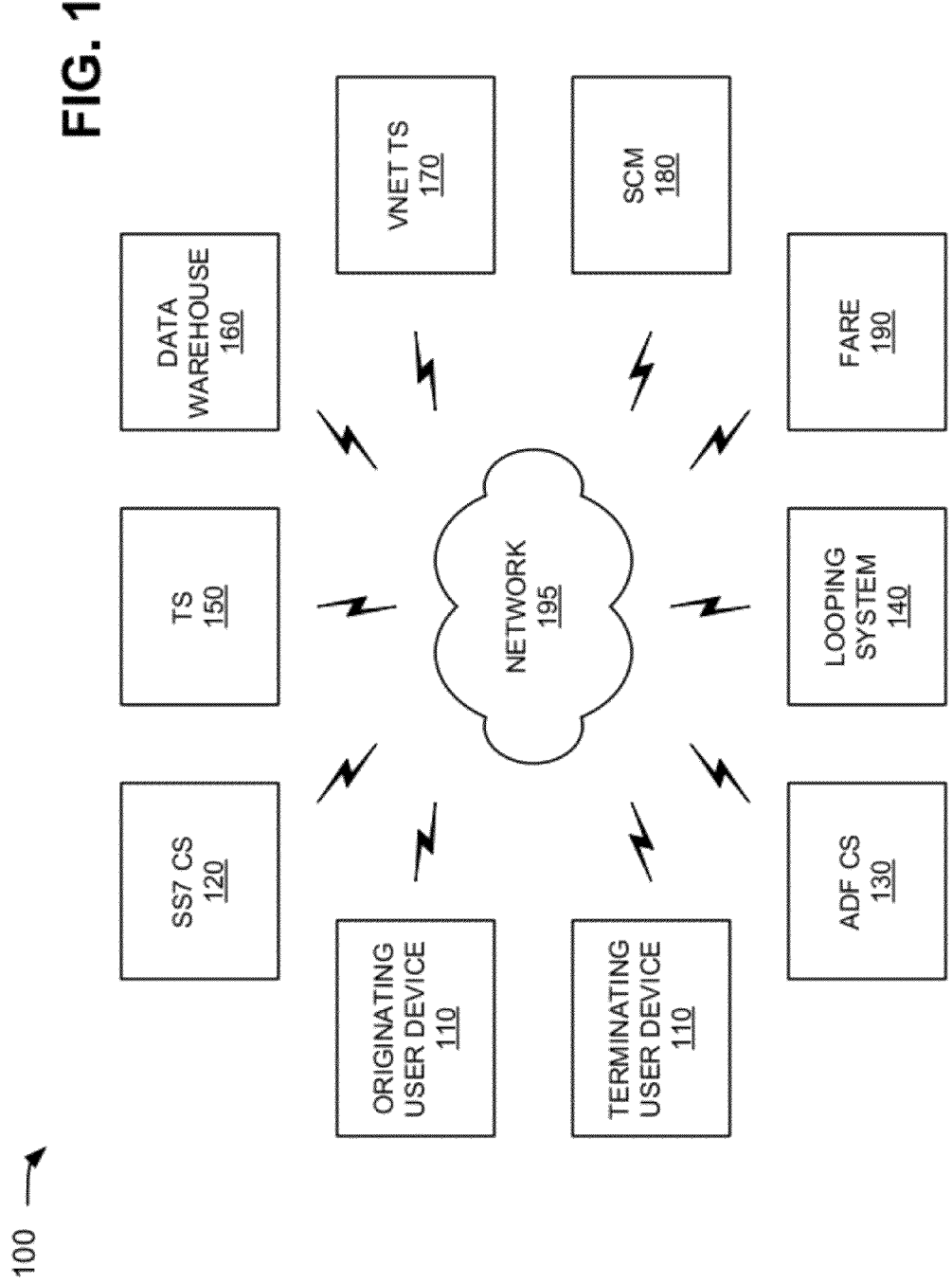

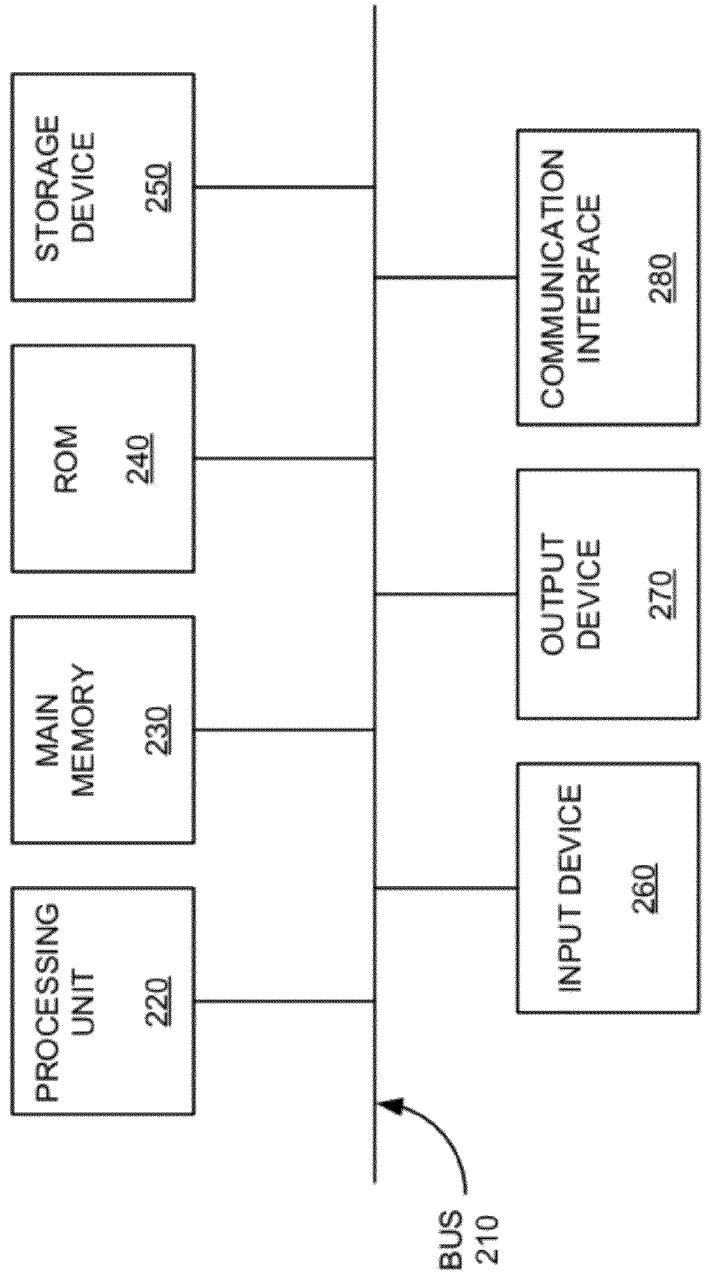

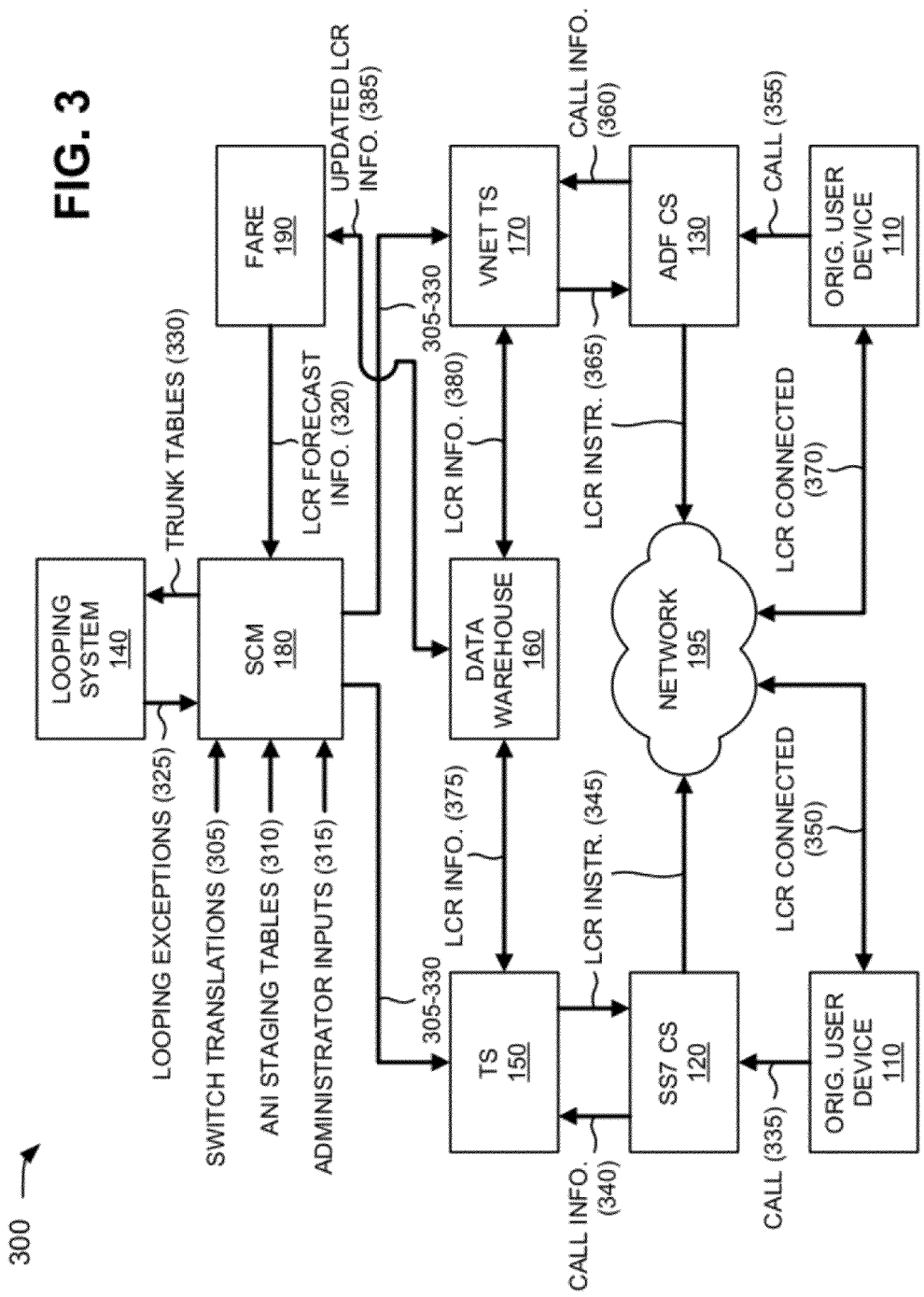

FIG. 4

| Carrier | First Definition | Second Definition | Third Definition | Last Definition |
|---|---|---|---|---|
| Carrier1 | Charge Number | Calling Party Number | None | Unmarked, location of ingress POP |
| Carrier2 | Charge Number | Calling Party Number | None | Unmarked, location of ingress POP |
| Carrier3 | JIP if mobile originated call | ANI | Calling Party Number | Unmarked, PIU method |
| Carrier4 | Calling Party Number | None | None | Unmarked, PIU method |
| On-Net1 | JIP if mobile originated call | ANI | None | Unmarked, PIU method |
| On-Net2 | ANI | None | None | Unmarked, PIU method |

FIG. 6

| Jurisdictional Index | Carrier1 | Carrier2 | Carrier3 | Carrier4 | On-Net1 | On-Net2 |
|---|---|---|---|---|---|---|
| 1 | 0 | 0 | 0 | 0 | 0 | 0 |
| 2 | 0 | 0 | 1 | 0 | 0 | 1 |
| 3 | 0 | 1 | 0 | 0 | 1 | 2 |
| 4 | 0 | 1 | 1 | 1 | 1 | 0 |
| 5 | 1 | 0 | 0 | 1 | 0 | 1 |
| ... | ... | ... | ... | ... | ... | ... |
| 32 | 1 | 1 | 1 | 1 | 1 | 1 |
| ... | ... | ... | ... | ... | ... | ... |
| N-1 | 1 | 1 | 0 | 2 | 1 | 1 |
| N | 1 | 1 | 1 | 2 | 1 | 2 |

FIG. 7

| EO-CLLI | OCN | EO-OCN Enable | Juri Index | Rate Type | Rate Type Code | Rate |
|---|---|---|---|---|---|---|
| ABCD1234 | 7076 | 1 | 1 | Intrastate | 0 | 0.175000 |
| ABCD1234 | 7076 | 1 | 2 | Intrastate | 0 | 0.175000 |
| ABCD1234 | 7076 | 1 | ... | | | |
| ABCD1234 | 7076 | 1 | 32 | Interstate | 1 | 0.004200 |
| ABCD1234 | 7076 | 1 | ... | | | |
| ABCD1234 | 7076 | 1 | N-1 | Unmarked | 2 | 0.134400 |
| ABCD1234 | 7076 | 1 | N | Unmarked | 2 | 0.134400 |
| BCDE4567 | 1357 | 1 | 1 | Intrastate | 0 | 0.251500 |
| BCDE4567 | 1357 | 1 | 2 | Intrastate | 0 | 0.251500 |
| BCDE4567 | 1357 | 1 | ... | | | |
| BCDE4567 | 1357 | 1 | 32 | Interstate | 1 | 0.006750 |
| BCDE4567 | 1357 | 1 | ... | | | |
| BCDE4567 | 1357 | 1 | N-1 | Unmarked | 2 | 0.206600 |
| BCDE4567 | 1357 | 1 | N | Unmarked | 2 | 0.206600 |

FIG. 8

| EO-CLLI | OCN | Juri Index | Route Choice | Switch ID | Carrier |
|---|---|---|---|---|---|
| ABCD1234 | 7076 | 2 | 1 | 123 | Carrier2 |
| ABCD1234 | 7076 | 2 | 2 | 123 | Carrier4 |
| ABCD1234 | 7076 | 2 | 3 | 123 | Carrier3 |
| ABCD1234 | 7076 | 2 | 4 | 123 | Carrier1 |
| ABCD1234 | 7076 | 2 | 5 | 123 | On-Net1 |

FIG. 15
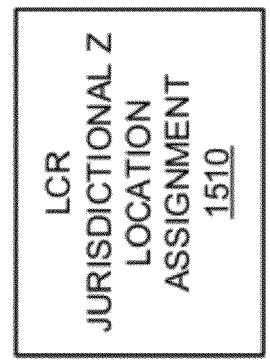
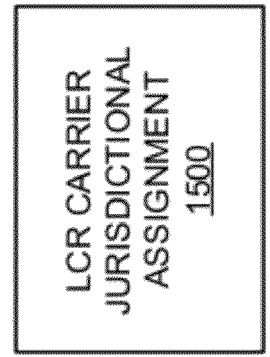

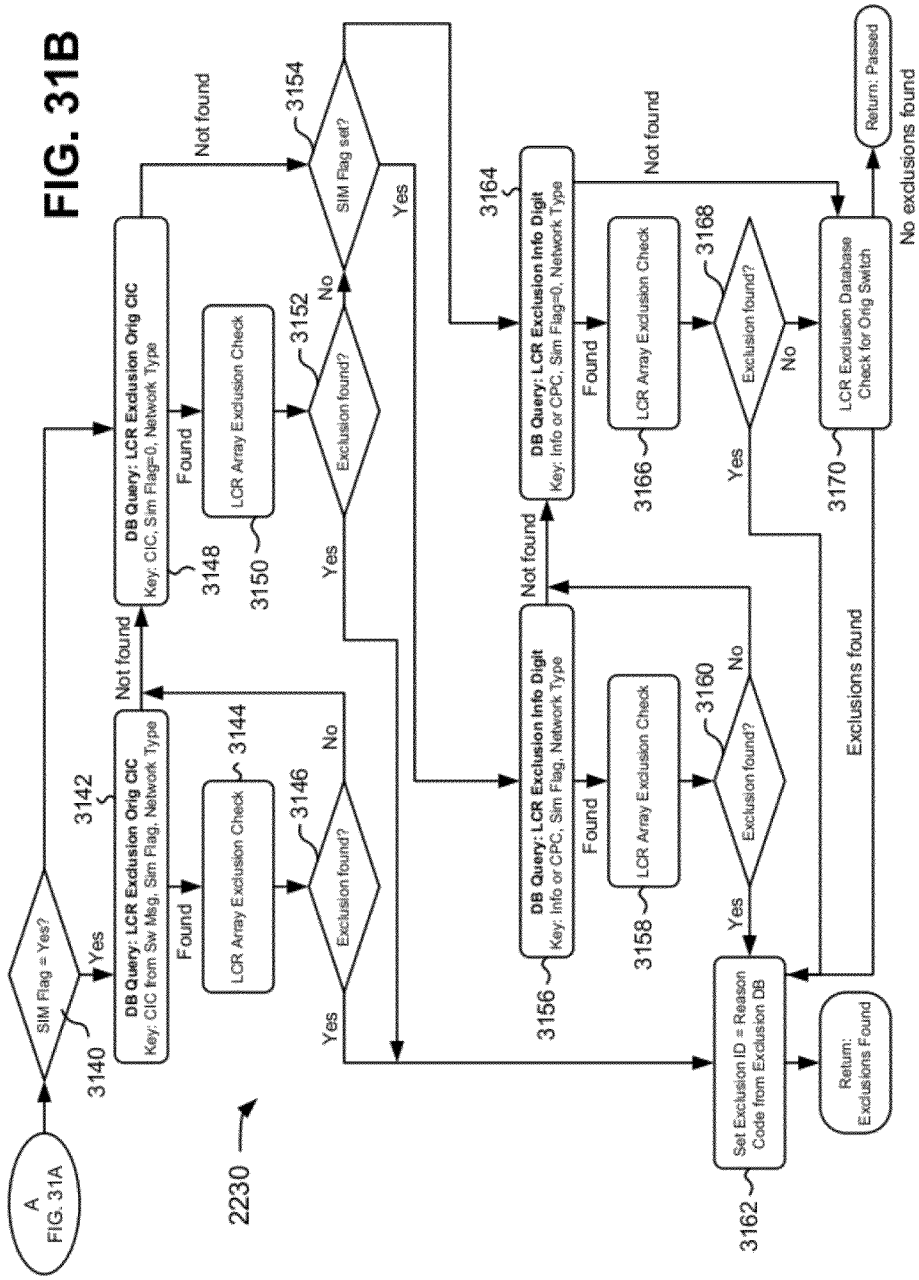

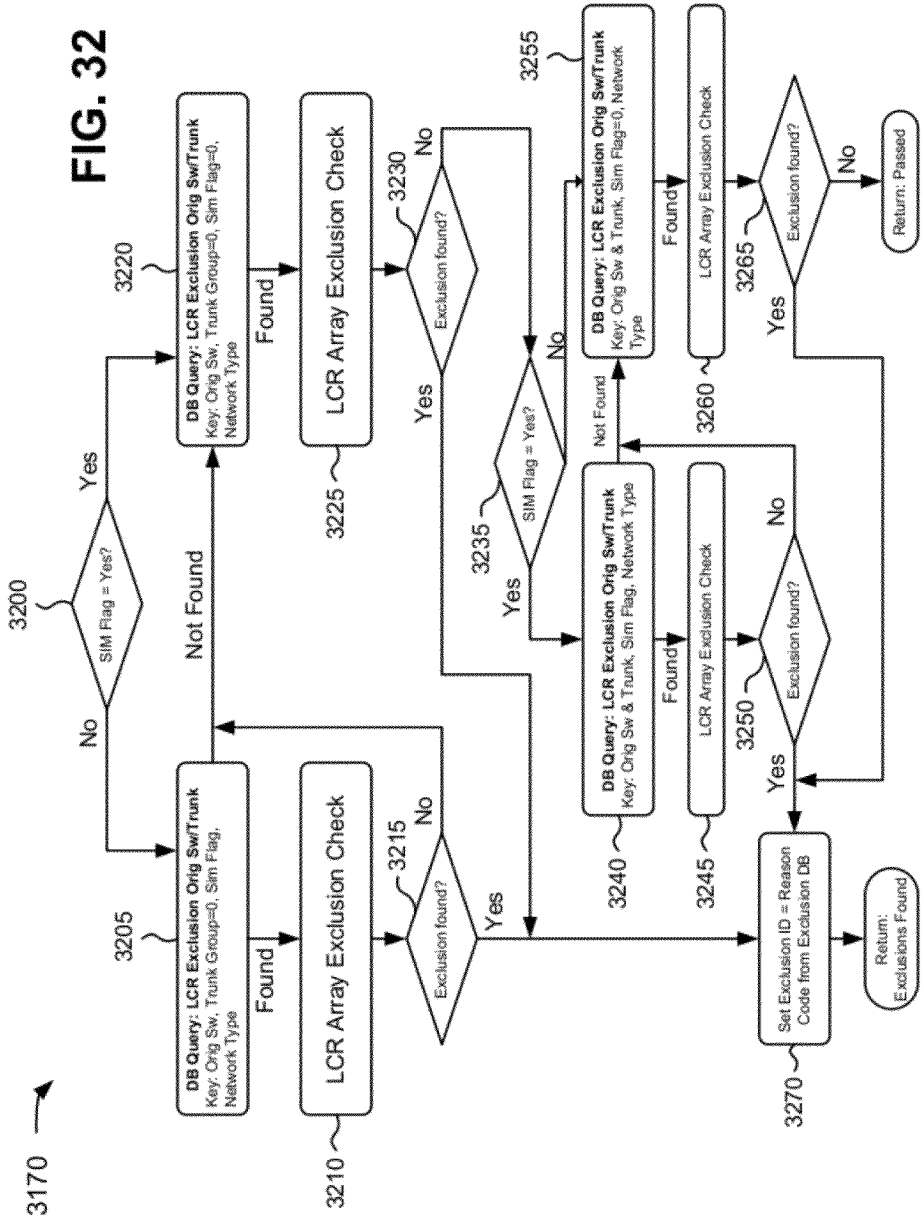

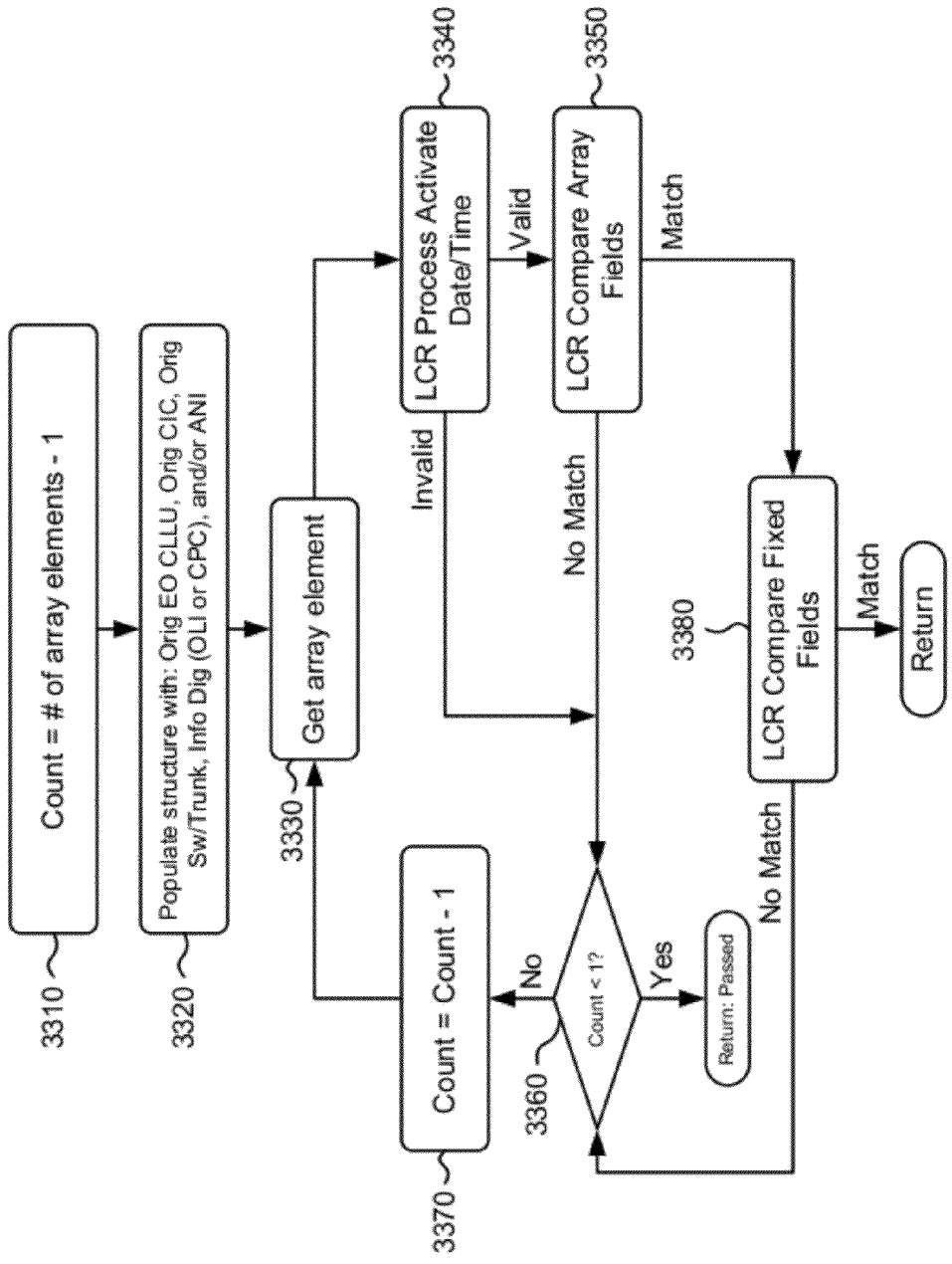

LEAST COST CALL ROUTING

BACKGROUND

Some telecommunications systems (e.g., the public switched telephone network (PSTN) use Signaling System 7 (SS7) standards for communication of telephone calls. SS7 is a digital communications protocol that supports various messaging and call information features that facilitate a variety of telephone services. SS7 facilitates advanced intelligent network (AIN) call processing, such as call handling instructions obtained by a switch from a service control point (SCP). The SCP may include logic (e.g., call processing records) used to provide a switch with specific call processing instructions based on information obtained from a database and/or call information provided by the switch or another source.

Different carriers may own and/or manage different portions of a telecommunications network (e.g., different switches, trunks, etc.). When a particular carrier receives a call to a terminating location (e.g., a destination), the particular carrier determines a route through the telecommunications network to the terminating location. The route may traverse portions of the telecommunications network that are owned by other carriers, and the other carriers may charge a fee, to the particular carrier, for use of their portions of the telecommunications network. For example, based on certain definitions of the originating and terminating locations of the call, the other carriers may determine a jurisdiction for the call (e.g., that the call is an intrastate call or an interstate call) and may charge a fee based on the determined jurisdiction. However, the other carriers may use different criteria to determine jurisdictions for calls. Furthermore, the other carriers may charge different fees for intrastate calls and interstate calls (e.g., the fees for intrastate calls may be more expensive than the fees for interstate calls).

BRIEF DESCRIPTION OF THE DRAWINGS

FIG. 1 is a diagram of an example network in which systems and/or methods described herein may be implemented;

FIG. 2 is a diagram of example components of one or more of the devices depicted in FIG. 1;

FIG. 3 is a diagram of example interactions among components of the network illustrated in FIG. 1;

FIG. 4 is a diagram of an example portion of a carrier call origination definition table;

FIG. 6 is a diagram of an example portion of a jurisdictional index table capable of being generated and/or maintained by the FARE depicted in FIG. 5;

FIG. 7 is a diagram of an example portion of carrier rate tables capable of being generated and/or maintained by the FARE illustrated in FIG. 5;

FIG. 8 is a diagram of an example portion of a jurisdictional index table capable of being generated and/or maintained by the FARE depicted in FIG. 5;

FIG. 15 is a diagram of example functional components of a LCR jurisdictional assignment component shown in FIG. 14;

FIGS. 18-48 are flow charts of an example process for providing least cost call routing according to implementations described herein.

DETAILED DESCRIPTION OF PREFERRED EMBODIMENTS

Figure 5:
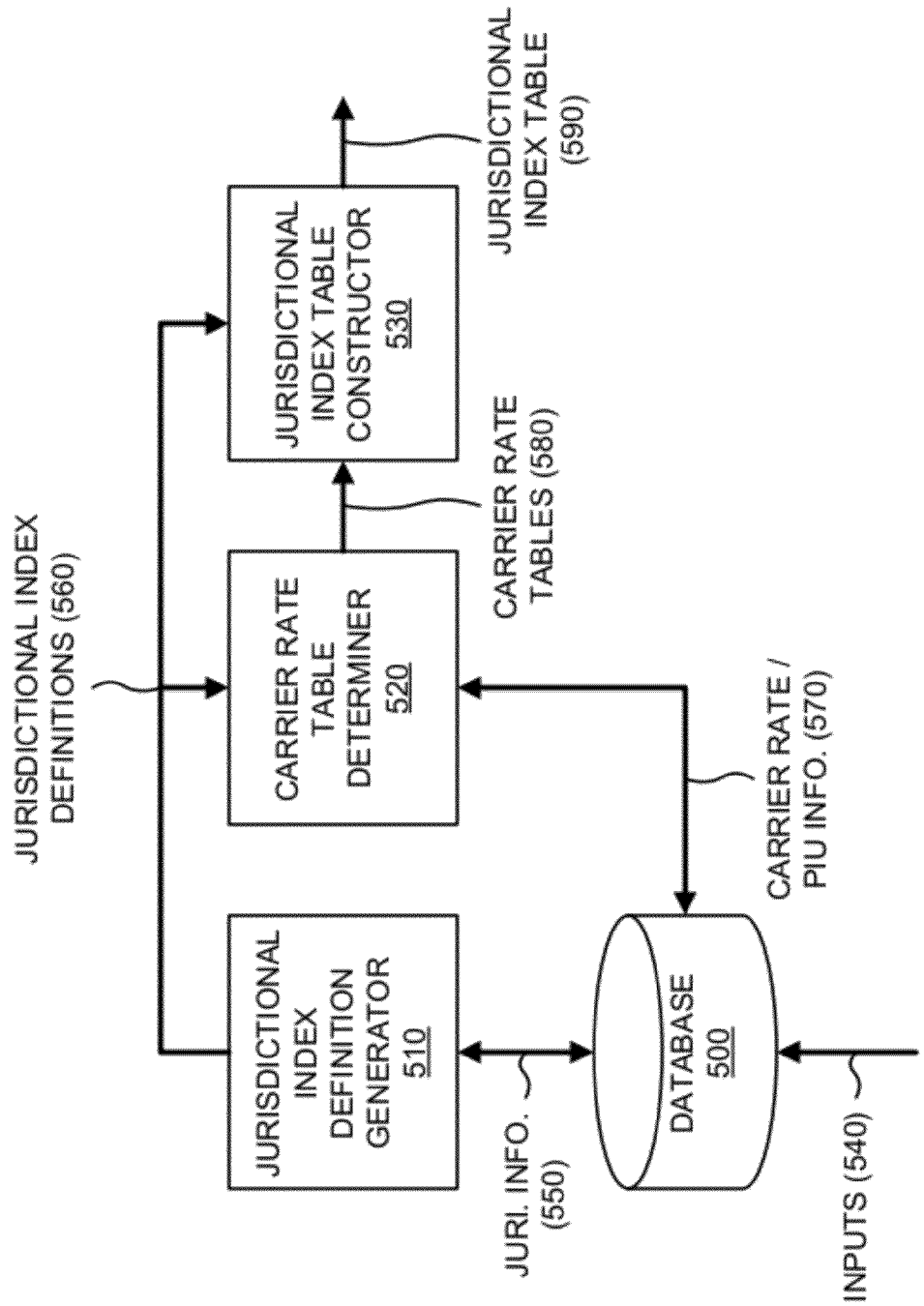
FIG. 5 is a diagram of example functional components of a financial analysis and reporting engine (FARE) depicted in FIG. 1.

The following detailed description refers to the accompanying drawings. The same reference numbers in different drawings may identify the same or similar elements. Also, the following detailed description does not limit the invention.

Systems and/or methods described herein may provide jurisdictionally optimized least cost call routing. For example, in one implementation, the systems and/or methods may receive network information, LCR forecast information (e.g., jurisdictional indices or matrices), network administrator inputs, and looping exceptions. The systems and/or methods may receive a call, from an originating location, to a terminating location, and may determine a LCR for the call based on one or more of the network information, the LCR forecast information, the network administrator inputs, and the looping exceptions. The systems and/or methods may generate routing instructions for the determined LCR, and may provide the routing instructions to network elements associated with the LCR. The systems and/or methods may route the call to the terminating location via the LCR and based on the routing instructions.

As used herein, the terms "caller," "calling party," and/or "user" may be used interchangeably. Also, the terms "caller," "calling party," and/or "user" are intended to be broadly interpreted to include a user device or a user of a user device.

As used herein the term "carrier" is intended to broadly interpreted to include an entity that owns, manages, and/or operates one or more portions of a telecommunications network, routes calls through the telecommunications network, and/or charges fees for use of the one or portions of the telecommunications network that they own, manage, and/or operate.

FIG. 1 is a diagram of an example network 100 in which systems and/or methods described herein may be implemented. As illustrated, network 100 may include an originating user device 110, a terminating user device 110, a SS7 communication server (CS) 120, an application data format (ADF) communication server (CS) 130, a looping system 140, a transaction server (TS) 150, a data warehouse 160, a virtual network (VNET) transaction server (TS) 170, a service control manager (SCM) 180, and a financial analysis and reporting engine (FARE) interconnected by a network 195. Components of network 100 may interconnect via wired and/or or wireless connections.

A single originating user device 110, terminating user device 110, SS7 CS 120, ADF CS 130, looping system 140, TS 150, data warehouse 160, VNET TS 170, SCM 180, FARE 190, and network 195 have been illustrated in FIG. 1 for simplicity. In practice, there may be more originating user devices 110, terminating user devices 110, SS7 CSs 120, ADF CSs 130, looping systems 140, TSs 150, data warehouses 160, VNET TSs 170, SCMs 180, FAREs 190, and/or networks 195. Also, in some instances, one or more of the components of network 100 may perform one or more tasks described as being performed by another one or more of the components of network 100.

Each of user devices 110 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, or other types of computation or communication devices. In one implementation, originating user device 110 may include a PSTN-based calling device that is capable of initiating a call to terminating user device 110.

SS7 CS 120 may include one or more servers, or other types of computation or communication devices, that gather, process, search, and/or provide information in a manner described herein. In one implementation, SS7 CS 120 may include a server (e.g., a computer system) capable of receiving an originating call (e.g., from originating user device 110), extracting call information from the originating call, and providing the call information to TS 150. SS7 CS 120 may receive routing instructions for the call from TS 150, and may provide the routing instructions to network 195 (e.g., to network elements, such as switches) for completion of the call to terminating user device 110. In one example, SS7 CS 120 may be associated with a SS7-based network portion (e.g., of network 195).

ADF CS 130 may include one or more servers, or other types of computation or communication devices, that gather, process, search, and/or provide information in a manner described herein. In one implementation, ADF CS 130 may include a server (e.g., a computer system) capable receiving an originating call (e.g., from originating user device 110), extracting call information from the originating call, and providing the call information to VNET TS 170. ADF CS 130 may receive routing instructions for the call from VNET TS 170, and may provide the routing instructions to network 195 (e.g., to network elements, such as switches) for completion of the call to terminating user device 110. In one example, ADF CS 130 may be associated with an ADF-based network portion (e.g., of network 195). In another example, ADF CS 130 (or SS7 CS 120) may handle call originations from the International Switch (e.g., C7-based networks) using a CS-1 switch protocol. If the call originates internationally but terminates to a domestic long distance Public Switched Telephone Network (PSTN), least cost routing may performed for such a call.

Looping system 140 may include one or more servers, or other types of computation or communication devices, that gather, process, search, and/or provide information in a manner described herein. In one implementation, looping system 140 may include a server (e.g., a computer system) capable of excluding routes for calls (e.g., routed by TS 150 or VNET TS 170) based on a variety of factors. For example, looping system 140 may determine that a call (e.g., received by TS 150 or VNET TS 170) is to be excluded from least cost routing, from routing that creates a "looping" condition (e.g., a condition that occurs when a call continuously cycles between switches or networks and does not successfully reach its destination typically due to routing errors or lack of coordination between switches or networks), etc. Looping system 140 may provide the determined route exclusions to TS 150 or VNET TS 170 (e.g., via SCM 180), and TS 150 or VNET TS 170 may exclude the specified routes when determining a route for a call.

TS 150 may include one or more servers, or other types of computation or communication devices, that gather, process, search, and/or provide information in a manner described herein. In one implementation, TS 150 may include a server (e.g., a computer system) capable of optimally routing calls in a least expensive manner (i.e., determining a least cost route (LCR) for calls). In one example, TS 150 may correspond to a Private Routing (or NXX) transaction server, Toll Free/Local Number Portability (LNP) transaction server, etc. Thus, TS 150 may handle requests for NXX or Private Routing and requests for LNP routing.

In one example implementation, TS 150 may receive network information (e.g., switch translations, automatic number identification (ANI) staging tables, etc.); network administrator inputs (e.g., defining specific call routing instructions, blocked routes, carrier information, etc.); looping exceptions (e.g., generated by looping system 140); LCR forecast information (e.g., generated by FARE 190, such as jurisdictional identifiers, jurisdictional indices, etc.); etc. TS 150 may receive, from originating user device 110 (e.g., via SS7 CS 120), a call to terminating user device 110, and may determine a LCR for the call based on one or more of the network information, the LCR forecast information, the network administrator inputs, and the looping exceptions. TS 150 may generate routing instructions for the determined LCR, and may provide the routing instructions to SS7 CS 120. SS7 CS 120 may provide the routing instructions to network elements (e.g., provided in network 195) associated with the LCR. The network elements may route the call to terminating user device 110 via the determined LCR and based on the routing instructions. Further details of TS 150 are provided below in connection with, for example, FIGS. 9-17.

Data warehouse 160 may include one or more server devices, or other types of computation or communication devices, that gather, process, search, and/or provide information in a manner described herein. In one example implementation, data warehouse 160 may include one or more databases of information that may be used for storing information (e.g., LCR information) received by TS 150 and/or VNET TS 170. For example, data warehouse 160 may store LCR forecast information generated by FARE 190, information associated with call routing, information associated with jurisdictionally-based call routing, etc. Data warehouse 160 may also provide (e.g., via an intelligent reporting platform) information (e.g., updated LCR information), received by TS 150 and/or VNET TS 170, to FARE 190. Although FIG. 1 shows data warehouse 160 as separate from TS 150 and VNET TS 170, in other implementations, data warehouse 160 may be incorporated in TS 150 and/or VNET TS 170.

VNET TS 170 may include one or more servers, or other types of computation or communication devices, that gather, process, search, and/or provide information in a manner described herein. In one implementation, VNET TS 170 may include a server (e.g., a computer system) capable of optimally routing calls in a least expensive manner (i.e., determining a LCR for calls). VNET TS 170 may receive network information; network administrator inputs; looping exceptions; LCR forecast information; etc. VNET TS 170 may receive, from originating user device 110 (e.g., via ADF CS 130), a call to terminating user device 110, and may determine a LCR for the call based on one or more of the network information, the LCR forecast information, the network administrator inputs, and the looping exceptions. VNET TS 170 may generate routing instructions for the determined LCR, and may provide the routing instructions to ADF CS 130. ADF CS 130 may provide the routing instructions to network elements (e.g., provided in network 195) associated with the LCR. The network elements may route the call to terminating user device 110 via the determined LCR and based on the routing instructions. Further details of VNET TS 170 are provided below in connection with, for example, FIGS. 9-17.

SCM 180 may include one or more servers, or other types of computation or communication devices, that gather, process, search, and/or provide information in a manner described herein. In one implementation, SCM 180 may include a server (e.g., a data distribution system) capable of providing an interface from frontend systems (e.g., SS7 CS 120, ADF CS 130, TS 150, VNET TS 170, etc.) to backend systems (e.g., FARE 190, order entry systems, accounting systems, etc.). In one example SCM 180 may receive network information (e.g., switch translations, automatic number identification (ANI) staging tables, etc.); network administrator inputs (e.g., defining specific call routing instructions, blocked routes, carrier information, etc.); looping exceptions (e.g., generated by looping system 140); LCR forecast information (e.g., generated by FARE 190, such as jurisdictional identifiers, jurisdictional indices, etc.); etc. SCM 180 may provide this received information to TS 150 and/or VNET TS 170.

FARE 190 may include one or more servers, or other types of computation or communication devices, that gather, process, search, and/or provide information in a manner described herein. In one implementation, FARE 190 may include a server (e.g., a computer system) capable of generating and/or maintaining ordered call routing lists that are ordered based on jurisdictional information (e.g., whether a call is an intrastate call, an interstate call, an unmarked call, etc.). FARE 190 may generate a jurisdictional index definition table (e.g., described below in connection with FIG. 6) for carriers associated with a network (e.g., carriers owning and/or managing equipment in network 100) based on criteria used by the carriers to determine jurisdictions for calls. FARE 190 may generate a carrier rate table (e.g., described below in connection with FIG. 7) for each carrier based on end office common language location identifier (EO-CLLI) codes or other definitions of destination, jurisdiction, and/or rates charged by the carriers. FARE 190 may look up rates in the carrier rate tables, may sort carriers based on the rates, and may construct the ordered call routing lists based on the sorted carriers and jurisdictional index. FARE 190 may provide the ordered call routing lists to SCM 180 for distribution to TS 150 and VNET TS 170. Further details of FARE 190 are provided below in connection with, for example, FIG. 5.

Network 195 may include a Public Land Mobile Network (PLMN), a telephone network, such as the PSTN or a cellular telephone network (e.g., wireless global system for mobile communications (GSM), wireless code division multiple access (CDMA), etc.), a local area network (LAN), a wide area network (WAN), a metropolitan area network (MAN), an intranet, the Internet, an IP-based network, a VoIP-based network, or a combination of networks. In one implementation, network 195 may be owned and/or managed by the same entity that owns and/or manages TS 150 and/or VNET TS 170. In another implementation, network 195 may be owned and/or managed by one or more carriers (e.g., entities that are different from the entity that owns and/or manages TS 150 and/or VNET TS 170).

Network 195 may include a variety of network elements (or devices). For example, the network elements may include one or more data transfer devices, such as gateways, routers, switches, firewalls, network interface cards (NICs), hubs, bridges, proxy servers, optical add-drop multiplexers (OADMs), line access multiplexers (LAMs), permanent or private virtual circuits (PVCs), links (e.g., trunks) provided between any of the aforementioned devices, or some other types of devices that process and/or transfer data. In one implementation, the network elements may be capable of establishing an end-to-end path between components of network 100 (e.g., between originating user device 110 and terminating user device 110). In one example, one or more of the network elements may be owned and/or managed by one or more different carriers.

Although FIG. 1 shows example components of network 100, in other implementations, network 100 may contain fewer components, different components, differently arranged components, or additional components than depicted in FIG. 1.

FIG. 2 is an example diagram of a device 200 that may correspond to one or more of the devices of network 100. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, application specific integrated circuits (ASICs), field programmable gate arrays (FPGAs), or other types of processing devices that may interpret and execute instructions. Main memory 230 may include one or more random access memories (RAMs) or another type of dynamic storage device that may store information and instructions for execution by processing unit 220. ROM 240 may include one or more ROM devices or another type of static storage device that may store static information and/or instructions for use by processing unit 220. Storage device 250 may include one or more magnetic and/or optical recording media and their corresponding drives.

Input device 260 may include one or more mechanisms that permit an operator to input information to device 200, such as a keyboard, a mouse, a pen, a microphone, voice recognition and/or biometric mechanisms, etc. Output device 270 may include one or more mechanisms that output information to the operator, including a display, a printer, a speaker, etc. Communication interface 280 may include any transceiver-like mechanisms that enable device 200 to communicate with other devices and/or systems. For example, communication interface 280 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example interactions 300 among components of network 100. As shown in FIG. 3, SCM 180 may receive network information (e.g., associated with network 195), such as switch translations 305, ANI staging tables 310, etc. Switch translations 305 may include interconnections associated with switches (or other network devices) provided in network 195, types of links (e.g., trunks) between switches, etc. ANI staging tables 310 may include tables that associate billing telephone numbers with calling parties. As further shown in FIG. 3, SCM 180 may receive network administrator inputs 315, such as inputs defining specific call routing instructions, blocked routes, carrier information, etc. SCM 180 may also receive LCR forecast information 320 from FARE 190. LCR forecast information 320 may include forecasts of LCRs for different simulated calling scenarios, jurisdictional identifiers, jurisdictional indices, etc. In one example, FARE 190 may execute a LCR determination process (e.g., which may also be performed by TS 150 and VNET TS 170 in real time) for simulated calling scenarios in order to generate LCR information 320.

As further shown in FIG. 3, SCM 180 may receive looping exceptions 325 from looping system 140, and may provide trunk tables 330 to looping system 140. Looping exceptions 325 may include exclusions for call routings that create a "looping" condition (e.g., a condition that occurs when a call continuously cycles between switches or networks and does not successfully reach its destination typically due to routing errors or lack of coordination between switches or networks). Trunk tables 330 may include information associated with links (e.g., trunks or trunk lines) provided in network 195. SCM 180 may provide one or more of switch translations 305, ANI staging tables 310, administrator inputs 315, LCR forecast information 320, looping exceptions 325, and trunk tables 330 to TS 150 and/or VNET TS 170. TS 150 and/or VNET TS 170 may receive the provided information, and may store the information internally (e.g., in storage device 250) or externally (e.g., in data warehouse 160).

If a calling party (e.g., associated with a SS7 network) places a call 335 (e.g., via originating user device 110) to a called party (e.g., associated with terminating user device 110), SS7 CS 120 may receive call 335, and may provide call information 340 to TS 150. Call information 340 may include information associated with (but not limited to) call 335, such as a called party number (CdPn), a calling party number (CgPn), a charge number (CN), an ANI, etc. TS 150 may receive call information 340 from SS7 CS 120. Prior to allowing call 335 to connect to terminating user device 110, TS 150 may analyze call information 340 and may determine whether a least cost route (e.g., that minimizes costs paid to carriers not associated with a carrier associated with TS 150) can be utilized for routing call 335. In one example, TS 150 may determine the LCR based on one or more of switch translations 305, ANI staging tables 310, administrator inputs 315, LCR forecast information 320, looping exceptions 325, and trunk tables 330.

In another example, TS 150 may determine the LCR based on a jurisdictional index table (e.g., provided via LCR forecast information 320) generated by FARE 190. The jurisdictional index table may include ordered call routing lists generated by FARE 190. For example, FARE 190 may look up rates in carrier rate tables based on the jurisdictional index, may sort carriers based on the rates, and may construct the jurisdictional index table based on the sorted carriers. The jurisdictional index table may include call routing information (e.g., path information, carrier information, network element information, etc.) for every potential jurisdictional index to every potential destination associated with network 100. In one implementation, FARE 190 may periodically calculate and/or provide the jurisdictional index table to SCM 180 at a predetermined time intervals (e.g., weekly, monthly, etc.) or when new rate sheets or routing cost information becomes available.

In still another example, TS 150 may determine the LCR based on looping exceptions 325 and/or other routing exclusions (e.g., determined based on call information 340). For example, TS 150 may determine that certain routes for call 335 are to be excluded from least cost routing. TS 150 may exclude the determined routes provided in the route exclusions when determining the LCR for call 335. In one example, for SS7 traffic, TS 150/VNET TS 170 may return an ordered list of routes to a querying switch (e.g., in network 195), with an order of precedence on which routes to try first. SS7 CS 120/ADF CS 130 may return one route at a time to the querying switch, and, if congestion is encountered, may return an error code to TS 150/VNET TS 170 (e.g., indicating the error and the last route that was specific in the switch response).

TS 150 may determine a jurisdictional index for call 335 based on the information actually present about the locations of originating and terminating user devices 110, and may select a route list for call 335 from the jurisdictional index table based on the determined jurisdictional index and destination of call 335. TS 150 may select a first route from the route list, and may determine if the selected route is viable (e.g., available, not excluded, etc.). If the selected route is not viable, TS 150 may select a next route from the route list. Once a viable route is found, TS 150 may determine the viable route to be the LCR for call 335.

If a selected route is viable, TS 150 may provide LCR routing instructions 345 (e.g., based on the LCR) to SS7 CS 120. SS7 CS 120 may provide routing instructions 345 to network elements (e.g., in network 195) in the selected route, and may route call 335 to terminating user device 110 (not shown), via the selected route (e.g., via the network elements) and based on routing instructions 345. Routing instructions 345 may include information that instructs the network elements on how to route call 335 to terminating user device 110. For example, routing instructions 345 may include path information that identifies which components (e.g., switches, trunks, etc.) of the network elements may be used to provide an end-to-end path between originating user device 110 and terminating user device 110. Call 335 may then be connected between originating user device 110 and terminating user device 110, via the LCR, as indicated by reference number 350.

If a calling party (e.g., associated with an ADF network) places a call 355 (e.g., via originating user device 110) to a called party (e.g., associated with terminating user device 110), ADF CS 130 may receive call 355, and may provide call information 360 to VNET TS 170. Call information 360 may include information associated with call 355, such as a CdPn, a CgPn, a CN, an ANI, etc. VNET TS 170 may receive call information 360 from ADF CS 130. Prior to allowing call 355 to connect to terminating user device 110, VNET TS 170 may analyze call information 360 and may determine whether a least cost route (e.g., that minimizes costs paid to carriers not associated with a carrier associated with VNET TS 170) can be utilized for routing call 355.

In one example, VNET TS 170 may determine the LCR based on one or more of switch translations 305, ANI staging tables 310, administrator inputs 315, LCR forecast information 320, looping exceptions 325, and trunk tables 330. In another example, VNET TS 170 may determine the LCR based on a jurisdictional index table (e.g., provided via LCR forecast information 320) generated by FARE 190. In still another example, VNET TS 170 may determine the LCR based on looping exceptions 325 and/or other routing exclusions (e.g., determined based on call information 360). For example, VNET TS 170 may determine that certain routes for call 355 are to be excluded from least cost routing. VNET TS 170 may exclude the determined routes provided in the route exclusions when determining the LCR for call 355.

VNET TS 170 may determine a jurisdictional index for call 355 based on the information actually present about the locations of originating and terminating user devices 110, and may select a route list for call 355 from the jurisdictional index table based on the determined jurisdictional index and destination of call 355. VNET TS 170 may select a first route from the route list, and may determine if the selected route is viable (e.g., available, not excluded, etc.). If the selected route is not viable, VNET TS 170 may select a next route from the route list.

If a selected route is viable, VNET TS 170 may provide LCR routing instructions 365 (e.g., based on the LCR) to ADF CS 130. ADF CS 120 may provide routing instructions 365 to network elements (e.g., in network 195) in the selected route, and may route call 355 to terminating user device 110 (not shown), via the selected route (e.g., via the network elements) and based on routing instructions 365. Routing instructions 365 may include information that instructs the network elements on how to route call 355 to terminating user device 110. For example, routing instructions 365 may include path information that identifies which components (e.g., switches, trunks, etc.) of the network elements that may be used to provide an end-to-end path between originating user device 110 and terminating user device 110. Call 355 may then be connected between originating user device 110 and terminating user device 110, via the LCR, as indicated by reference number 370.

As further shown in FIG. 3, TS 150 may store LCR information 375 (e.g., associated with the selected LCR) in data warehouse 160, and VNET TS 170 may store LCR information 380 in data warehouse 160. Route information 375 and 380 may include information associated with calls 335 and 355 (e.g., call date, dialed number, called number, unmarked call, marked call, etc.), the selected LCR (e.g., originating switch, originating trunk, terminating trunk, etc.), routing instructions 345 and 365, the selected list from the jurisdictional index table, etc. Data warehouse 160 may provide route information 375 and 380 (e.g., as updated LCR information 385) to FARE 190. FARE 190 may utilize updated LCR information 385 to calculate the jurisdictional index tables, to execute the LCR determination process, etc.

Current telecommunications systems do not typically route calls based on jurisdiction, even though carriers have different rates for routing interstate calls and intrastate calls. In the arrangement depicted in FIG. 3, TS 150 and/or VNET TS 170 can accurately determine how carriers will characterize (e.g., as an interstate call or an intrastate call) a call (e.g., call 335/355) prior to routing the call. Such an arrangement may enable TS 150 and/or VNET TS 170 to route calls at a lowest possible cost to the carrier that owns and/or manages TS 150 and/or VNET TS 170 and the network elements controlled by TS 150 and/or VNET TS 170.

Furthermore, because FARE 190 may pre-compute cost information (e.g., based on jurisdiction) for every potential jurisdictional index to every potential destination associated with network 100 and may provide this information (e.g., via the jurisdictional index table) to TS 150 and/or VNET TS 170, TS 150 and/or VNET TS 170 may quickly select the route (e.g., the LCR) for a call. For example, TS 150 may determine (e.g., based on jurisdiction) that call 335 could be routed via a first carrier's network elements at a cost of $0.20 per minute, via a second carrier's network elements at a cost of $0.30 per minute, and via a third carrier's network elements at a cost of $0.15 per minute. In such a scenario, TS 150 may select to use the third carrier's network elements in order to route call 335 at the lowest possible cost.

Although FIG. 3 shows example interactions 300 of network 100, in other implementations, network 100 may perform fewer interactions, different interactions, differently arranged interactions, or additional interactions than depicted in FIG. 3.

FIG. 4 is a diagram of an example portion 400 of a carrier call origination definition table. In one implementation, table portion 400 may represent definitions or factors used by carriers to determine whether a call is an interstate call or an intrastate call (i.e., to make a jurisdictional determination for the call). TS 150, VNET TS 170, and/or FARE 190 may utilize information provided in table portion 400, and/or other similar information, to determine a jurisdictional index for a call (e.g., for an end-to-end path between components of network 100). As illustrated in FIG. 4, table portion 400 may include a carrier field 410, a first definition field 420, a second definition field 430, a third definition field 440, a last definition field 450, and/or a variety of entries 460 associated with fields 410-450.

Carrier field 410 may include information associated with carriers that own and/or manage network elements that may be utilized by TS 150 and/or VNET TS 170 (e.g., in routing calls). For example, carrier field 410 may include entries for "Carrier1," "Carrier2," "Carrier3," "Carrier4," "On-Net1" (e.g., first network elements owned and/or managed TS 150 and/or VNET TS 170), "On-Net2" (e.g., second network elements owned and/or managed TS 150 and/or VNET TS 170), etc. In one example, each entry in carrier field 410 may include an identifier for a carrier, such as the carrier's name, a numeric identifier for the carrier, an alphanumeric identifier for the carrier, etc.

First definition field 420 may include a first definition used by a carrier (e.g., provided in carrier field 410) to determine whether a call is an interstate call or an intrastate call. For example, first definition field 420 may indicate that Carrier 1 and Carrier 2 use a charge number associated with the call as a first definition in determining whether the call is an interstate call or an intrastate call. If the call is a mobile originated call, first definition field 420 may indicate that Carrier3 and On-Net1 use a Jurisdiction Information Parameter (JIP) code (e.g., a field used in SS7 that indicates a geographic location of an originating caller or switch) as a first definition in determining whether the call is an interstate call or an intrastate call. First definition field 420 may indicate that Carrier4 uses a calling party number associated with the call as a first definition in determining whether the call is an interstate call or an intrastate call. First definition field 420 may indicate that On-Net2 uses an ANI associated with the call as a first definition in determining whether the call is an interstate call or an intrastate call.

Second definition field 430 may include a second definition used by a carrier (e.g., provided in carrier field 410), if the information required to evaluate the first definition does not exist for a particular call, to determine whether a call is an interstate call or an intrastate call. For example, second definition field 430 may indicate that Carrier 1 and Carrier 2 use a calling party number associated with the call as a second definition in determining whether the call is an interstate call or an intrastate call. Second definition field 430 may indicate that Carrier3 and On-Net1 use an ANI associated with the call as a second definition in determining whether the call is an interstate call or an intrastate call. Second definition field 430 may indicate that Carrier4 and On-Net2 do not use a second definition in determining whether the call is an interstate call or an intrastate call.

Third definition field 440 may include a third definition used by a carrier (e.g., provided in carrier field 410), if information required to evaluate the first and second definitions do not exist for the particular call, to determine whether a call is an interstate call or an intrastate call. For example, third definition field 440 may indicate that Carrier1, Carrier2, Carrier4, On-Net1, and On-Net2 do not use a third definition in determining whether the call is an interstate call or an intrastate call. Third definition field 440 may indicate that Carrier3 uses a calling party number associated with the call as a third definition in determining whether the call is an interstate call or an intrastate call.

Last definition field 450 may include a last definition used by a carrier (e.g., provided in carrier field 410), if information to evaluate the first, second, and third definitions do not exist, to determine whether a call is an interstate call or an intrastate call or whether the carrier uses a PIU method of rating the call. An "unmarked" call may be defined as a call that does not include any signaling information which can be used to determine the originating location of the call by each carrier (e.g., where such identifying information has been omitted or stripped off prior to the call arriving on a network, etc.). For example, if the call is "unmarked," last definition field 450 may indicate that Carrier1 and Carrier2 use a location of an ingress point-of-presence (POP) associated with the call as a last definition in determining whether the call is an interstate call or an intrastate call. If the call is unmarked, last definition field 450 may indicate that Carrier3, Carrier4, On-Net1, and On-Net2 use a Percent Interstate Usage (PIU) method in rating an unmarked call.

Although FIG. 4 shows example information that may be provided in table portion 400, in other implementations, table portion 400 may contain less information, different information, differently arranged information, or additional information than depicted in FIG. 4. In one example, table portion 400 may include definitions or factors used by carriers to make other jurisdictional determinations, such as whether a call is an unmarked call, an international call, an on-network only call, an off-network only call, a blended call (e.g., a combination of the aforementioned), etc.

FIG. 5 depicts a diagram of example functional components of FARE 190. As illustrated, FARE 190 may include a database 500, a jurisdictional index definition generator 510, a carrier rate table determiner 520, and a jurisdictional index table constructor 530. The functions described in FIG. 5 may be performed by one or more of the example components of device 200 depicted in FIG. 2.

Database 500 may include a storage device that may store information received by FARE 190. In one implementation, database 500 may store information described above in connection with FIG. 4 and information associated with inputs 540. Inputs 540 may include carrier rate inputs (e.g., carrier rates, on-net rates, etc.), a route sequence table, a carrier table, a trunk group table, a state table, an exclusion administration table, a switch definition administration table, etc. The route sequence table may include information associated with carriers, EO-CLLIs, jurisdictional indices, route sequences for each EO-CLLI and jurisdictional index, etc. The carrier table may include information associated with carriers, a maximum number of unmarked calls that may be received by each carrier, a date to reset marked and unmarked call counters for each carrier, etc. The trunk group table may include network element information (e.g., switch identifiers, trunk numbers, trunk states, etc.) associated with each carrier. The state table may include information identifying a carrier's assumed state (e.g., geographical state) with an originating switch (e.g., a switch receiving call 335 (FIG. 3)). The exclusion administration table may include criteria (e.g., whether an EO-CLLI is allowed to be jurisdictionally routed) that may be combined to create an exclusion rule (e.g., excluding a route for a particular call). The switch definition administration table may include information associated with a switch, such as a switch name, a switch state, etc.

Jurisdictional index definition generator 510 may include hardware or a combination of hardware and software that may receive jurisdictional information 550 from database 500, and may determine jurisdictional index definitions 560 based on jurisdictional information 550. Jurisdictional information 550 may include information (e.g., such as the information contained in table portion 400 and the information contained in database 500) for every potential jurisdictional index to every potential destination associated with network 100. In one example, jurisdictional index definition generator 510 may determine jurisdictional index definitions 560 in the manner described below in connection with FIG. 6. Jurisdictional index definition generator 510 may provide jurisdictional index definitions 560 to carrier rate table determiner 520 and jurisdictional index table constructor 530.

Carrier rate table determiner 520 may include hardware or a combination of hardware and software that may receive jurisdictional index definitions 560 from jurisdictional index definition generator 510 and may receive carrier rate and PIU information 570 from database 500. Carrier rate/PIU information 570 may include carrier rates for every potential jurisdiction to every potential destination associated with network 100. Carrier rate table determiner 520 may determine carrier rate tables 580 based on a conversion of defined carrier pricing schema (e.g. LATA-OCN) to an EO-CLLI destination naming convention and based on carrier rate/PIU information 570. Carrier rate table determiner 520 may determine a carrier rate table for each carrier providing every potential jurisdiction to every potential destination associated with network 100. In one example, carrier rate table determiner 520 may determine carrier rate tables 580 in the manner described below in connection with FIG. 7. Carrier rate table determiner 520 may provide carrier rate tables 580 to jurisdictional index table constructor 530.

Jurisdictional index table constructor 530 may include hardware or a combination of hardware and software that may receive jurisdictional index definitions 560 from jurisdictional index definition generator 510 and may receive carrier rate tables 580 from carrier rate table determiner 520. Jurisdictional index table constructor 530 may determine jurisdictional index table 590 based on jurisdictional index definitions 560 and carrier rate tables 580. For example, jurisdictional index table constructor 530 may retrieve rates in carrier rate tables 580 based on jurisdictional index definitions 560, and may sort carriers from a lowest rate to a highest rate. Jurisdictional index table constructor 530 may construct jurisdictional index table 590 (e.g., for every potential jurisdictional index to every potential destination associated with network 100) based on the sorted carriers. In one implementation, jurisdictional index table constructor 530 may construct an ordered call routing list depicted below in connection with FIG. 8. Jurisdictional index table constructor 530 may provide jurisdictional index table 590 to SCM 180.

Although FIG. 5 shows example functional components of FARE 190, in other implementations, FARE 190 may contain fewer functional components, different functional components, differently arranged functional components, or additional functional components than depicted in FIG. 5. Alternatively, or additionally, one or more functional components of FARE 190 may perform one or more other tasks described as being performed by one or more other functional components of FARE 190. In one example, FARE 190 may provide jurisdictional index definitions 560 and carrier rate tables 580 (e.g., along with jurisdictional index table 590) to SCM 180 (e.g., for storage).

FIG. 6 illustrates a diagram of an example portion of a jurisdictional index definition table 600 capable of being generated and/or maintained by FARE 190 (e.g., by jurisdictional index definition generator 510). Jurisdictional index definition table 600 may provide a jurisdictional index definition (e.g., jurisdictional index definitions 560) for every potential jurisdictional index to all potential destinations associated with network 100. As shown, jurisdictional index definition table 600 may include a jurisdictional index field 610, a first carrier field 620, a second carrier field 630, a third carrier field 640, a fourth carrier field 650, an on-network 1 (On-Net1) field 660, an on-network 2 (On-Net2) field 670, and/or a variety of entries 680 associated with fields 610-670.

Jurisdictional index field 610 may include an index identifier (e.g., a number, a letter, numbers, letters, etc.) for jurisdictions associated with every potential jurisdictional index to every potential destination associated with network 100. For example, as shown in FIG. 6, jurisdictional index field 610 may include a number (e.g., 1, 2, . . . , N) for each jurisdictional index.

First carrier field 620 may include jurisdictional information associated with a first carrier (Carrier1) that owns and/or manages network elements that may be utilized by TS 150 and/or VNET TS 170 (e.g., in routing calls). The jurisdictional information may include numbers that designate whether a call in a jurisdiction (e.g., defined by jurisdictional index field 610) is an intrastate call (e.g., designated by a "0"), an interstate call (e.g., designated by a "1"), or an unmarked call (e.g., designated by a "2") according to the first carrier (or other carriers, as shown in fields 630-670). For example, as shown in FIG. 6, first carrier field 620 may designate calls associated with jurisdictional indices 1-4 as intrastate calls, and may designate calls associated with jurisdictional indices 5, 32, N−1, and N as interstate calls.

Second carrier field 630 may include jurisdictional information associated with a second carrier (Carrier2) that owns and/or manages network elements that may be utilized by TS 150 and/or VNET TS 170 (e.g., in routing calls). As shown in FIG. 6, second carrier field 630 may designate calls associated with jurisdictional indices 1, 2, and 5 as intrastate calls, and may designate calls associated with jurisdictional indices 3, 4, 32, N−1, and N as interstate calls.

Third carrier field 640 may include jurisdictional information associated with a third carrier (Carrier3) that owns and/or manages network elements that may be utilized by TS 150 and/or VNET TS 170 (e.g., in routing calls). As shown in FIG. 6, third carrier field 640 may designate calls associated with jurisdictional indices 1, 3, 5, and N−1 as intrastate calls, and may designate calls associated with jurisdictional indices 2, 4, 32, and N as interstate calls.

Fourth carrier field 650 may include jurisdictional information associated with a fourth carrier (Carrier4) that owns and/or manages network elements that may be utilized by TS 150 and/or VNET TS 170 (e.g., in routing calls). As shown in FIG. 6, fourth carrier field 650 may designate calls associated with jurisdictional indices 1-3 as intrastate calls, may designate calls associated with jurisdictional indices 4, 5, and 32 as interstate calls, and may designate calls associated with jurisdictional indices N−1 and N as unmarked calls.

On-Net1 field 660 may include jurisdictional information associated with network destinations that are owned, managed, and/or utilized by TS 150 and/or VNET TS 170 (e.g., in routing calls). As shown in FIG. 6, On-Net1 field 660 may designate calls associated with jurisdictional indices 1, 2, and 5 as intrastate calls, and may designate calls associated with jurisdictional indices 3, 4, 32, N−1, and N as interstate calls.

On-Net2 field 670 may include jurisdictional information associated with other network destinations that are owned, managed, and/or utilized by TS 150 and/or VNET TS 170 (e.g., in routing calls). As shown in FIG. 6, On-Net2 field 670 may designate calls associated with jurisdictional indices 1 and 4 as intrastate calls, may designate calls associated with jurisdictional indices 2, 5, 32, and N−1 as interstate calls, and may designate calls associated with jurisdictional indices 3 and N as unmarked calls.

Although FIG. 6 shows example information that may be provided in jurisdictional index definition table 600, in other implementations, jurisdictional index definition table 600 may contain less information, different information, differently arranged information, or additional information than depicted in FIG. 6.

FIG. 7 depicts a diagram of example portion of a carrier rate table 700 capable of being generated and/or maintained by FARE 190 (e.g., by carrier rate table determiner 520). In one implementation, carrier rate table 700 may be provided for each carrier or on-network path associated with network 100. Each carrier rate table 700 may include carrier rates for every potential jurisdictional index to every potential destination associated with network 100 and for every jurisdictional index definition (e.g., as provided in jurisdictional index definition table 600 (FIG. 6)). As shown, carrier rate table 700 may include an EO-CLLI field 710, an operating company number (OCN) field 720, an EO-OCN field 730, a jurisdictional index field 740, a rate type field 750, a rate type code field 760, a rate field 770, and/or a variety of entries 780 associated with fields 710-770.

EO-CLLI field 710 may include information identifying an end office common language identifier (EO-CLLI) code associated with a terminating call. EO-CLLI field 710 may include a numeric identifier for the EO-CLLI code, an alphanumeric identifier for the EO-CLLI code, etc. Two possible EO-CLLI codes are shown in FIG. 7, (e.g., "ABCD1234" and "BCDE4567"), but the carrier rate table 700 may include EO-CLLI codes for all possible terminating call destinations offered by this carrier.

OCN field 720 may include information identifying an operating company number (OCN) of the terminating EO-CLLI. In one implementation, OCN field 720 may identify network elements owned and/or managed by a particular carrier or may identify the particular carrier. OCN field 720 may include a numeric identifier for the OCN, an alphanumeric identifier for the OCN, etc. For example, as shown in FIG. 7, OCN field 720 may include two OCNs (e.g., "7076" and "1357").

EO-OCN field 730 may include information identifying whether an end office OCN (EO-OCN), to which the originating call will terminate, is enabled. EO-OCN field 730 may include a numeric identifier for the EO-OCN, an alphanumeric identifier for the EO-OCN, etc. For example, as shown in FIG. 7, EO-OCN field 730 may indicate that one EO-OCN (e.g., "1"), to which the originating call will terminate, is enabled.

Jurisdictional index field 740 may include an identifier (e.g., a number, a letter, numbers, letters, etc.) for combinations of jurisdictional assessments from each possible carrier associated with every potential end-to-end path between the EO-CLLI (e.g., associated with EO-CLLI field 710) and the EO-OCN (e.g., associated with EO-OCN field 730). For example, as shown in FIG. 7, jurisdictional index field 740 may include a number (e.g., 1, 2, . . . , N) for each jurisdictional index.

Rate type field 750 may include information identifying a rate type associated with the jurisdictional index identified in jurisdictional index field 740. The rate type may include an indicator identifying the rate as an intrastate rate, an interstate rate, an unmarked rate, or another rate type. As shown in FIG. 7, rate type field 750 may include an intrastate rate for jurisdictional indices 1 and 2, may include an interstate rate for jurisdiction index 32, and may include an unmarked rate for jurisdictional indices N−1 and N.

Rate type code field 760 may include information identifying a rate type code associated with the rate type identified in rate type field 750. In one example, the rate type code may include numbers such as "0," "1," or "2." As shown in FIG. 7, rate type code field 760 may include one number (e.g., "0") for an intrastate rate (e.g., provided in rate type field 750), another number (e.g., "1") for an interstate rate (e.g., provided in rate type field 750), and still another number (e.g., "2") for an unmarked rate (e.g., provided in rate type field 750).

Rate field 770 may include information identifying a rate charged per minute for a call terminated to the EO-CLLI (e.g., associated with EO-CLLI field 710) and having a particular jurisdictional index (e.g., field 740). For example, as shown in FIG. 7, rate field 770 may include a rate of $0.195000 per minute for intrastate calls terminated to the EO-CLLI designated "ABCD1234," a rate of $0.004200 per minute for interstate calls terminated to the EO-CLLI designated "ABCD1234," and a rate of $0.134400 per minute for unmarked calls terminated to the EO-CLLI designated "ABCD1234." As further shown in FIG. 7, rate field 770 may include a rate of $0.251700 per minute for intrastate calls terminated to the EO-CLLI designated "BCDE4567," a rate of $0.006750 per minute for interstate calls terminated to the EO-CLLI designated "BCDE4567," and a rate of $0.206600 per minute for unmarked calls terminated to the EO-CLLI designated "BCDE4567."

Although FIG. 7 shows example information that may be provided in carrier rate table 700, in other implementations, carrier rate table 700 may contain less information, different information, differently arranged information, or additional information than depicted in FIG. 7.

FIG. 8 illustrates a diagram of an example portion of a jurisdictional index table 800 capable of being generated and/or maintained by FARE 190 (e.g., by jurisdictional index table constructor 530). In one implementation, a jurisdictional index table 800 may be provided for every potential jurisdictional index to every potential destination associated with network 100 to generate jurisdictional index table 590 (FIG. 5). As shown in FIG. 8, jurisdictional index table 800 may include an EO-CLLI field 810, an OCN field 820, a jurisdictional index field 830, a route choice field 840, a switch identifier (ID) field 850, a carrier field 860, and/or a variety of entries 870 associated with fields 810-860.

EO-CLLI field 810 may include information identifying an EO-CLLI code where a call will be terminated. EO-CLLI field 810 may include a numeric identifier for the EO-CLLI code, an alphanumeric identifier for the EO-CLLI code, etc. For example, as shown in FIG. 8, EO-CLLI field 810 may include one EO-CLLI code (e.g., "ABCD1234") associated with the terminating location of the call.

OCN field 820 may include information identifying an OCN associated with the EO-CLLI. OCN field 820 may include a numeric identifier for the OCN, an alphanumeric identifier for the OCN, etc. For example, as shown in FIG. 8, OCN field 820 may include one OCN (e.g., "7076") to which the call will terminate.

Jurisdictional index field 830 may include an identifier (e.g., a number, a letter, numbers, letters, etc.) for a jurisdictional index associated with potential end-to-end paths to the EO-CLLI (e.g., associated with EO-CLLI field 810). For example, as shown in FIG. 8, jurisdictional index field 830 may include a number (e.g., "2") for the jurisdictional index.

Route choice field 840 may include a numeric order for ordered calling routing list 800 (e.g., from the least expensive call route to the most expensive call route). For example, as shown in FIG. 8, a route choice of "1" (e.g., in route choice field 840) may indicate a least expensive call route and a route choice of "5" may indicate a most expensive call route for the particular call routing provided in jurisdictional index table 800.

Switch ID field 850 may include information identifying a switch (e.g., owned and/or managed by INCP 130) that receives the originating call. Switch ID field 850 may include a numeric identifier for the switch, an alphanumeric identifier for the switch, etc. For example, as shown in FIG. 8, switch ID field 850 may include one identifier for the switch (e.g., "123") that receives the originating call.

Carrier field 860 may include information associated with carriers that own and/or manage network elements that may be utilized by TS 150 and/or VNET TS 170 to route the originating call. For example, carrier field 860 may include entries for "Carried," "Carrier2," "Carrier4," "Carrier5," "On-Net1," etc. In one example, each entry in carrier field 860 may include an identifier for a carrier, such as the carrier's name, a numeric identifier for the carrier, an alphanumeric identifier for the carrier, etc. As shown in FIG. 8, Carrier2 may provide the least expensive call route and On-Net1 may provide the most expensive call route for the particular call routing provided in jurisdictional index table 800.

Although FIG. 8 shows example information that may be provided in jurisdictional index table 800, in other implementations, jurisdictional index table 800 may contain less information, different information, differently arranged information, or additional information than depicted in FIG. 8.

Figure 9:
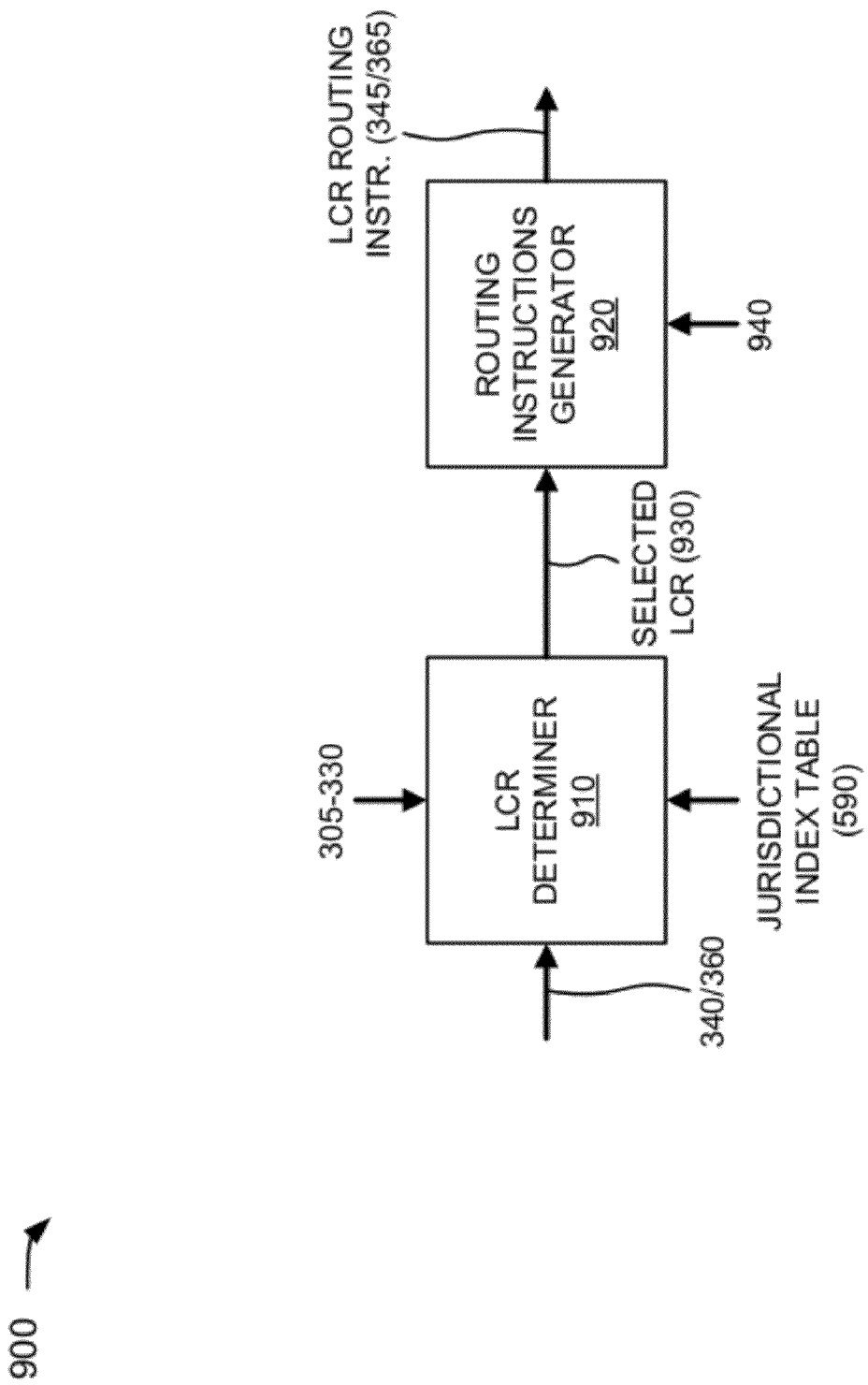
FIG. 9 depicts a diagram of example functional components of a transaction server (TS) or a virtual network (VNET) transaction server (TS) depicted in FIG. 1.

FIG. 9 depicts a diagram of example functional components of a device 900 that correspond to TS 150, VNET TS 170, or FARE 190 (e.g., when FARE 190 executes the LCR determination process). As illustrated, device 900 may include a LCR determiner 910 and a routing instructions generator 920. The functions described in FIG. 9 may be performed by one or more of the example components of device 200 depicted in FIG. 2.

LCR determiner 910 may include hardware or a combination of hardware and software that may receive call information 340/360, and may receive switch translations 305, ANI staging tables 310, administrator inputs 315, LCR forecast information 320, looping exceptions 325, and trunk tables 330. LCR determiner 910 may also receive jurisdictional index table 590 (e.g., via LCR forecast information 320). LCR determiner 910 may select a LCR 930 based on call information 340/360 and one or more of switch translations 305, ANI staging tables 310, administrator inputs 315, LCR forecast information 320, looping exceptions 325, and trunk tables 330.

In one example implementation, LCR determiner 910 may implement a LCR determination process, as described below in connection with FIGS. 21-48, to determine selected LCR 930. In one example, LCR determiner 910 may utilize the LCR determination process to generate a first set of possible LCRs, and to determine exclusions from the first set of possible LCRs (e.g., to create a second set of possible LCRs). LCR determiner 910 may further utilize the LCR determination process to determine hubbing and routing for the second set of possible LCRs, and to select LCR 930, based on the determined hubbing and routing, from the second set of possible LCRs. In another example, LCR determiner 910 may utilize the LCR determination process to determine a jurisdictional index for a call based on originating and terminating locations of the call, and to select a route list from the ordered call routing lists based on the jurisdictional index. LCR determiner 910 may further utilize the LCR determination process to select a first route from the route list, and to determine if the selected route is viable. If the first selected route is viable, LCR determiner 910 may determine the selected route to be the LCR. Otherwise, LCR determiner 910 may select the next route from the route list and determine if that route is viable.

Further details of LCR determiner 910 are provided below in connection with, for example, FIGS. 10-17. As further shown in FIG. 9, LCR determiner 910 may provide selected LCR 930 to routing instructions generator 920.

Routing instructions generator 920 may include hardware or a combination of hardware and software that may receive selected LCR 930 from LCR determiner 910 and may receive network information 940 from SCM 180. Network information 940 may include information associated with network elements of network 195, such as network identifiers, device identifiers, trunk identifiers, etc. Routing instructions generator 920 may generate LCR routing instructions 345/365 for viable/least expensive routes by using network information 940. For example, routing instructions generator 920 may create an end-to-end path that corresponds to the viable/least expensive routes (e.g., through network 195) using network information 940, and may output the created path as routing instructions 345/365.

Although FIG. 9 shows example functional components of device 900, in other implementations, device 900 may contain fewer functional components, different functional components, differently arranged functional components, or additional functional components than depicted in FIG. 9. Alternatively, or additionally, one or more functional components of device 900 may perform one or more other tasks described as being performed by one or more other functional components of device 900.

Figure 10:
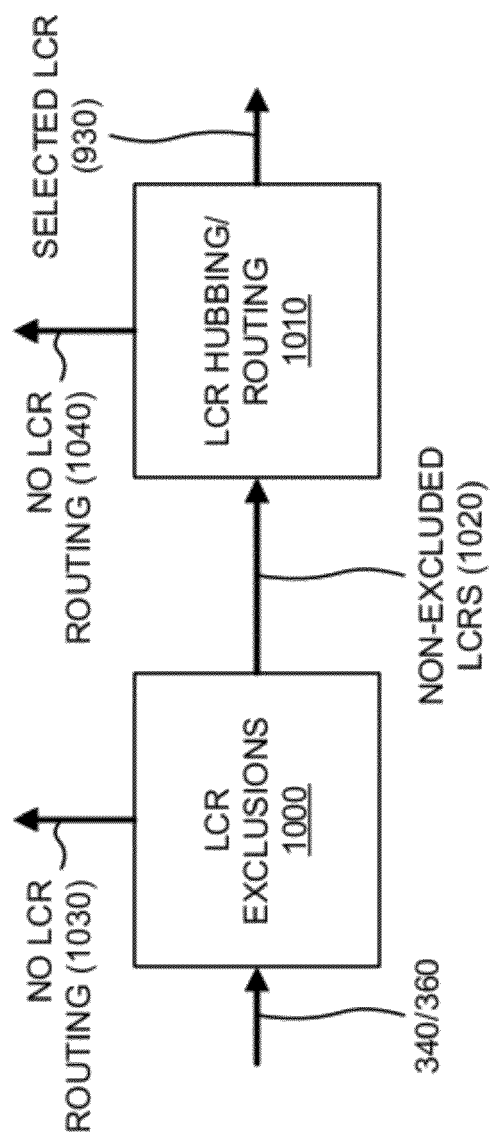
FIG. 10 is a diagram of example functional components of a least cost route (LCR) determiner depicted in FIG. 9.

FIG. 10 is a diagram of example functional components of LCR determiner 910 (FIG. 9). The functions described in FIG. 10 may be performed by one or more of the example components of device 200 (FIG. 2). As shown in FIG. 10, LCR determiner 910 may include a LCR exclusions component 1000 and a LCR hubbing/routing component 1010.

LCR exclusions component 1000 may include hardware or a combination of hardware and software that may receive call information 340/360, and may determine LCR routing exclusions based on call information 340/360. For example, LCR exclusions component may determine if any LCRs are to be excluded based on hard coded checks (e.g., described below in connection with FIGS. 11 and 23); ANI and called part number exclusions (e.g., described below in connection with FIGS. 11 and 24); database routing data (e.g., described below in connection with FIGS. 11 and 25); and exclusion database checks (e.g., described below in connection with FIGS. 11, 31A, and 31B). LCR exclusions component 1000 may remove any excluded LCRs from consideration and may provide non-excluded LCRs 1020 to LCR hubbing routing component 1010. If all LCRs are excluded, LCR exclusions component 1000 may return an indication 1030 that no LCR routing is available.

LCR hubbing/routing component 1010 may include hardware or a combination of hardware and software that may receive non-excluded LCRs 1020 from LCR exclusions component 1000, and may select LCR 930 from non-excluded LCRs 1020 based on hubbing and routing associated with non-excluded LCRs 1020 (e.g., described below in connection with FIG. 37). For example, LCR hubbing/routing component 1010 may perform LCR jurisdictional assignment operations on non-excluded LCRs 1020 (e.g., described below in connection with FIGS. 14 and 38); may perform LCR jurisdictional JIP assignment operations on non-excluded LCRs 1020 (e.g., described below in connection with FIGS. 14 and 41); may perform LCR hubbing and unmarked operations on non-excluded LCRs 1020 (e.g., described below in connection with FIGS. 14 and 44); and may perform a final route selection of selected LCR 930 from non-excluded LCRs 1020 (e.g., described below in connection with FIGS. 14 and 48).

Although FIG. 10 shows example functional components of LCR determiner 910, in other implementations, LCR determiner 910 may contain fewer functional components, different functional components, differently arranged functional components, or additional functional components than depicted in FIG. 10. Alternatively, or additionally, one or more functional components of LCR determiner 910 may perform one or more other tasks described as being performed by one or more other functional components of LCR determiner 910.

Figure 11:
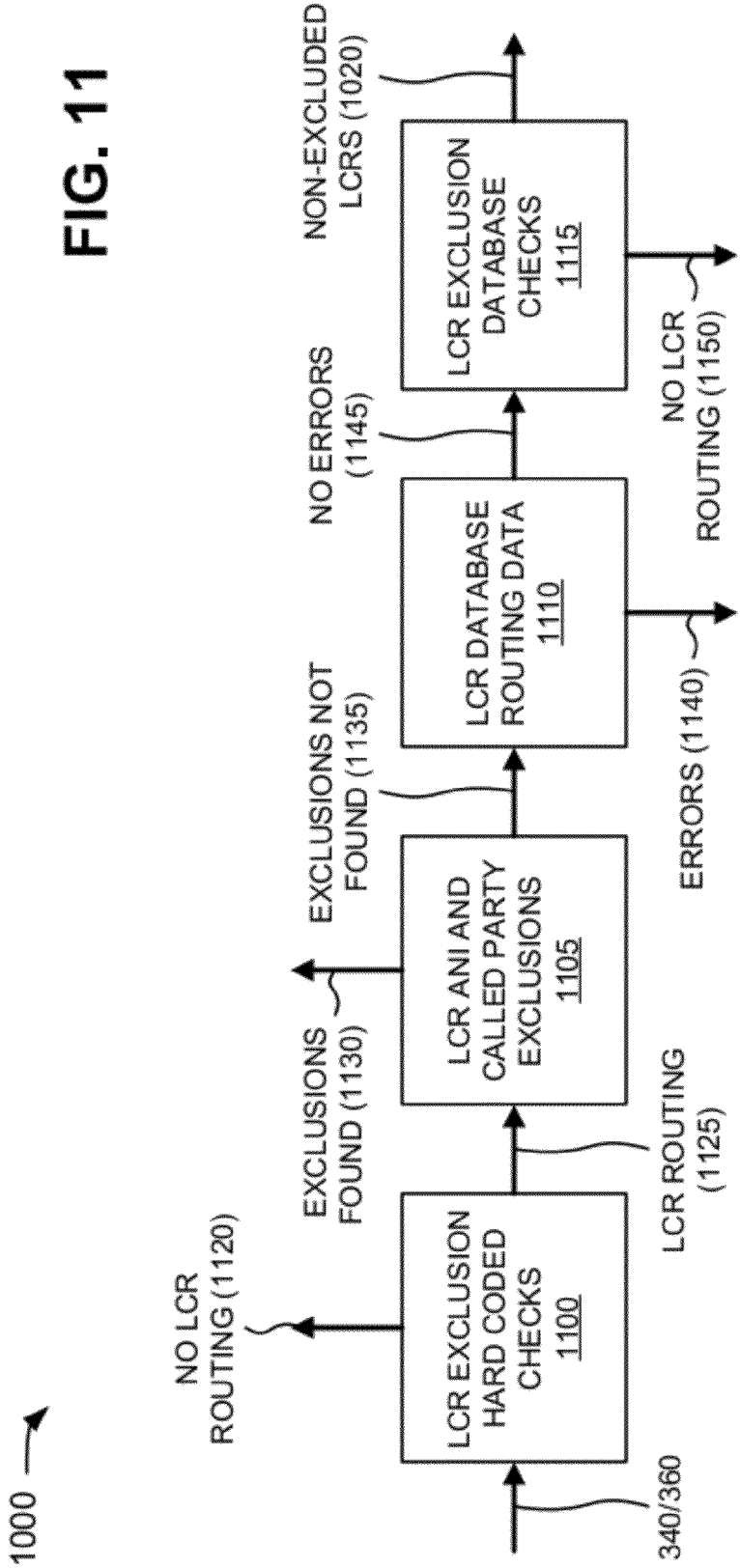
FIG. 11 is a diagram of example functional components of a LCR exclusions component shown in FIG. 10.

FIG. 11 is a diagram of example functional components of LCR exclusions component 1000 (FIG. 10). The functions described in FIG. 11 may be performed by one or more of the example components of device 200 (FIG. 2). As shown in FIG. 11, LCR exclusions component 1000 may include a LCR exclusion hard coded checks component 1100, a LCR ANI and called party exclusions component 1105, a LCR database routing data component 1110, and a LCR exclusion data checks component 1115.

LCR exclusion hard coded checks component 1100 may include hardware or a combination of hardware and software that may receive call information 340/360, and may determine (e.g., based on hard coded checks) if LCR routing is available (e.g., to a call) based on call information 340/360. For example, LCR exclusion hard coded checks component 1100 may determine that no LCR routing 1120 is available or that LCR routing 1125 is available. If no LCR routing 1120 is available, component 1100 may indicate this. If LCR routing 1125 is available, LCR exclusion hard coded checks component 1100 may provide an indication (1125) of this to LCR ANI and called party exclusions component 1105. Examples of hard coded checks may include: determining whether a call is a government call (e.g., a Government Emergency Telecommunications Service (GETS) call); determining whether an originating switch of the call is a type of switch that does not support LCR; whether local to local (L2L) routing of the call is used; whether the call is a terminating Internet protocol (IP) call; whether the call is associated with an interactive voice response (IVR) system; whether the call includes a shared termination to an international location; whether the call is terminating to a dedicated access line (DAL); whether the call was marked ineligible for LCR; whether the call is a voice-over-Internet (VoIP) call; and whether an originating switch of the call is a VoIP trunk.

LCR ANI and called party exclusions component 1105 may include hardware or a combination of hardware and software that may receive LCR routing 1125, and may determine if a call is associated with specific originating or terminating telephone numbers to be excluded. For example, LCR ANI and called party exclusions component 1105 may exclude the call when the call is associated with an international ANI, an international charge number, or an international called party number. LCR ANI and called party exclusions component 1105 may determine that exclusions are found 1130 or that exclusions are not found 1135. If exclusions are found 1130, component 1105 may indicate this. If exclusions are not found 1135, LCR ANI and called party exclusions component 1105 may provide an indication (1135) of this to LCR database routing data component 1110.

LCR database routing data component 1110 may include hardware or a combination of hardware and software that may receive indication 1135, and may attempt to set up a call for LCR routing based on database routing data (e.g., information 305-330 provided by SCM 180). If component 1110 cannot set up the call for LCR routing, component 1110 may generate errors 1140. If component 1110 can set up the call for LCR routing, component 1110 may provide an indication 1145 of no errors to LCR exclusion database checks component 1115. For example, LCR database routing data component 1110 may attempt to set up the call using information, such as: international ANI (CgPn) originating information (e.g., described below in connection with FIGS. 12 and 26); international charge number originating information (e.g., described below in connection with FIGS. 12 and 27); called number originating information (e.g., described below in connection with FIGS. 12 and 27); unmarked originating information (e.g., described below in connection with FIGS. 12 and 29); and terminating information (e.g., described below in connection with FIGS. 12 and 30).

LCR exclusion database checks component 1115 may include hardware or a combination of hardware and software that may receive indication 1145, and may determine LCR routing exclusions based on exclusion database checks (e.g., defined by ANI originating EO CLLI) (e.g., described below in connection with FIGS. 31A and 31B). For example, LCR exclusion database checks 1115 may perform the following exclusion database checks: a LCR array exclusion check (e.g., described below in connection with FIGS. 13 and 33); a LCR exclusion database check for an originating switch of a call (e.g., described below in connection with FIGS. 13 and 32); a LCR process activate date/time check (e.g., described below in connection with FIG. 35); a LCR compare array fields check (e.g., described below in connection with FIG. 34); and a LCR compare fixed fields check (e.g., described below in connection with FIG. 36). As further shown in FIG. 11, LCR exclusion database checks component 1115 may remove the excluded LCRs, and may output non-excluded LCRs 1020. If all LCRs are excluded, then LCR exclusion database checks component 1115 may provide an indication 1150 of no LCR routing.

Although FIG. 11 shows example functional components of LCR exclusions component 1000, in other implementations, LCR exclusions component 1000 may contain fewer functional components, different functional components, differently arranged functional components, or additional functional components than depicted in FIG. 11. Alternatively, or additionally, one or more functional components of LCR exclusions component 1000 may perform one or more other tasks described as being performed by one or more other functional components of LCR exclusions component 1000.

Figure 12:
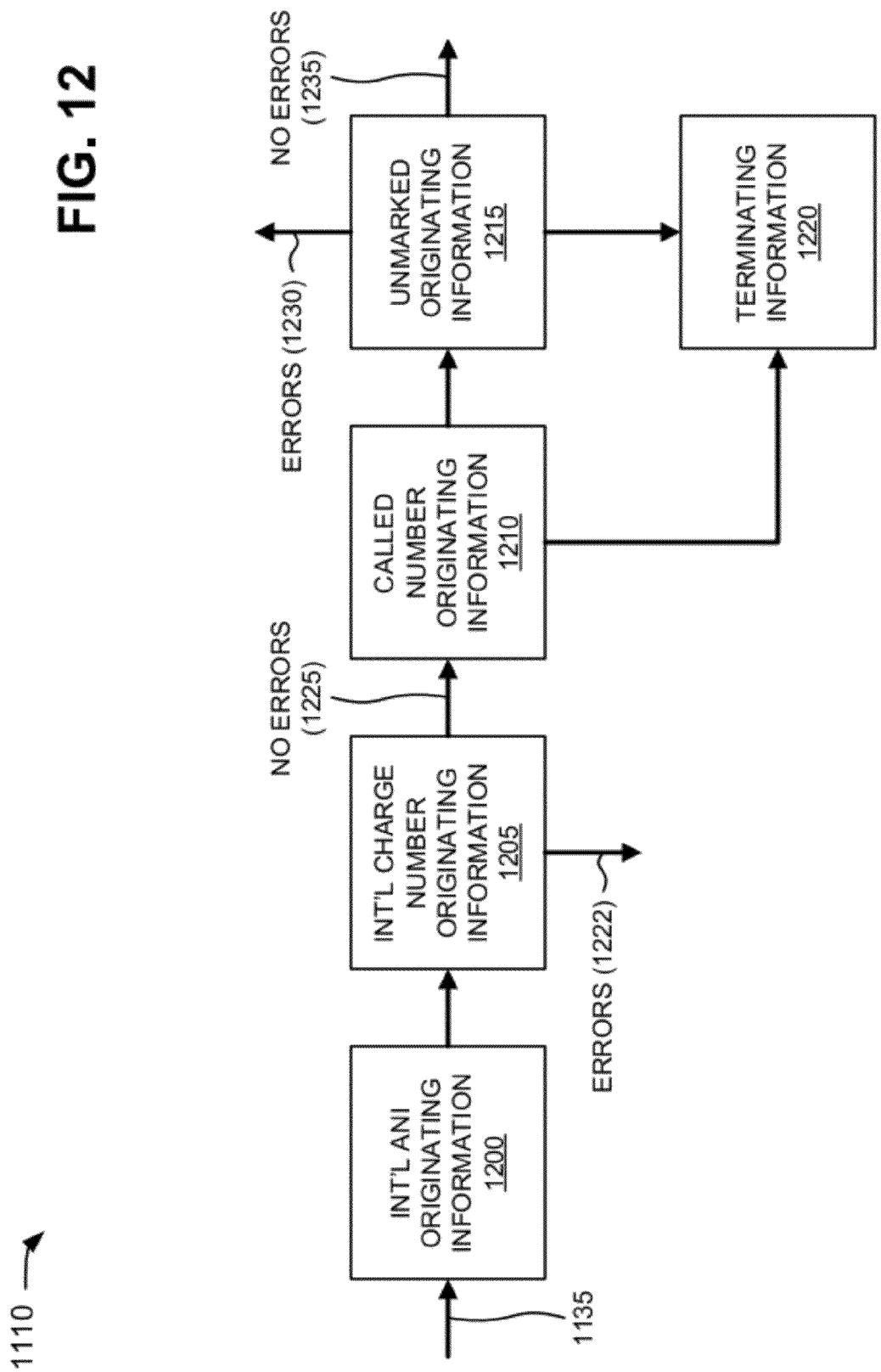
FIG. 12 is a diagram of example functional components of a LCR database routing data component shown in FIG. 11.

FIG. 12 is a diagram of example functional components of LCR database routing data component 1110 (FIG. 11). The functions described in FIG. 12 may be performed by one or more of the example components of device 200 (FIG. 2). As shown in FIG. 12, LCR database routing data component 1110 may include an international ANI origination information component 1200, an international charge number originating information component 1205, a called number originating information component 1210, an unmarked originating information component 1215, and a terminating information component 1220.

International ANI origination information component 1200 may include hardware or a combination of hardware and software that may receive indication 1135, and may perform a database query (e.g., of a Feature Group D (FG-D) access database) for an international ANI (e.g., a calling party number or ANI switch parameter) associated with a call. International ANI origination information component 1200 may also perform a database query (e.g., of a Local Exchange Routing Guide (LERG) database) for an international ANI (e.g., a calling party number or ANI switch parameter) associated with a call.

International charge number originating information component 1205 may include hardware or a combination of hardware and software that may set up data for a call using an international charge number of the call. For example, component 1205 may perform a database query (e.g., of a FG-D database) for the international charge number, and, if the international charge is found in the database, may save originating state information for the call (e.g., in a charge context). Component 1205 may perform another database query (e.g., of a LERG database) for the international charge number, and, if the international charge is found in the database, may save the originating EO CLLI for the call (e.g., in the charge context). If the international charge number is not located in both databases, component 1205 may provide an indication 1222 of errors. If the international charge number is located in both databases, component 1205 may provide an indication 1225 of no errors to called number originating information component 1210.

Called number originating information component 1210 may include hardware or a combination of hardware and software that may set up data for a call using international called number originating information. For example, component 1210 may perform a database query (e.g., of a FG-D database) for the international original dialed number, and, if the international original dialed number is found in the database, may save originating state information for the call (e.g., in a called context).

Unmarked originating information component 1215 may include hardware or a combination of hardware and software that may set up data for a call using unmarked originating information. For example, component 1215 may perform database query (e.g., of a rate center database and a database with trunk information) for an originating switch and trunk of the call, and, if the originating switch and trunk is found in the databases, may save state information for the call. If the originating switch and trunk is not located in both databases, component 1215 may generate an indication 1230 of errors. If the originating switch and trunk is located in both databases, component 1215 may generate an indication 1235 of no errors.

Terminating information component 1220 may include hardware or a combination of hardware and software that may set up data for a call using terminating information (e.g., geographic state and LATA) of the call. For example, component 1220 may perform a database query (e.g., of a FG-D database) for the terminating information, and, if the terminating information is found in the database, may save terminating LATA and state information for the call (e.g., in a terminating context). Component 1220 may perform another database query (e.g., of a LERG database) for the terminating information, and, if the terminating information is found in the database, may save the terminating EO CLLI and OCN for the call (e.g., in the terminating context).

Although FIG. 12 shows example functional components of LCR database routing data component 1110, in other implementations, LCR database routing data component 1110 may contain fewer functional components, different functional components, differently arranged functional components, or additional functional components than depicted in FIG. 12. Alternatively, or additionally, one or more functional components of LCR database routing data component 1110 may perform one or more other tasks described as being performed by one or more other functional components of LCR database routing data component 1110.

Figure 13:
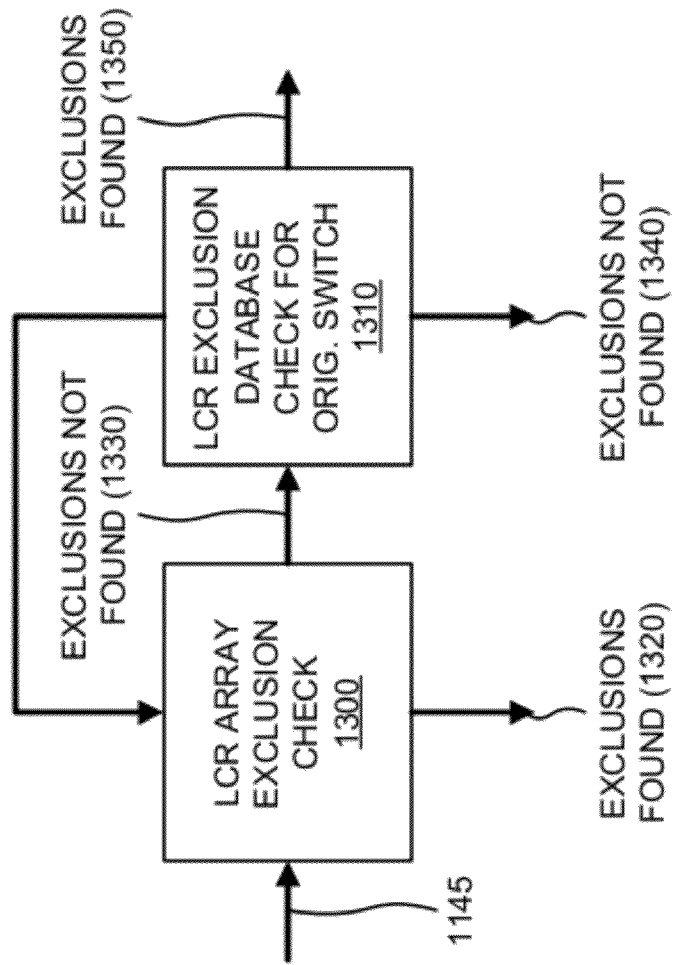
FIG. 13 is a diagram of example functional components of a LCR exclusion database checks component shown in FIG. 11.

FIG. 13 is a diagram of example functional components of LCR exclusion database checks component 1115 (FIG. 11). The functions described in FIG. 13 may be performed by one or more of the example components of device 200 (FIG. 2). As shown in FIG. 13, LCR exclusion database checks component 1115 may include a LCR array exclusion component 1300 and a LCR exclusion database check for originating switch component 1310.

LCR array exclusion check component 1300 may include hardware or a combination of hardware and software that may receive indication 1145, and may determine LCR routing exclusions based on comparisons to an array. For example, component 1300 may create an array that includes an originating EO CLLI of a call; an originating Carrier Identification Code (CIC) of the call; an originating switch and trunk of the call, information digits (e.g., originating line information (OLI) or calling party category (CPC)) of the call; and an ANI of the call. Component 1300 may perform the following exclusion checks based on the created array: a LCR process active date/time check (e.g., described below in connection with FIG. 35); a LCR compare array fields check (e.g., described below in connection with FIG. 34); and a LCR compare fixed fields check (e.g., described below in connection with FIG. 36). As further shown in FIG. 13, if exclusions are found based on the exclusion checks, component 1300 may output an indication 1320 that exclusions are found. If exclusions are not found, component 1300 may provide an indication 1330 that exclusions are not found to component 1310.

LCR exclusion database check for originating switch component 1310 may include hardware or a combination of hardware and software that may receive indication 1330, and may determine LCR routing exclusions based on comparisons to a database for the originating switch of a call. For example, component 1310 may perform database queries (e.g., of an originating switch and trunk database) for the originating switch of the call, a trunk group of the call, and network type (e.g., SS7 or ADF) associated with the call. If exclusions are not found based on the database queries, component 1310 may output an indication 1340 that exclusions are not found.

If exclusions are found, component 1310 may generate an indication 1350 that exclusions are found.

Although FIG. 13 shows example functional components of LCR exclusion database checks component 1115, in other implementations, LCR exclusion database checks component 1115 may contain fewer functional components, different functional components, differently arranged functional components, or additional functional components than depicted in FIG. 13. Alternatively, or additionally, one or more functional components of LCR exclusion database checks component 1115 may perform one or more other tasks described as being performed by one or more other functional components of LCR exclusion database checks component 1115.

Figure 14:
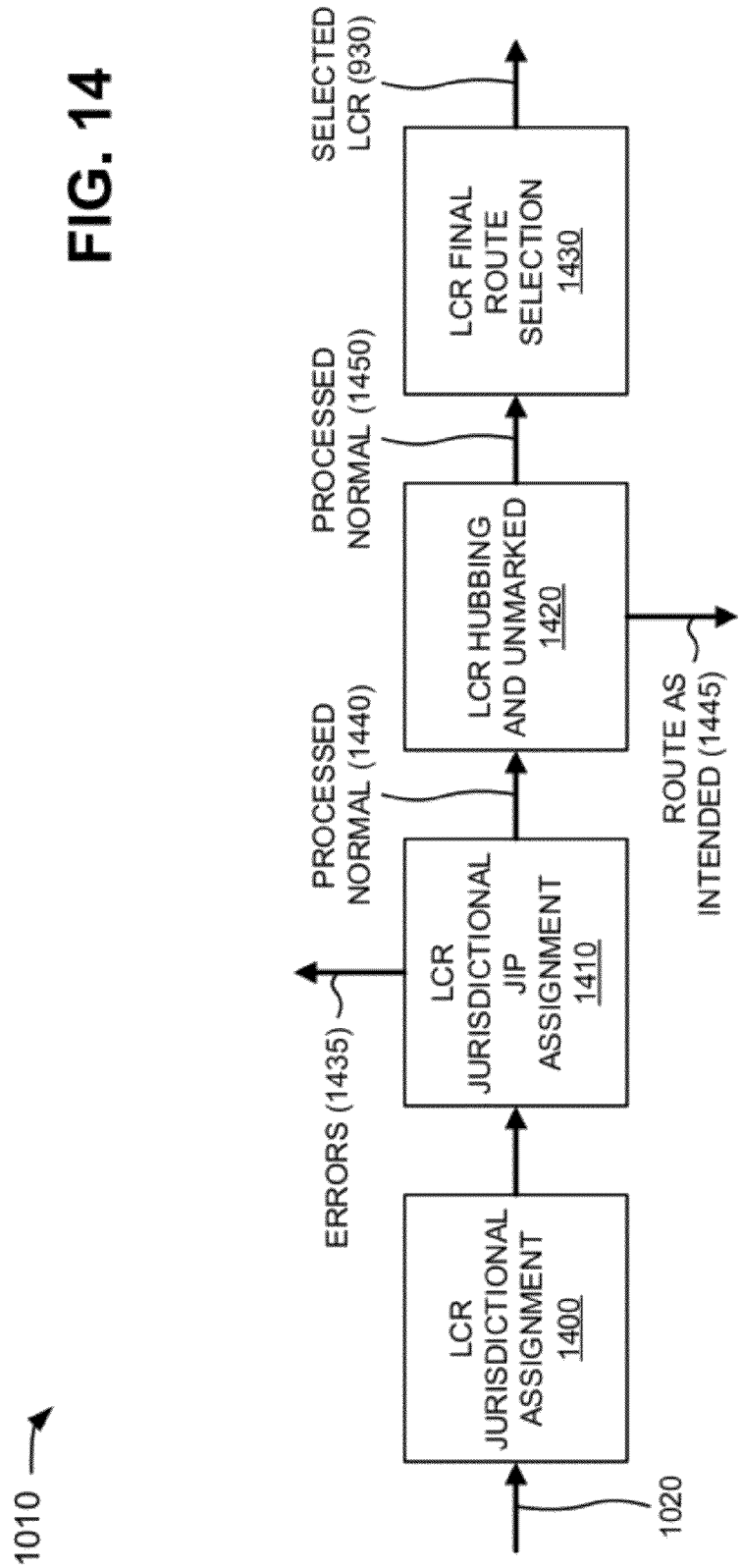
FIG. 14 is a diagram of example functional components of a LCR hubbing routing component shown in FIG. 10.

FIG. 14 is a diagram of example functional components of LCR hubbing/routing component 1010 (FIG. 10). The functions described in FIG. 14 may be performed by one or more of the example components of device 200 (FIG. 2). As shown in FIG. 14, LCR hubbing/routing component 1010 may include a LCR jurisdictional assignment component 1400, a LCR jurisdictional JIP assignment component 1410, a LCR hubbing and unmarked component 1420, and a LCR final route selection component 1430.

LCR jurisdictional assignment component 1400 may include hardware or a combination of hardware and software that may receive non-excluded LCRs 1020, and may perform jurisdiction assignment operations (e.g., described below in connection with FIG. 38) using non-excluded LCRs 1020. For example, component 1400 may determine whether a call has an international ANI (e.g., a CgPn or ANI parameter) and a valid length (e.g., 11 digits) and state (e.g., associated with the call); and whether the call has an international charged number parameter and a valid length and state. Component 1400 may also perform a LCR carrier jurisdictional assignment for the call (e.g., described below in connection with FIGS. 15 and 39) and a LCR jurisdictional Z location assignment for the call (e.g., described below in connection with FIGS. 15 and 40).

LCR jurisdictional JIP assignment component 1410 may include hardware or a combination of hardware and software that may perform jurisdictional JIP assignment operations for a call (e.g., described below in connection with FIG. 41). For example, component 1410 may perform a database query (e.g., of a FG-D database) for a JIP associated with the call; may perform a database query (e.g., of a OCN JIP database) for a terminating OCN and a network type associated with the call; and may perform a database query (e.g., a LCR trunk table) for a network type, an originating switch ID, and a long distance (LD) carrier associated with the call. Component 1410 may also perform a LCR jurisdictional index assignment for the call (e.g., described below in connection with FIGS. 16 and 42) and a LCR jurisdictional route sequence lookup for the call (e.g., described below in connection with FIGS. 16 and 43). If errors occur during the jurisdictional JIP assignment, component 1410 may output an indication 1435 of such errors. If no errors occur during the jurisdictional JIP assignment, component 1410 may output an indication 1440 that the call is to be processed normally (e.g., with a LCR).

LCR hubbing and unmarked component 1420 may include hardware or a combination of hardware and software that may receive indication 1440, and may determine hubbing and unmarked information for a call (e.g., described below in connection with FIG. 44). For example, component 1420 may perform a database query (e.g., of a LCR carrier table) for a long distance carrier ID and a network type associated with the call; and may perform a database query (e.g., of a LCR carrier trunk table) for a network type, a switch request ID, and a LD carrier ID associated with the call. Component 1420 may also perform a LCR carrier deselection for the call (e.g., described below in connection with FIGS. 17 and 45), a LCR carrier and looping check for the call (e.g., described below in connection with FIGS. 17 and 46), and a LCR terminating switch-trunk exclusion for the call (e.g., described below in connection with FIGS. 17 and 47). If errors occur during the hubbing and unmarked operations, component 1420 may route the call as intended (e.g., without a LCR), as indicated by reference number 1445. If no errors occur during the hubbing and unmarked operations, component 1420 may output an indication 1450 that the call is to be processed normally (e.g., with a LCR).

LCR final route selection component 1430 may include hardware or a combination of hardware and software that may receive indication 1450, and may select a final route (e.g., selected LCR 930) for a call (e.g., described below in connection with FIG. 48). For example, component 1430 may determine selected LCR 930 for a call based on whether the call is provided via a SS7 network (e.g., via SS7 CS 120) or a ADF network (e.g., via ADF CS 130).

Although FIG. 14 shows example functional components of LCR hubbing/routing component 1010, in other implementations, LCR hubbing/routing component 1010 may contain fewer functional components, different functional components, differently arranged functional components, or additional functional components than depicted in FIG. 14. Alternatively, or additionally, one or more functional components of LCR hubbing/routing component 1010 may perform one or more other tasks described as being performed by one or more other functional components of LCR hubbing/routing component 1010.

FIG. 15 is a diagram of example functional components of LCR jurisdictional assignment component 1400 (FIG. 14). The functions described in FIG. 15 may be performed by one or more of the example components of device 200 (FIG. 2). As shown in FIG. 15, LCR jurisdictional assignment component 1400 may include a LCR carrier jurisdictional assignment component 1500 and a LCR jurisdictional Z location assignment component 1510.

LCR carrier jurisdictional assignment component 1500 may include hardware or a combination of hardware and software that may perform LCR carrier jurisdictional assignment operations for a call (e.g., described below in connection with FIG. 39). For example, component 1500 may determine whether an original dialed number (ODN) of the call is an "8XX" number and whether a state associated with the call is equal to a state of an ODN subscript. Component 1500 may then determine which carriers are associated with the call and may set jurisdictional values for the carriers.

LCR jurisdictional Z location assignment component 1510 may include hardware or a combination of hardware and software that may perform LCR jurisdictional Z location assignment operations for a call (e.g., described below in connection with FIG. 40). For example, component 1500 may perform a database query (e.g., a LCR trunk table) for a network type, an originating switch ID, and particular carriers (e.g., AT&T, Global Crossing, and Level 3) associated with the call. Component 1510 may then set jurisdictional values for the particular carriers.

Although FIG. 15 shows example functional components of LCR jurisdictional assignment component 1400, in other implementations, LCR jurisdictional assignment component 1400 may contain fewer functional components, different functional components, differently arranged functional components, or additional functional components than depicted in FIG. 15. Alternatively, or additionally, one or more functional components of LCR jurisdictional assignment component 1400 may perform one or more other tasks described as being performed by one or more other functional components of LCR jurisdictional assignment component 1400.

Figure 16:
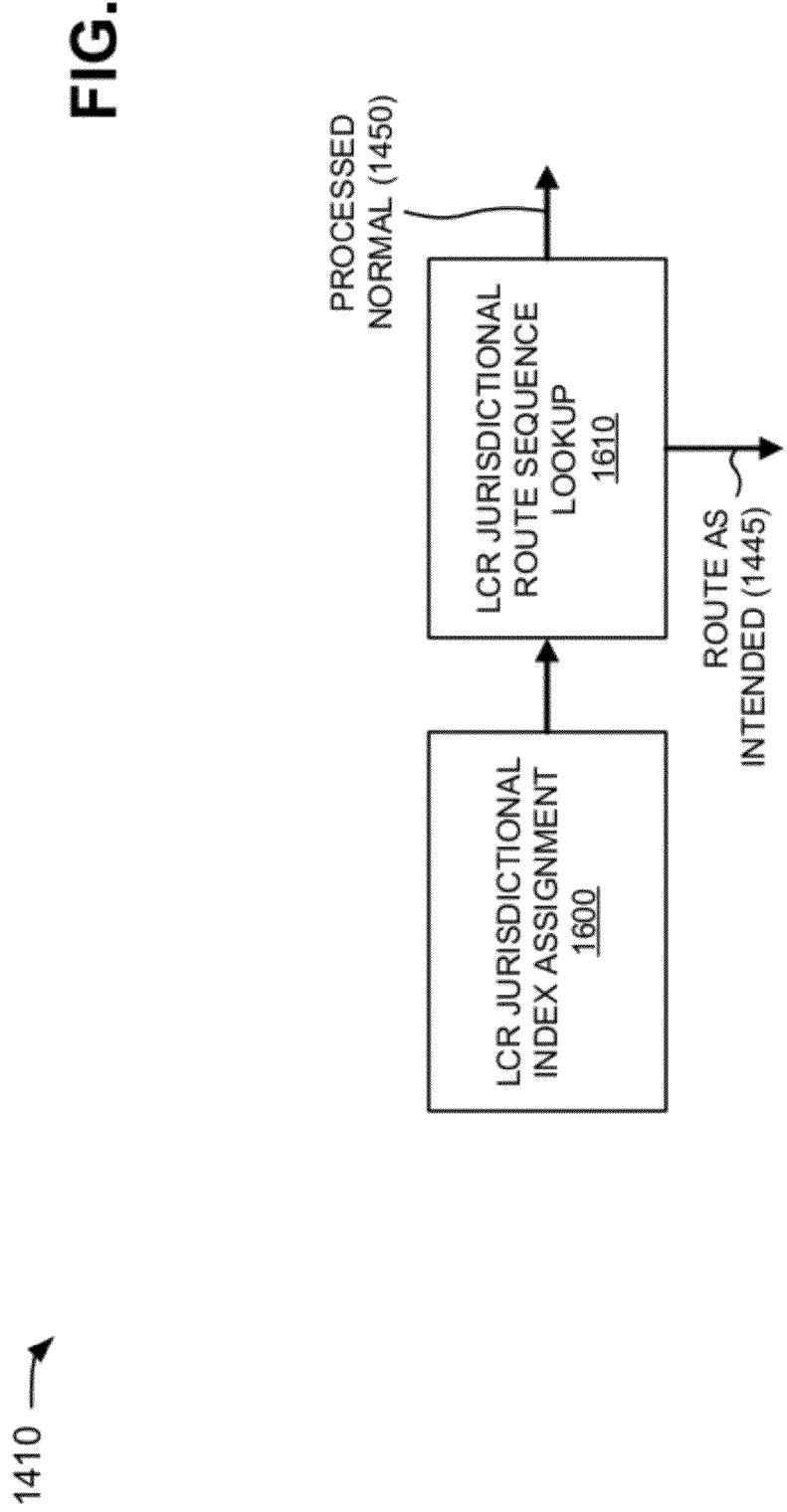
FIG. 16 is a diagram of example functional components of a LCR jurisdictional JIP assignment component shown in FIG. 14.

FIG. 16 is a diagram of example functional components of LCR jurisdictional JIP assignment component 1410 (FIG. 14). The functions described in FIG. 16 may be performed by one or more of the example components of device 200 (FIG. 2). As shown in FIG. 16, LCR jurisdictional JIP assignment component 1410 may include a LCR jurisdictional index assignment component 1600 and a LCR jurisdictional route sequence lookup component 1610.

LCR jurisdictional index assignment component 1600 may include hardware or a combination of hardware and software that may set jurisdictional values for potential routes of a call (e.g., described below in connection with FIG. 42). For example, component 1600 may determine whether a carrier is associated with a terminating location (e.g., a state) of the call. If the carrier is associated with the terminating location, component 1600 may set a jurisdictional value for the carrier.

LCR jurisdictional route sequence lookup component 1610 may include hardware or a combination of hardware and software that may perform a jurisdictional route sequence lookup for a call (e.g., described below in connection with FIG. 43). For example, component 1610 may perform a database query (e.g., of a jurisdictional matrix, such as jurisdictional index table 800) for potential carriers associated with the call; and may perform a database query (e.g., of a route sequence database) for a terminating EO CLLI, a jurisdictional matrix ID, a current date/time, a network type, and a terminating OCN associated with the call. If errors occur during the jurisdictional route sequence lookup, component 1610 may route the call as intended (e.g., without a LCR), as indicated by reference number 1445. If no errors occur during the jurisdictional route sequence lookup, component 1610 may output indication 1450 that the call is to be processed normally (e.g., with a LCR).

Although FIG. 16 shows example functional components of LCR jurisdictional JIP assignment component 1410, in other implementations, LCR jurisdictional JIP assignment component 1410 may contain fewer functional components, different functional components, differently arranged functional components, or additional functional components than depicted in FIG. 16. Alternatively, or additionally, one or more functional components of LCR jurisdictional JIP assignment component 1410 may perform one or more other tasks described as being performed by one or more other functional components of LCR jurisdictional JIP assignment component 1410.

Figure 17:
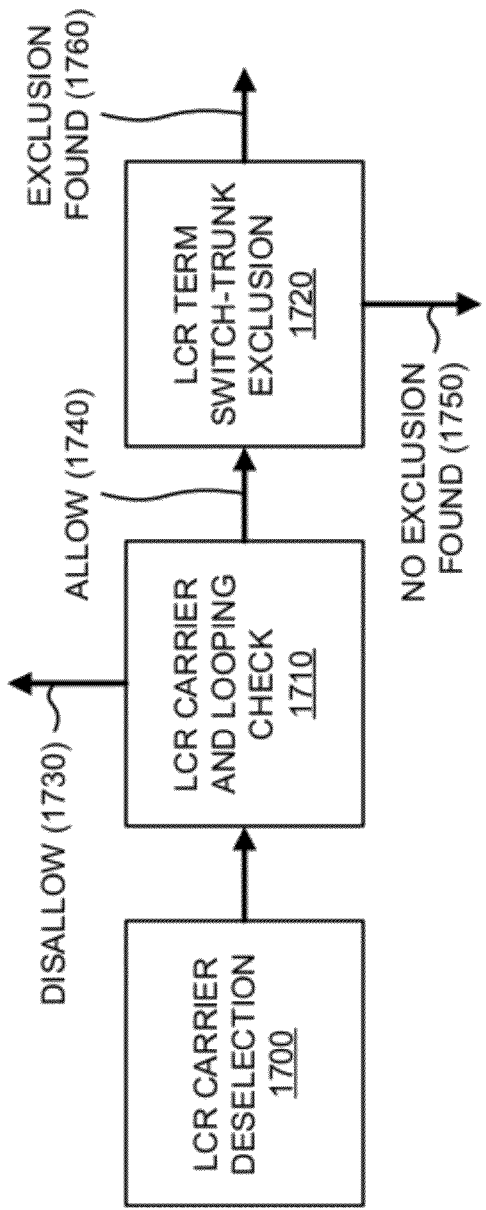
FIG. 17 is a diagram of example functional components of a LCR hubbing and unmarked component shown in FIG. 14.

FIG. 17 is a diagram of example functional components of LCR hubbing and unmarked component 1420 (FIG. 14). The functions described in FIG. 17 may be performed by one or more of the example components of device 200 (FIG. 2). As shown in FIG. 17, LCR hubbing and unmarked component 1420 may include a LCR carrier deselection component 1700, a LCR carrier and looping check component 1710, and a LCR terminating switch-trunk exclusion component 1720.

LCR carrier deselection component 1700 may include hardware or a combination of hardware and software that may perform a carrier deselection process for a call (e.g., described below in connection with FIG. 45). For example, component 1700 may deselect a carrier based on analysis of a variety of parameters, such as a carrier terminating state, a carrier terminating trunk group, jurisdictional information associated with a carrier, etc.

LCR carrier and looping check component 1710 may include hardware or a combination of hardware and software that may perform a carrier and looping check for a call (e.g., described below in connection with FIG. 46). For example, component 1710 may perform a database query (e.g., of a looping table) for a terminating EO CLLI and LD carrier ID of the call. If the carrier and looping check indicates that the LCR may not be selected, component 1710 may generate an indication 1730 that the LCR is not allowed. If the carrier and looping check indicates that an LCR may be selected for the call, component 1710 may provide an indication 1740 that the LCR is allowed to component 1720.

LCR terminating switch-trunk exclusion component 1720 may include hardware or a combination of hardware and software that may perform LCR terminating switch-trunk exclusion operations for a call (e.g., described below in connection with FIG. 47). For example, component 1720 may perform a database query (e.g., of a LCR exclusion terminating switch/trunk database) for a terminating switch, a terminating trunk group, and a network type associated with the call. If exclusions are not found based on the database query, component 1720 may output an indication 1750 that exclusions are not found. If exclusions are found, component 1720 may generate an indication 1760 that exclusions are found.

Although FIG. 17 shows example functional components of LCR hubbing and unmarked component 1420, in other implementations, LCR hubbing and unmarked component 1420 may contain fewer functional components, different functional components, differently arranged functional components, or additional functional components than depicted in FIG. 17. Alternatively, or additionally, one or more functional components of LCR hubbing and unmarked component 1420 may perform one or more other tasks described as being performed by one or more other functional components of LCR hubbing and unmarked component 1420.

FIGS. 18-48 are flow charts of an example process 1800 for providing least cost call routing according to implementations described herein. In one implementation, process 1800 may be performed by TS 150 and/or VNET TS 170. In another implementation, some or all of process 1800 may be performed by another device or group of devices, including or excluding TS 150 and/or VNET TS 170.

Figure 18:

As illustrated in FIG. 18, process 1800 may include receiving network information, LCR forecast information, network administrator inputs, and looping exceptions (block 1810), and receiving a call, from an originating location, to a terminating location (block 1820). For example, in implementations described above in connection with FIG. 3, SCM 180 may provide one or more of switch translations 305, ANI staging tables 310, administrator inputs 315, LCR forecast information 320, looping exceptions 325, and trunk tables 330 to TS 150 and/or VNET TS 170. TS 150 and/or VNET TS 170 may receive the provided information, and may store the information internally (e.g., in storage device 250) or externally (e.g., in data warehouse 160). If a calling party (e.g., associated with a SS7 network) places call 335 (e.g., via originating user device 110) to a called party (e.g., associated with terminating user device 110), SS7 CS 120 may receive call 335, and may provide call information 340 to TS 150. Call information 340 may include information associated with call 335, such as a called party number (CdPn), a calling party number (CgPn), a charge number (CN), an ANI, etc. TS 150 may receive call information 340 from SS7 CS 120.

As further shown in FIG. 18, process 1800 may include determining a LCR for the call based on one or more of the network information, the LCR forecast information, the network administrator inputs, and the looping exceptions (block 1830). For example, in implementations described above in connection with FIG. 3, prior to allowing call 335 to connect to terminating user device 110, TS 150 may analyze call information 340 and may determine whether a least cost route (e.g., that minimizes costs paid to carriers not associated with a carrier associated with TS 150) can be utilized for routing call 335. In one example, TS 150 may determine the LCR based on one or more of switch translations 305, ANI staging tables 310, administrator inputs 315, LCR forecast information 320, looping exceptions 325, and trunk tables 330. In another example, TS 150 may determine the LCR based on a jurisdictional index table (e.g., provided via LCR forecast information 320) generated by FARE 190. In still another example, TS 150 may determine the LCR based on looping exceptions 325 and/or other routing exclusions (e.g., determined based on call information 340). For example, TS 150 may determine that certain routes for call 335 are to be excluded from least cost routing. TS 150 may exclude the determined routes provided in the route exclusions when determining the LCR for call 335.

Returning to FIG. 18, process 1800 may include generating routing instructions for the determined LCR (block 1840), and providing the routing instructions to network elements provided associated with the LCR (block 1850). For example, in implementations described above in connection with FIG. 3, TS 150 may provide LCR routing instructions 345 (e.g., based on the LCR) to SS7 CS 120. SS7 CS 120 may provide routing instructions 345 to network elements (e.g., in network 195) in the selected route. Routing instructions 345 may include information that instructs the network elements on how to route call 335 to terminating user device 110. In one example, routing instructions 345 may include path information that identifies which components (e.g., switches, trunks, etc.) of the network elements that may be used to provide an end-to-end path between originating user device 110 and terminating user device 110.

As further shown in FIG. 18, process 1800 may include routing the call to the terminating location via the LCR and based on the routing instructions (block 1860). For example, in implementations described above in connection with FIG. 3, SS7 CS 120 may route call 335 to terminating user device 110 (not shown), via the selected route (e.g., via the network elements) and based on routing instructions 345. Call 335 may then be connected between originating user device 110 and terminating user device 110, via the LCR, as indicated by reference number 350.

Figure 19:
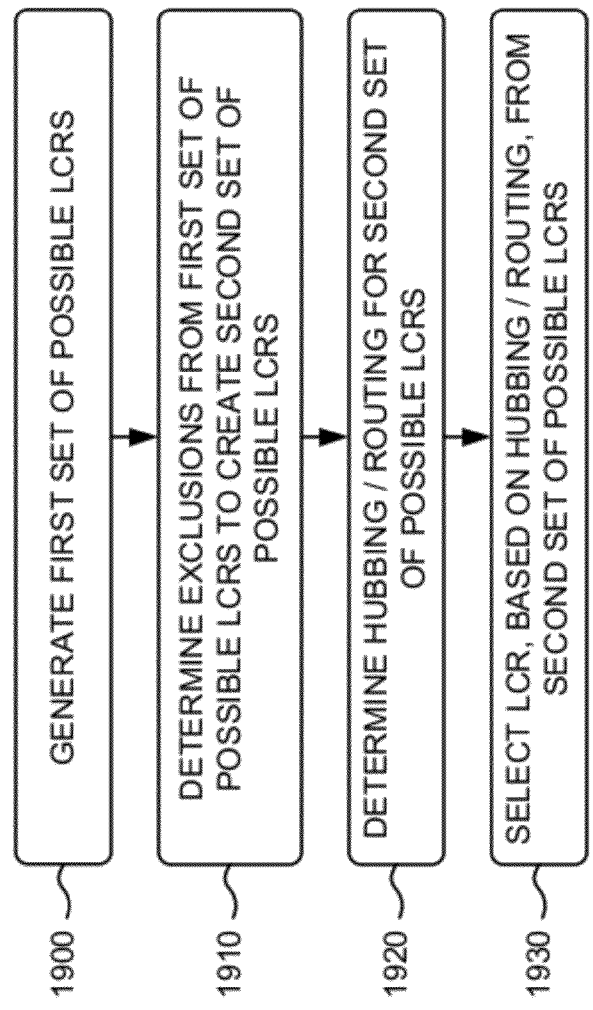

Process block 1830 may include the process blocks depicted in FIG. 19. As shown in FIG. 19, process block 1830 may include generating a first set of possible LCRs (block 1900), determining exclusions from the first set of possible LCRs to create a second set of possible LCRs (block 1910), determining hubbing and routing for the second set of possible LCRs (block 1920), and selecting the LCR, based on the hubbing and routing, from the second set of possible LCRs (block 1930). For example, in implementations described above in connection with FIG. 9, LCR determiner 910 of device 900 may utilize the LCR determination process to generate a first set of possible LCRs, and to determine exclusions from the first set of possible LCRs (e.g., to create a second set of possible LCRs). LCR determiner 910 may further utilize the LCR determination process to determine hubbing and routing for the second set of possible LCRs, and to select LCR 930, based on the determined hubbing and routing, from the second set of possible LCRs.

Figure 20:
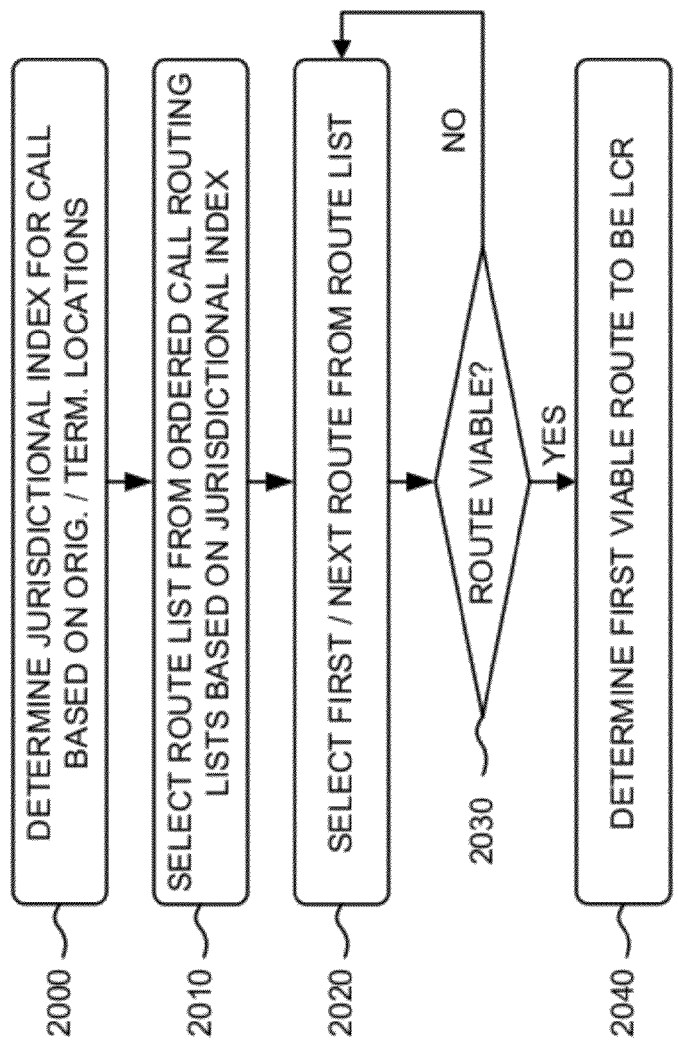

Alternatively, or additionally, process block 1830 may include the process blocks depicted in FIG. 20. As shown in FIG. 20, process block 1830 may include determining a jurisdictional index for the call based on the originating and terminating locations (block 2000), and selecting a route list from ordered call routing lists based on the jurisdictional index (block 2010). For example, in implementations described above in connection with FIG. 3, TS 150 may determine a jurisdictional index for call 335 based on the information actually present about the locations of originating and terminating user devices 110, and may select a route list for call 335 from the jurisdictional index table based on the determined jurisdictional index and destination of call 335.

As further shown in FIG. 20, process block 1830 may include selecting a route from the route list (block 2020) and determining whether the selected route is viable (block 2030). If the selected route is not viable (block 2030—NO), a next route from the route list may be selected (block 2020). If the selected route is viable (block 2030—YES), the viable route may be determined to be the LCR (block 2040). For example, in implementations described above in connection with FIG. 3, TS 150 may select a first route from the route list, and may determine if the selected route is viable (e.g., available, not excluded, etc.). If the selected route is not viable, TS 150 may select a next route from the route list. Once a viable route is found, TS 150 may determine the viable route to be the LCR for call 335.

Alternatively, or additionally, process block 1830 may include the process blocks depicted in FIGS. 21-48. In one implementation, FIGS. 21-48 may depict an example LCR determination process (e.g., to determine selected LCR 930) that may be implemented by TS 150 and/or VNET TS 170. If a database is identified in FIGS. 21-48, the database may be provided in TS 150, data warehouse 160, and/or VNET TS 170, and may be generated based on one or more of switch translations 305, ANI staging tables 310, administrator inputs 315, LCR forecast information 320, looping exceptions 325, and trunk tables 330.

Figure 21:
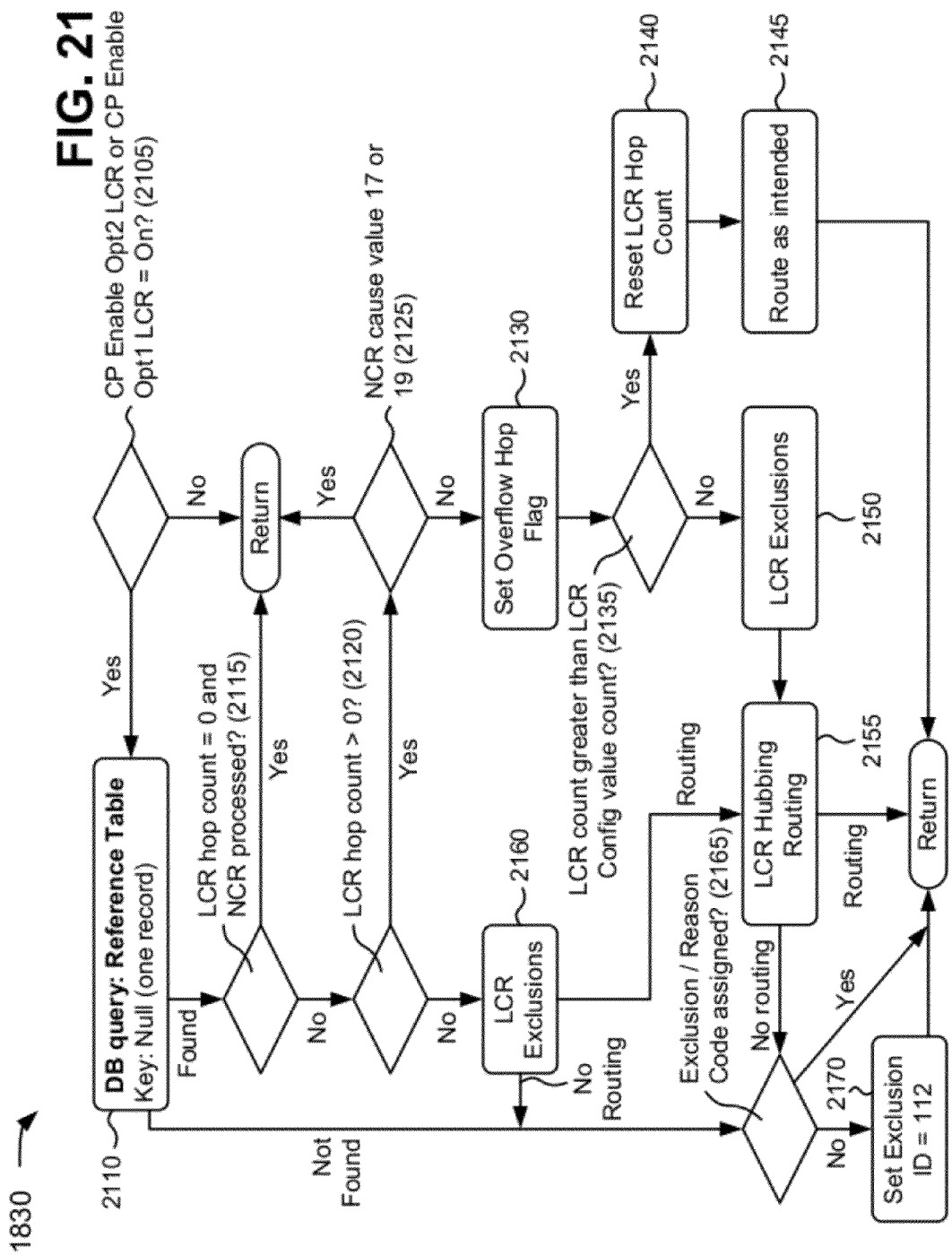

As shown in FIG. 21, process block 1830 may include determining whether the LCR determination process is enabled for SS7 based calling parties (CP) (e.g., Opt1) and/or for ADF based CPs (e.g., Opt2) (block 2105). If the LCR determination process is not enabled (block 2105—NO), process block 1830 may return (e.g., to process block 1840). If the LCR determination process is enabled (block 2105—YES), process block 1830 may include performing a database (DB) query (e.g., of a reference table) for one record (e.g., a NULL record) (block 2110). If the record is found in the DB (block 2110—FOUND), it may be determined if a LCR hop count (e.g., a number of times the LCR determination process is to be performed) is equal to zero and whether a network call redirect (NCR) is processed (block 2115). If the LCR hop count equals zero or the NCR is processed (block 2115—YES), process block 1830 may return. Otherwise (block 2115—NO), it may be determine if the LCR hop count is greater than zero (block 2120).

If the LCR hop count is greater than zero (block 2120—YES), it may be determined if a NCR cause value is equal to a particular value (block 2125). If the NCR cause value is equal to a particular value (block 2125—YES), process block 1830 may return. Otherwise (block 2125—NO), process block 1830 may include setting an overflow hop flag (block 2130) and determining if the LCR hop count is greater than a LCR configuration value (block 2135). If the LCR hop count is greater than the LCR configuration value (block 2135—YES), process block 1830 may include resetting the LCR hop count (block 2140) and routing the call as intended (block 2145) (e.g., a regular route as defined by customer tables). If the LCR hop count is not greater than the LCR configuration value (block 2135—NO), process block 1830 may include determining LCR routing exclusions for the call (block 2150) and performing LCR hubbing and routing for the call (e.g., via a selected LCR) (block 2155). If LCR routing is provided for the call (block 2155—ROUTING), process block 1830 may return. If the LCR hop count is not greater than zero (block 2120—NO), process block 1830 may include determining LCR routing exclusions for the call (block 2160). If process block 2160 determines that no LCR routing is available for the call (block 2160—NO ROUTING), if no LCR routing is provided for the call (block 2155—NO ROUTING), or if no records are found in the database query (block 2110—NOT FOUND), it may be determined if an exclusion/reason code is assigned (block 2165). If not exclusion/reason code is assigned (block 2165—NO), an exclusion ID may be set (block 2170). Otherwise (block 2165—YES), process block 1830 may return.

Figure 22:
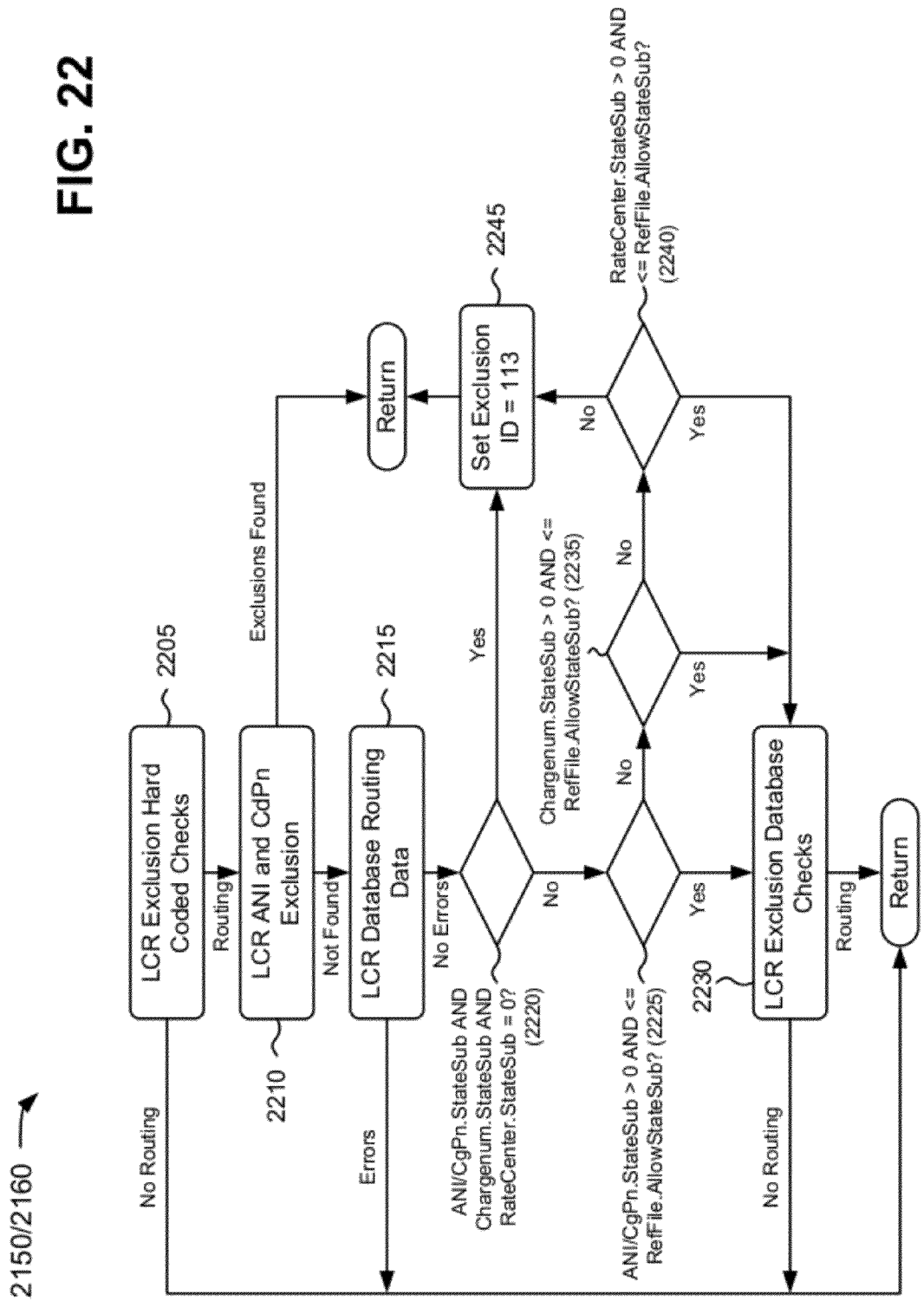

Process blocks 2150/2160 may include the process blocks depicted in FIG. 22. Generally, FIG. 22 may depict LCR routing exclusion operations that may be performed for a call. As shown in FIG. 22, LCR process blocks 2150/2160 may include performing LCR exclusion hard coded checks (block 2205), performing LCR ANI and CdPn exclusion operations (block 2210), and performing LCR database routing data operations (block 2215) for the call. If the LCR hard coded checks determines that no LCR routing is available (block 2205—NO ROUTING), if LCR ANI and CdPn exclusions are found (block 2210—EXCLUSIONS FOUND), or if LCR database routing operations detect errors (block 2215—ERRORS), process blocks 2150/2160 may return. Otherwise, it may be determined whether an ANI and calling party number (CgPn), a charge number, and a rate center associated with a state of the call is equal to zero (block 2220).

If the ANI/CgPn, the charge number, and the rate center do not equal zero (block 2220—NO), it may be determined if the ANI/CgPn is greater than zero and less than or equal to a particular value (e.g., ReferenceFile.AllowStateSub) (block 2225). If the ANI/CgPN is greater than zero and is less than or equal to the particular value (block 2225—YES), LCR exclusion database checks may be performed (block 2230). The LCR exclusion database checks (block 2230) may provide LCR routing or no LCR routing (e.g., due to exclusions). If the ANI/CgPN is not greater than zero or is not less than or equal to the particular value (block 2225—NO), it may be determined if a charge number associated with the state of the call is greater than zero and less than or equal to the particular value (block 2235). If the charge number is greater than zero and is less than or equal to the particular value (block 2235—YES), LCR exclusion database checks may be performed (block 2230). Otherwise (block 2235—NO), it may be determined if a rate center associated with the state of the call is greater than zero and less than or equal to the particular value (block 2240). If the rate center is not greater than zero or is not less than or equal to the particular value (block 2240—NO) or if the ANI/CgPn, the charge number, and the rate center equal zero (block 2220—YES), an exclusion ID may be set (block 2245) and process blocks 2150/2160 may return exclusions. If the rate center is greater than zero and is less than or equal to the particular value (block 2240—YES), LCR exclusion database checks may be performed (block 2230).

Figure 23:
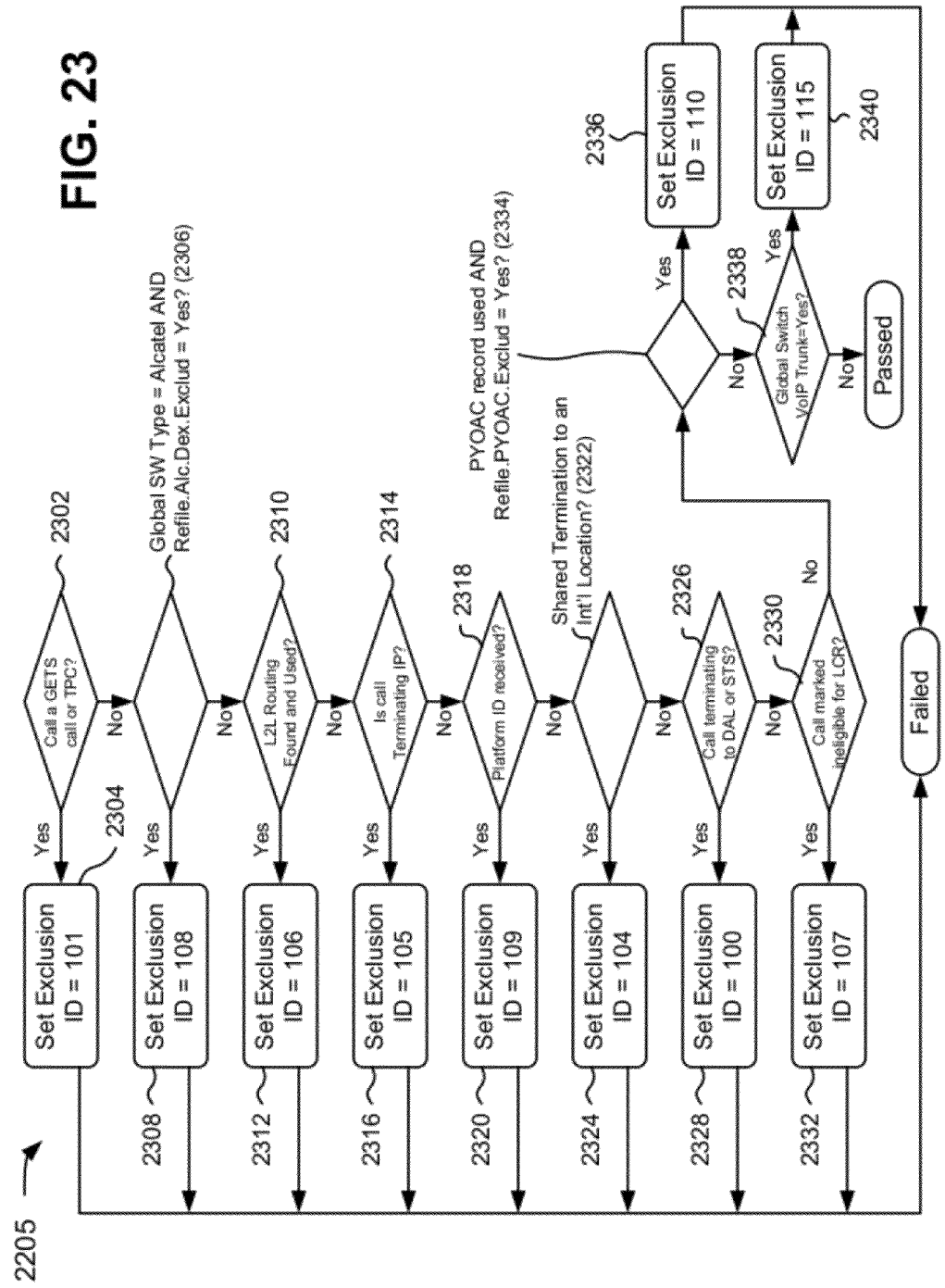

Process block 2205 may include the process blocks depicted in FIG. 23. Generally, FIG. 23 may depict example LCR hard coded exclusion checks that may be performed for a call. For example, as shown in FIG. 23, if the call is a government call (e.g., a GETS call) (block 2302—YES), a particular exclusion ID (e.g., "101") may be set (block 2304) and a LCR may not be provided for the call. If an originating switch of the call is a particular type (e.g., an Alcatel switch) and the particular type is excluded (block 2306—YES), a particular exclusion ID (e.g., "108") may be set (block 2308) and a LCR may not be provided for the call. If local to local (L2L) routing is used for the call (block 2310—YES), a particular exclusion ID (e.g., "106") may be set (block 2312) and a LCR may not be provided for the call. If the call is a terminating IP call (block 2314—YES), a particular exclusion ID (e.g., "105") may be set (block 2316) and a LCR may not be provided for the call.

As further shown in FIG. 23, if a platform ID (e.g., associated an IVR system) was received for the call (block 2318—YES), a particular exclusion ID (e.g., "109") may be set (block 2320) and a LCR may not be provided for the call. If the call has a shared termination to an international location (block 2322—YES), a particular exclusion ID (e.g., "104") may be set (block 2324) and a LCR may not be provided for the call. If the call terminates to a dedicated access line (DAL) or STS (block 2326—YES), a particular exclusion ID (e.g., "100") may be set (block 2328) and a LCR may not be provided for the call. If the call is marked ineligible for LCR (block 2330—YES), a particular exclusion ID (e.g., "107") may be set (block 2332) and a LCR may not be provided for the call. If an IP based record is used for the call (block 2334—YES), a particular exclusion ID (e.g., "110") may be set (block 2336) and a LCR may not be provided for the call. If the call is associated with an originating switch VoIP trunk (block 2338—YES), a particular exclusion ID (e.g., "115") may be set (block 2340) and a LCR may not be provided for the call. If the call passes through the aforementioned hard coded exclusion checks, the call may pass the hard coded exclusion test.

Figure 24:
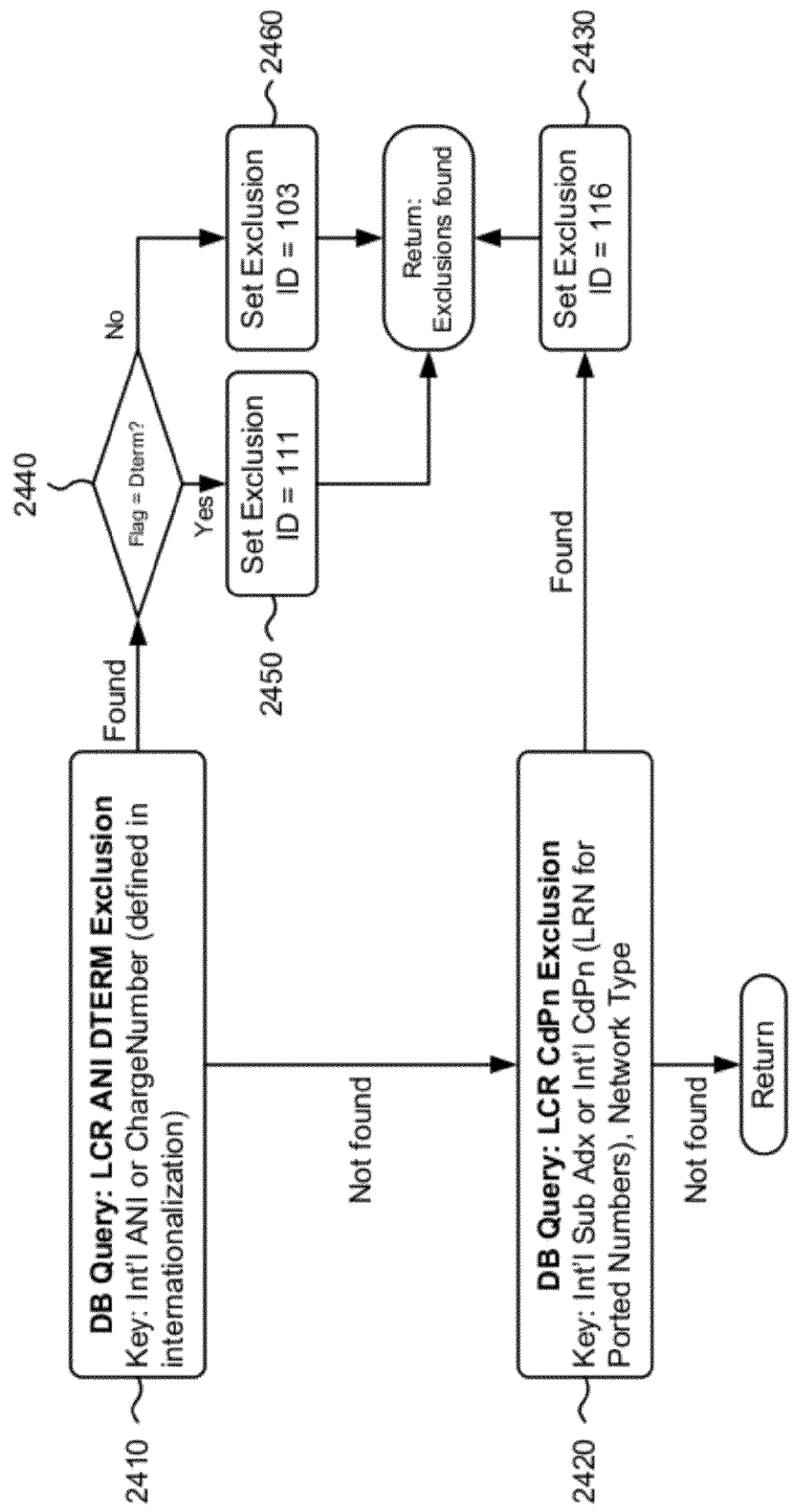

Process block 2210 may include the process blocks depicted in FIG. 24. Generally, FIG. 24 may depict ANI/CdPN exclusion tests that may be performed for the call. For example, FIG. 24 may be used to identify specific originating and/or terminating numbers to block. As shown in FIG. 24, a database query (e.g., of a LCR ANI direct termination exclusion database) may be performed to determine if an international ANI or charge number of the call is found in the database (block 2410). If the international ANI or charge number of the call is not found in the database (block 2410—NOT FOUND), another database query (e.g., of a LCR CdPn exclusion database) may be performed to determine if an international CdPN of the call is found in the database (block 2420). If the international CdPn is not found in the database (block 2420—NOT FOUND), process block 2210 may return. Otherwise (block 2420—FOUND), a particular exclusion ID (e.g., "116") may be set for the call (block 2430) and the exclusion may be returned. If the international ANI or charge number of the call is found in the database (block 2410—FOUND), it may be determined if a flag is set to a particular value (e.g., "Dterm") (block 2440). If the flag is set to the particular value (block 2440—YES), a particular exclusion ID (e.g., "111") may be set for the call (block 2450) and the exclusion may be returned. Otherwise (block 2440—NO), a particular exclusion ID (e.g., "103") may be set for the call (block 2460) and the exclusion may be returned.

Figure 25:
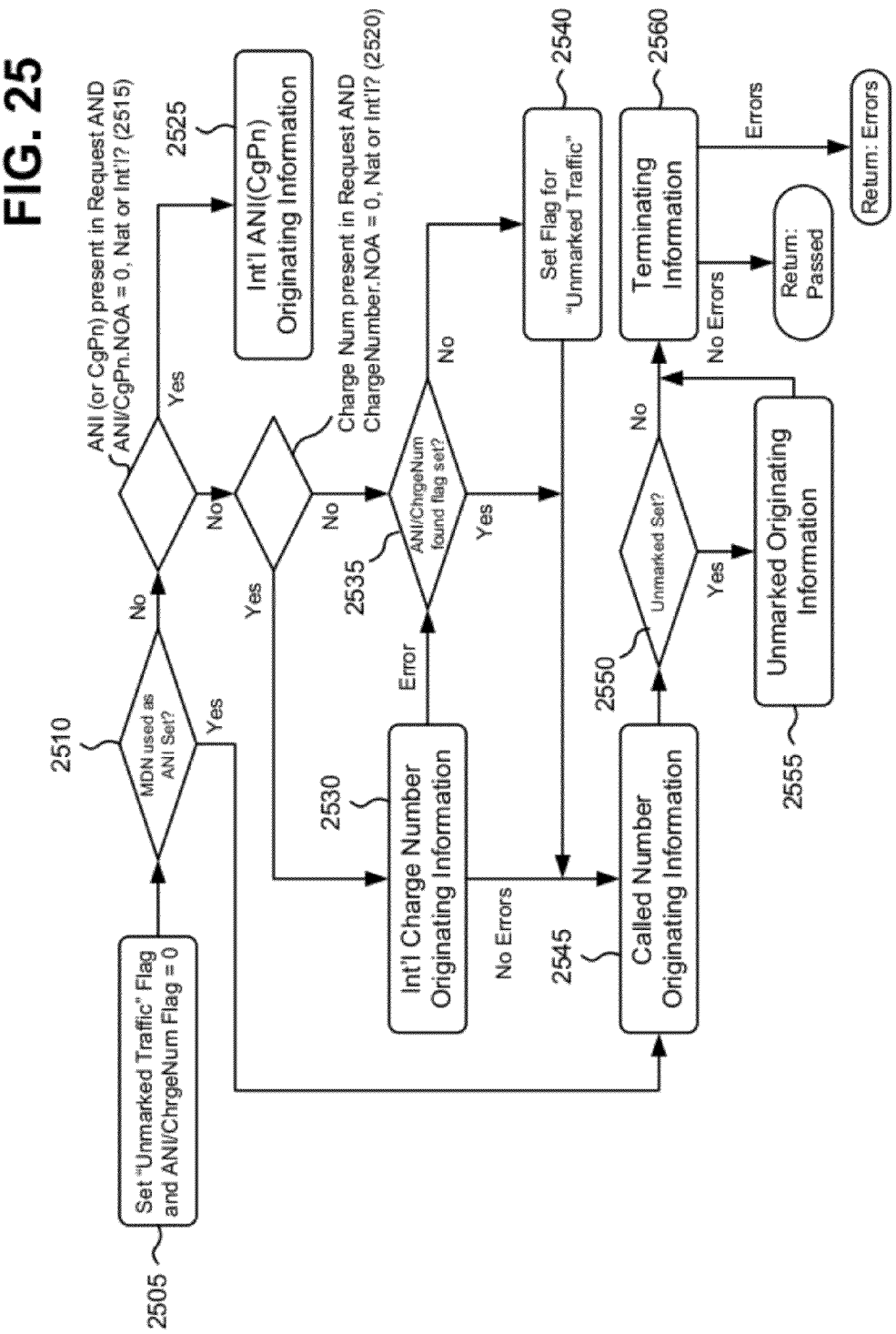

Process block 2215 may include the process blocks depicted in FIG. 25. Generally, FIG. 25 may depict operations used to set up call data so that the call may be marked for a jurisdictional routing determination. As shown in FIG. 25, an "unmarked traffic" flag and an ANI/charge number flag associated with the call may be set to zero (block 2505) and if may be determined if the call uses a main directory number (MDN) as an ANI set (block 2510). If the call does not use the MDN as an ANI set (block 2510—NO), it may be determined if an ANI/CgPn is present and if the ANI/CgPn is equal to zero, national, or international (block 2515). If the ANI/CgPn is not present or is not set to zero, national, or international (block 2515—NO), it may be determined if a charge number is present and if the charge number is equal to zero, national, or international (block 2520). Otherwise (block 2515—YES), the international ANI/CgPn originating information of the call may be used to set up call data (block 2525).

If the charge number is present and is set to zero, national, or international (block 2520—YES), the international charge number originating information of the call may be used to set up call data (block 2530). Otherwise (block 2520—NO) or if block 2530 generates errors, it may be determined if an ANI/Charge number flag is set (block 2535). If the ANI/Charge number flag is not set (block 2535—NO), a flag may be set for "unmarked traffic" (block 2540). If the ANI/Charge number flag is set (block 2535—YES), if block 2530 does not generate errors, or if the call uses the MDN as an ANI set (block 2510—YES), the called number originating information of the call may be used to set up call data (block 2545), and it may be determined if an unmarked flag is set (block 2550). If the unmarked flag is set (block 2550—YES), unmarked originating information of the call may be used to set up call data (block 2555). If the unmarked flag is not set (block 2550—NO), terminating information of the call may be used to set up call data (block 2560). Block 2560 may return errors or may not return errors.

Figure 26:
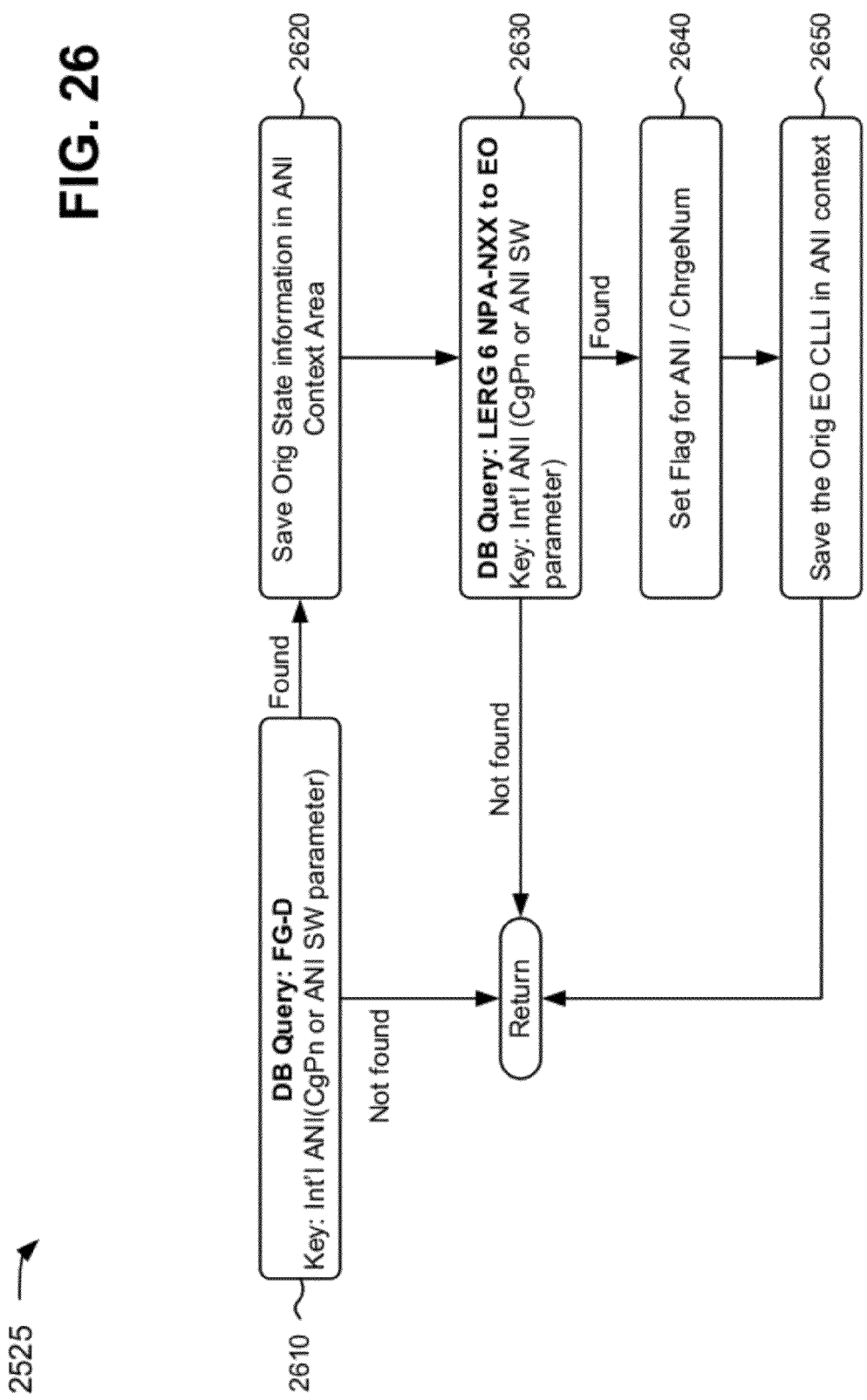

Process block 2525 may include the process blocks depicted in FIG. 26. Generally, FIG. 26 may depict using the international ANI (or CgPN) of the call to set up call data so that the call may be marked for a jurisdictional routing determination. As shown in FIG. 26, a database query (e.g., of a FG-D database) may be performed to determine if an international ANI (or CgPn) of a call is found in the database (block 2610). Process block 2525 may return if the international ANI of the call is not found in the database (block 2610—NOT FOUND). If the international ANI of the call is found (block 2610—FOUND), originating state information of the call may be saved in an ANI context area (block 2620), and another database query (e.g., of a LERG database) may be performed to determine if the international ANI of the call is found in the database (block 2630). Process block 2525 may return if the international ANI of the call is not found in the database (block 2630—NOT FOUND). If the international ANI of the call is found (block 2630—FOUND), a flag may be set for the ANI/Charge number (block 2640), originating EO CLLI of the call may be saved in an ANI context area (block 2650), and process block 2525 may return.

Figure 27:
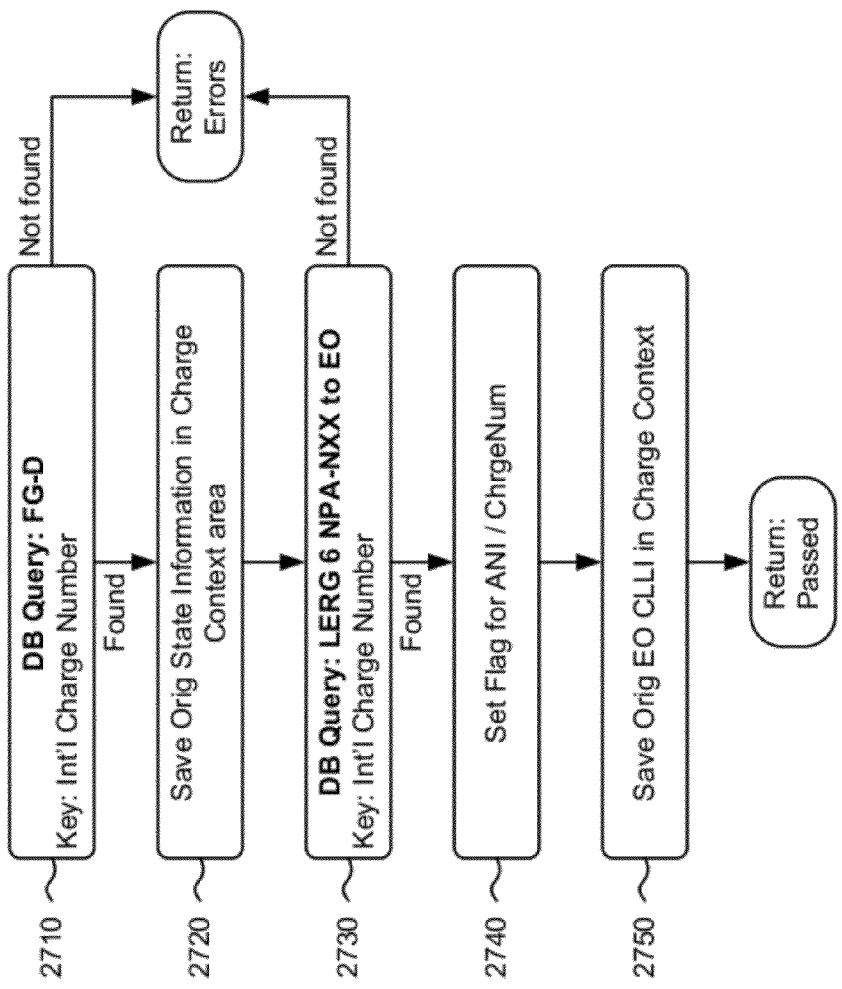

Process block 2530 may include the process blocks depicted in FIG. 27. Generally, FIG. 27 may depict using the international charge number originating information of the call to set up call data so that the call may be marked for a jurisdictional routing determination. As shown in FIG. 27, a database query (e.g., of a FG-D database) may be performed to determine if an international charge number of a call is found in the database (block 2710). Process block 2530 may return errors if the international charge number of the call is not found in the database (block 2710—NOT FOUND). If the international charge number of the call is found (block 2710—FOUND), originating state information of the call may be saved in a charge context area (block 2720), and another database query (e.g., of a LERG database) may be performed to determine if the international charge number of the call is found in the database (block 2730). Process block 2530 may return errors if the international charge number of the call is not found in the database (block 2730—NOT FOUND). If the international charge number of the call is found (block 2730—FOUND), a flag may be set for the ANI/Charge number (block 2740), originating EO CLLI of the call may be saved in the charge context area (block 2750), and process block 2530 may return.

Figure 28:
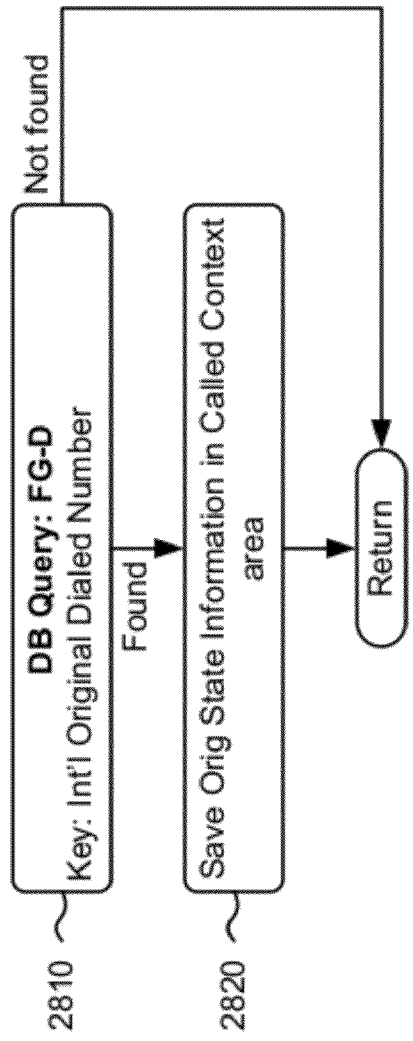

Process block 2545 may include the process blocks depicted in FIG. 28. Generally, FIG. 28 may depict using the called number originating information of the call to set up call data so that the call may be marked for a jurisdictional routing determination. As shown in FIG. 28, a database query (e.g., of a FG-D database) may be performed to determine if an international original dialed number (ODN) of a call is found in the database (block 2810). Process block 2545 may return if the international ODN of the call is not found in the database (block 2810—NOT FOUND). If the international ODN of the call is found (block 2810—FOUND), originating state information of the call may be saved in a called context area (block 2820) and process block 2545 may return.

Figure 29:
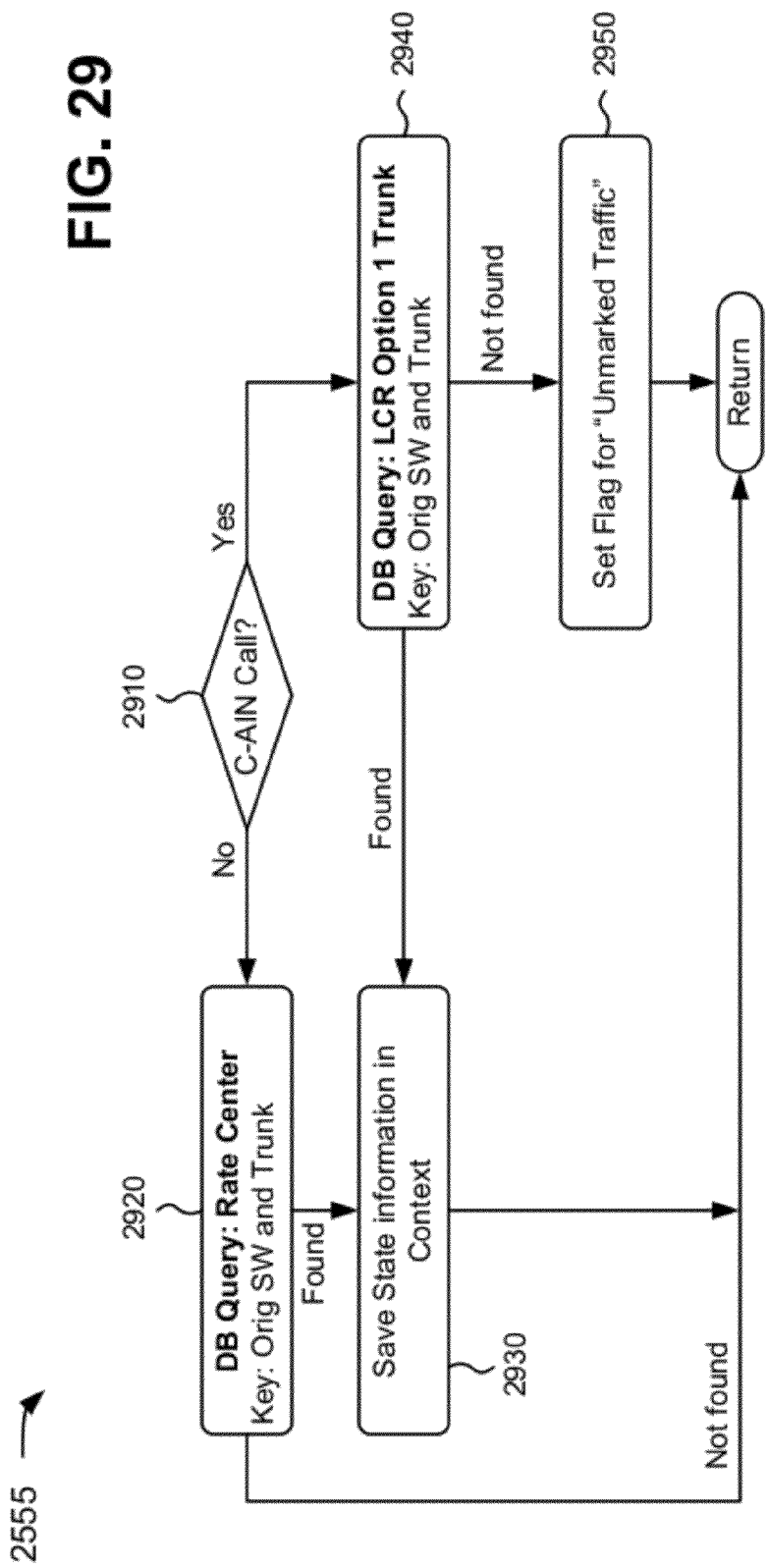

Process block 2555 may include the process blocks depicted in FIG. 29. Generally, FIG. 29 may depict using unmarked originating information of the call to set up call data so that the call may be marked for a jurisdictional routing determination. As shown in FIG. 29, if the call is not a carrier AIN (C-AIN) call (block 2910—NO), a database query (e.g., of a rate center database) may be performed to determine if an originating switch and trunk of a call is found in the database (block 2920). Process block 2555 may return if the originating switch and trunk of the call is not found in the database (block 2920—NOT FOUND). If the originating switch and trunk of the call is found (block 2920—FOUND), state information of the call may be saved in context (block 2930) and process block 2555 may return. If the call is a C-AIN call (block 2910—YES), a database query (e.g., of a LCR Option 1 trunk database) may be performed to determine if the originating switch and trunk of the call is found in the database (block 2940). If the originating switch and trunk of the call is not found in the database (block 2940—NOT FOUND), a flag may be set for "unmarked traffic" (block 2950) and process block 2555 may return. If the originating switch and trunk of the call is found (block 2940—FOUND), state information of the call may be saved in context (block 2930) and process block 2555 may return.

Figure 30:
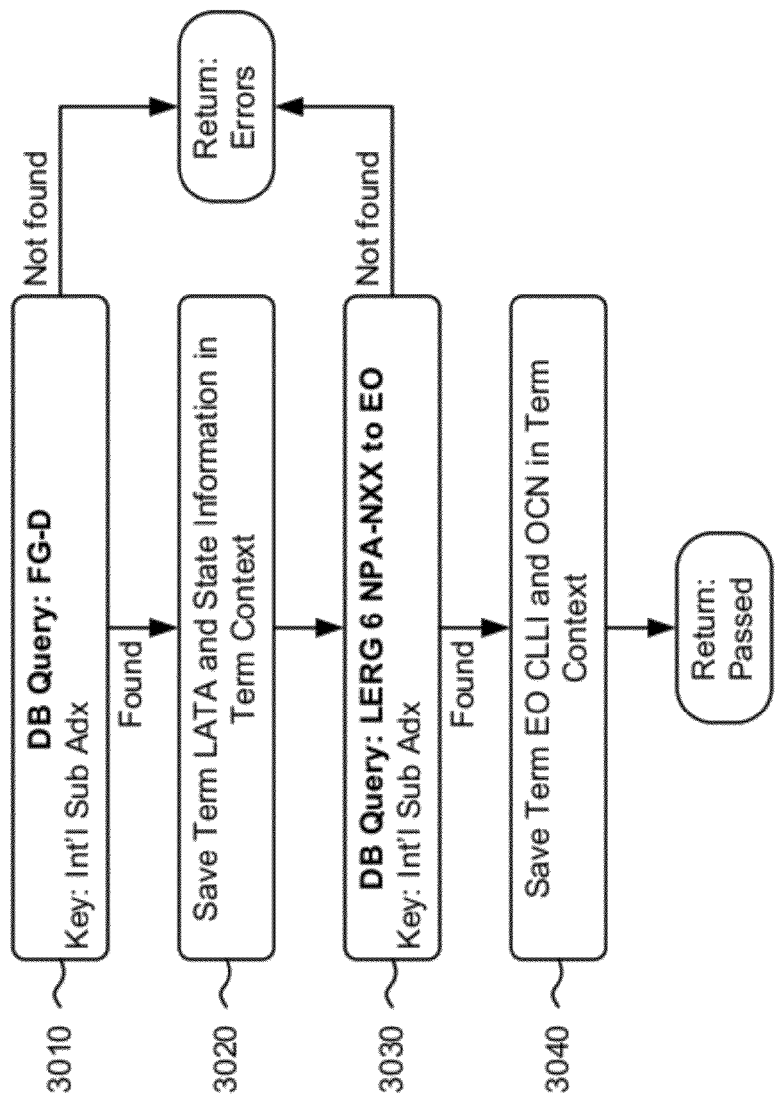

Process block 2560 may include the process blocks depicted in FIG. 30. Generally, FIG. 30 may depict using terminating information of the call to set up call data so that the call may be marked for a jurisdictional routing determination. As shown in FIG. 30, a database query (e.g., of a FG-D database) may be performed to determine if terminating information of a call is found in the database (block 3010). Process block 2560 may return errors if the terminating information of the call is not found in the database (block 3010—NOT FOUND). If the terminating information of the call is found (block 3010—FOUND), terminating LATA and state information of the call may be saved in a terminating context (block 3020), and another database query (e.g., of a LERG database) may be performed to determine if the terminating information of the call is found in the database (block 3030). Process block 2560 may return errors if the terminating information of the call is not found in the database (block 3030—NOT FOUND). If the terminating information of the call is found (block 3030—FOUND), the terminating EO CLLI and OCN of the call may be saved in the terminating context (block 3040), and process block 2560 may return.

Figure 31A:
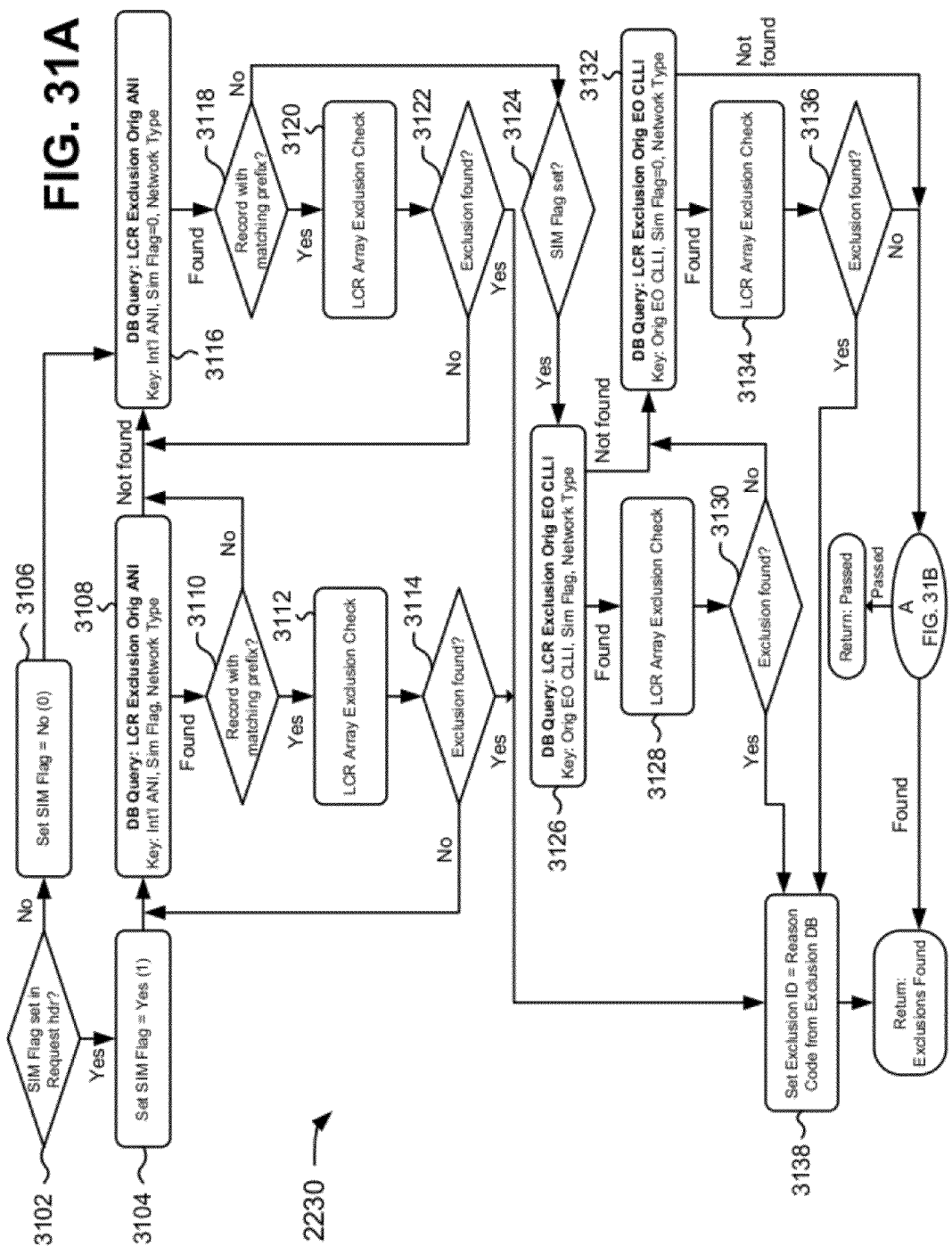

Process block 2230 may include the process blocks depicted in FIGS. 31A and 31B. Generally, FIGS. 31A and 31B may depict determining exclusions for a call based on database checks. As shown in FIG. 31A, if a simulation (SIM) flag is set in a request header (e.g., associated with a call) (block 3102—YES), the SIM flag may be set to "Yes (1)" (block 3104). Otherwise (block 3102—NO), the SIM flag may be set to "No (1)" (block 3106). A database query (e.g., of a LCR exclusion originating ANI database) may be performed to determine if an international ANI, a SIM flag, and a network type of the call are found in the database (block 3108). If the international ANI, SIM flag, and network type of the call are found in the database (block 3108—FOUND), it may be determined if another record is found with a matching prefix (block 3110). If another record is found (block 3110—YES), a LCR exclusion check may be performed (block 3112) and it may be determined if an exclusion is found (block 3114). If an exclusion is not found (block 3114—NO), process block 2230 may return to block 3108.

If the SIM flag is set to "No" (block 3106), if the international ANI, SIM flag, and network type of the call are not found in the database (block 3108—NOT FOUND), or if another record is not found (block 3110—NO), a database query (e.g., of the LCR exclusion originating ANI database) may be performed to determine if the international ANI, the SIM flag, and the network type of the call are found in the database (block 3116). If the international ANI, SIM flag, and network type of the call are found in the database (block 3116—FOUND), it may be determined if another record is found with a matching prefix (block 3118). If another record is found (block 3118—YES), a LCR exclusion check may be performed (block 3120) and it may be determined if an exclusion is found (block 3122). If an exclusion is found (blocks 3114 and 3122—YES), an exclusion ID may be set with a reason code (block 3138) and process block 2230 may return exclusions.

If another record is not found (block 3118—NO) and if a SIM flag is set (block 3124—YES), a database query (e.g., of a LCR exclusion EO CLLI database) may be performed to determine if an originating EO CLLI, the SIM flag, and the network type of the call are found in the database (block 3126). If the EO CLLI, SIM flag, and network type of the call are found in the database (block 3126—FOUND), a LCR exclusion check may be performed (block 3128) and it may be determined if an exclusion is found (block 3130). If an exclusion is found (block 3130—YES), an exclusion ID may be set with a reason code (block 3138) and process block 2230 may return exclusions. If an exclusion is not found (block 3130—NO) or if the EO CLLI, SIM flag, and network type of the call are not found in the database (block 3126—NOT FOUND), a database query (e.g., of the LCR exclusion EO CLLI database) may be performed to determine if the originating EO CLLI, SIM flag, and network type of the call are found in the database (block 3132). If the EO CLLI, SIM flag, and network type of the call are found in the database (block 3132—FOUND), a LCR exclusion check may be performed (block 3134) and it may be determined if an exclusion is found (block 3136). If an exclusion is found (block 3136—YES), an exclusion ID may be set with a reason code (block 3138) and process block 2230 may return exclusions. Otherwise (block 3136—NO), process block 2230 may continue to FIG. 31B.

As shown in FIG. 31B, if the SIM flag is set to "Yes" (block 3140—YES), a database query (e.g., of a LCR exclusion originating CIC database) may be performed to determine if a CIC, a SIM flag, and a network type of the call are found in the database (block 3142). If the CIC, SIM flag, and network type of the call are found in the database (block 3142—FOUND), a LCR exclusion check may be performed (block 3144) and it may be determined if an exclusion is found (block 3146). If an exclusion is found (block 3146—YES), an exclusion ID may be set with a reason code (block 3162) and process block 2230 may return exclusions. If the SIM flag is not set to "Yes" (block 3140—NO), if the CIC, SIM flag, and network type of the call are not found in the database (block 3142—NOT FOUND), or if an exclusion is not found (block 3146—NO), a database query (e.g., of a LCR exclusion originating CIC database) may be performed to determine if the CIC, SIM flag, and network type of the call are found in the database (block 3148). If the CIC, SIM flag, and network type of the call are found in the database (block 3148—FOUND), a LCR exclusion check may be performed (block 3150) and it may be determined if an exclusion is found (block 3152). If an exclusion is found (block 3152—YES), an exclusion ID may be set with a reason code (block 3162) and process block 2230 may return exclusions.

If an exclusion is not found (block 3152—NO) and if the SIM flag is set (block 3154—YES), a database query (e.g., of a LCR exclusion information digits database) may be performed to determine if a CPC, a SIM flag, and a network type of the call are found in the database (block 3156). If the CPC, SIM flag, and network type of the call are found in the database (block 3156—FOUND), a LCR exclusion check may be performed (block 3158) and it may be determined if an exclusion is found (block 3160). If an exclusion is found (block 3160—YES), an exclusion ID may be set with a reason code (block 3162) and process block 2230 may return exclusions. If the SIM flag is not set (block 3154—NO), if the CPC, SIM flag, and network type of the call are found in the database (block 3156—NOT FOUND), or if an exclusion is not found (block 3160—NO), a database query (e.g., of the LCR exclusion information digits database) may be performed to determine if the CPC, SIM flag, and network type of the call are found in the database (block 3164). If the CPC, SIM flag, and network type of the call are not found in the database (block 3164—FOUND), a LCR exclusion check may be performed (block 3166) and it may be determined if an exclusion is found (block 3168). If an exclusion is found (block 3168—YES), an exclusion ID may be set with a reason code (block 3162) and process block 2230 may return exclusions.

Process block 3170 may include the process blocks depicted in FIG. 32. Generally, FIG. 32 may depict determining exclusions for a call based on database checks for an originating switch of the call. As shown in FIG. 32, if a SIM flag is not set (block 3200—NO), a database query (e.g., of a LCR exclusion originating switch/trunk database) may be performed to determine if an originating switch, a trunk group, a SIM flag, and a network type of the call are found in the database (block 3205). If the originating switch, trunk group, SIM flag, and network type of the call are found in the database (block 3205—FOUND), a LCR exclusion check may be performed (block 3210) and it may be determined if an exclusion is found (block 3215). If an exclusion is not found (block 3215—NO) or if the originating switch, trunk group, SIM flag, and network type of the call are not found in the database (block 3205—NOT FOUND), a database query (e.g., of the LCR exclusion originating switch/trunk database) may be performed to determine if the originating switch, trunk group, SIM flag, and network type of the call are found in the database (block 3220). If the originating switch, trunk group, SIM flag, and network type of the call are found in the database (block 3220—FOUND), a LCR exclusion check may be performed (block 3225) and it may be determined if an exclusion is found (block 3230). If an exclusion is found (blocks 3215 and 3230—YES), an exclusion ID may be set with a reason code (block 3270) and process block 3170 may return exclusions.

If an exclusion is not found (block 3230—NO) and if the SIM flag is set to "Yes" (block 3235—YES), a database query (e.g., of a LCR exclusion originating switch/trunk database) may be performed to determine if the originating switch, trunk group, SIM flag, and network type of the call are found in the database (block 3240). If the originating switch, trunk group, SIM flag, and network type of the call are found in the database (block 3240—FOUND), a LCR exclusion check may be performed (block 3245) and it may be determined if an exclusion is found (block 3250). If an exclusion is found (block 3250—YES), an exclusion ID may be set with a reason code (block 3270) and process block 3170 may return exclusions. If the SIM flag is not set to "Yes" (block 3235—NO), if the originating switch, trunk group, SIM flag, and network type of the call are not found in the database (block 3240—NOT FOUND), or if an exclusion is not found (block 3250—NO), a database query (e.g., of the LCR exclusion originating switch/trunk database) may be performed to determine if the originating switch, trunk group, SIM flag, and network type of the call are found in the database (block 3255). If the originating switch, trunk group, SIM flag, and network type of the call are found in the database (block 325—FOUND), a LCR exclusion check may be performed (block 3260) and it may be determined if an exclusion is found (block 3265). If an exclusion is found (block 3265—YES), an exclusion ID may be set with a reason code (block 3270) and process block 3170 may return exclusions.

Process block 3112 may include the process blocks depicted in FIG. 33. Generally, FIG. 33 may depict determining exclusions for a call based on an array check for exclusions. As shown in FIG. 33, a count may be set to a number of array elements minus one (block 3310), and a structure (e.g., an array element) may be populated with an originating EO CLLI, an originating EO CIC, and originating switch/trunk, information digits (e.g., original line information (OLI) or calling party category (CPC)), and/or an ANI associated with a call (block 3320). An array element may be obtained (block 3330), and it may be determined if an array element is valid or invalid based on an activation date/time associated with an input (e.g., a network administrator input) (block 3340). If the array element is valid (block 3340—VALID), fields of the array element may be compared to determine a match (block 3350). If the array element is invalid (block 3340—INVALID) or if there is no match of the array element fields (block 3350—NO MATCH), it may be determined if the count is less than one (block 3360). If the count is less than one (block 3360—YES), process block 3112 may return a passed indication. Otherwise (block 3360—NO), the count may be reduced by one (block 3370) and another array element may be obtained (block 3330). If there is a match of the array element fields (block 3350—MATCH), fixed fields of the array element may be compared to determine a match (block 3380). If there is no match of the array element fixed fields (block 3380—NO MATCH), it may be determined if the count is less than one (block 3360). Otherwise (block 3380—MATCH), process block 3112 may return.

Figure 34:
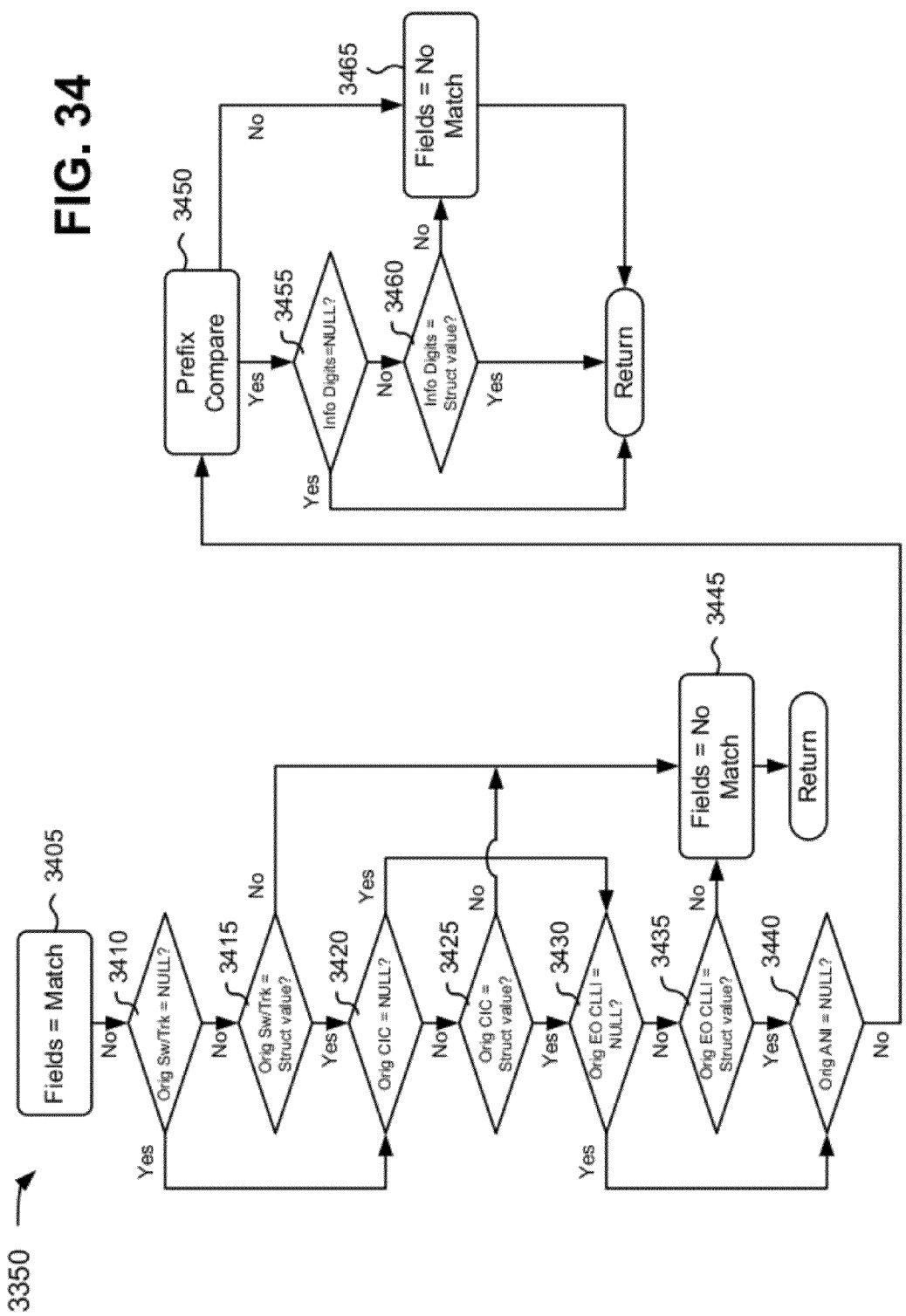

Process block 3350 may include the process blocks depicted in FIG. 34. Generally, FIG. 34 may depict determining additional array fields that may be utilized to determine exclusions for a call. As shown in FIG. 34, an array element fields may be set to "Match" (block 3405). If an originating switch and trunk of the call is not set to NULL (block 3410—NO) and the originating switch and trunk is not set to a value (block 3415—NO), the array element fields may be set to "No Match" (block 3445) and process block 3350 may return. If an originating CIC of the call is not set to NULL (block 3420—NO) and the originating CIC is not set to a value (block 3425—NO), the array element fields may be set to "No Match" (block 3445) and process block 3350 may return. If an EO CLLI of the call is not set to NULL (block 3430—NO) and the originating EO CLLI is not set to a value (block

3435—NO), the array element fields may be set to "No Match" (block 3445) and process block 3350 may return. If an ANI of the call is not set to NULL (block 3440—NO) and a prefix comparison returns a "No" (block 3450—NO), the array element fields may be set to "No Match" (block 3445) and process block 3350 may return. If information digits of the call are not set to NULL (block 3455—NO) and the information digits are not set to a value (block 3460—NO), the array element fields may be set to "No Match" (block 3465) and process block 3350 may return.

Figure 35:
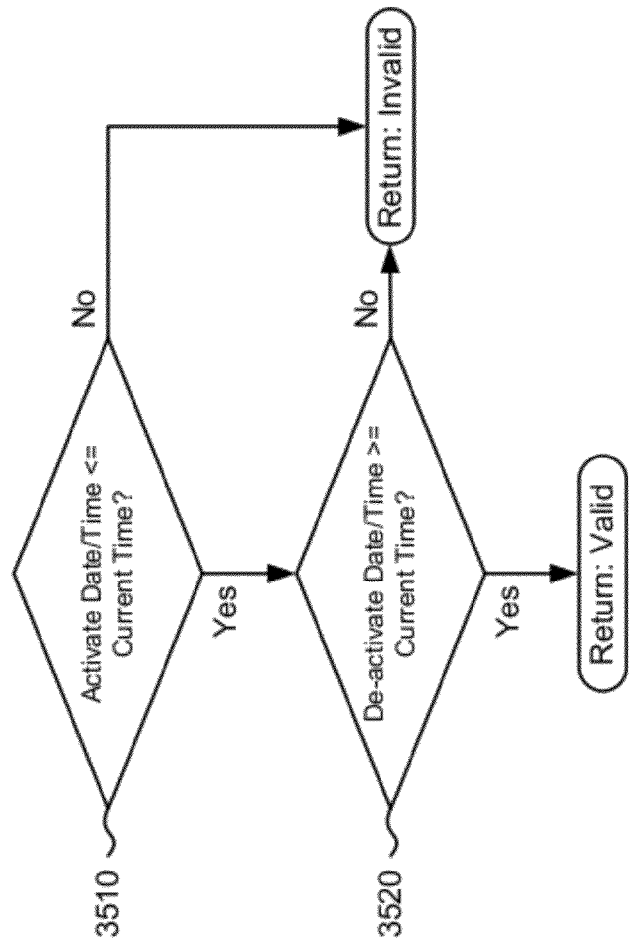

Process block 3340 may include the process blocks depicted in FIG. 35. Generally, FIG. 35 may depict determining if an array element is valid or invalid based on an activation date/time associated with an input (e.g., a network administrator input). As shown in FIG. 35, it may be determined if an activation date/time associated with an input (e.g., an exclusion input by a network administrator) is less than or equal to the current time (block 3510). If the activation date/time is not less than or equal to the current time (block 3510—NO), process block 3340 may return an invalid indication. Otherwise (block 3510—YES), it may be determined if a deactivation date/time associated with the input is greater than or equal to the current time (block 3520). If the deactivation date/time is not greater than or equal to the current time (block 3520—NO), process block 3340 may return an invalid indication. Otherwise (block 3520—YES), process block 3340 may return a valid indication.

Figure 36:
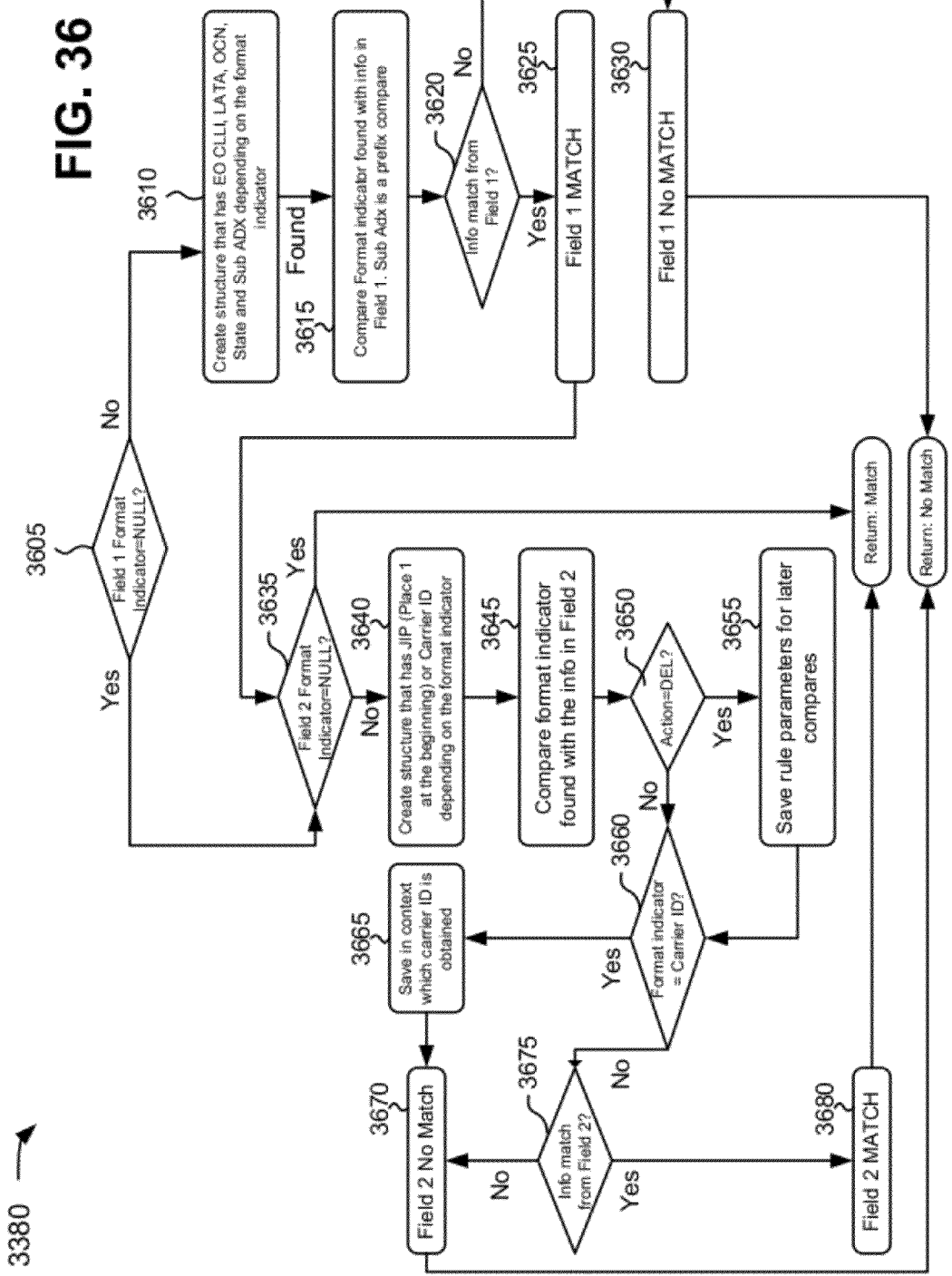

Process block 3380 may include the process blocks depicted in FIG. 36. Generally, FIG. 36 may depict determining additional array fields that may be utilized to determine exclusions for a call. As shown in FIG. 36, if a field 1 (e.g., a field in a database) format indicator is not set to NULL (block 3605—NO), a structure (e.g., an array element) may be created with an EO CLLI, a LATA, a OCN, a state, and a sub ADX associated with a call (block 3610), and a format indicator may be compared with information in field 1 (block 3615). If the information in field 1 matches the format indicator (block 3620—YES), a field 1 match may be determined (block 3625) and it may be determined if a field 2 format indicator is set to NULL (block 3635). Otherwise (block 3620—NO), a field 1 no match may be determined (block 3630) and process block 3380 may return a no match. If the field 2 (e.g., another field in a database) format indicator is set to NULL (block 3635—YES), process block 3380 may return a match. Otherwise (block 3635—NO), a structure may be created with a JIP or a carrier ID (block 3640), and format indicator may be compared with information in field 2 (block 3645).

If an action is a delete (block 3650—YES), rule parameters may be saved for later comparisons (block 3655) and it may be determined if the format indicator is equal to the carrier ID (block 3660). If the format indicator equals the carrier ID (block 3660—YES), which carrier ID is obtained may be saved in context (block 3665), a field 2 no match may be determined (block 3670), and process block 3380 may return a no match. Otherwise (block 3660—NO), it may be determined if information from field 2 matched (block 3675). If the information from field 2 matched (block 3675—YES), a field 2 match may be determined (block 3680) and process block 3380 may return a match. Otherwise (block 3675—NO), a field 2 no match may be determined (block 3670), and process block 3380 may return a no match.

Figure 37:
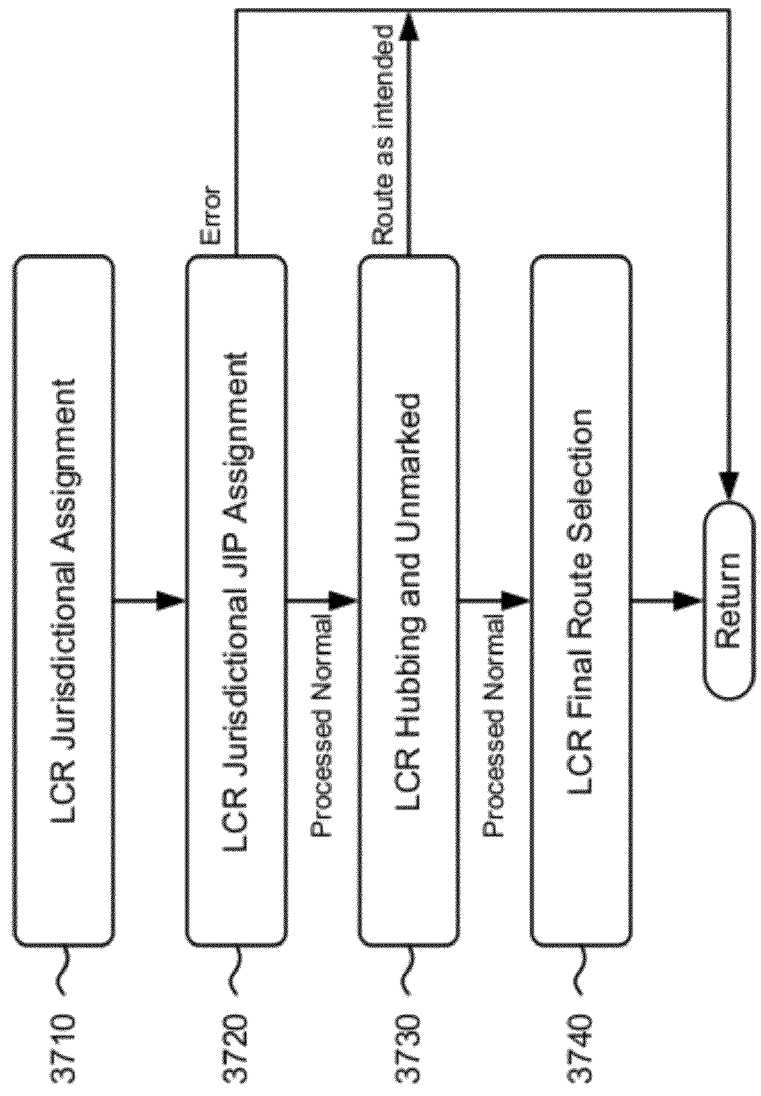

Process block 2155 may include the process blocks depicted in FIG. 37. Generally, FIG. 37 may depict determining hubbing and routing for a selected LCR of a call. As shown in FIG. 37, a LCR jurisdictional assignment may be determined for the call (block 3710), and a LCR jurisdictional JIP assignment may be determined for the call (block 3720). If an error occurs during the LCR jurisdictional JIP assignment (block 3720), process block 2155 may return. If an error does not occur during the LCR jurisdictional assignment (block 3720), the call may be processed as normal, and LCR hubbing and unmarked operations may be performed for the call (block 3730). If issues arise during the LCR hubbing and unmarked operations (block 3730), the call may be routed as intended. If issues do not arise during the LCR hubbing and unmarked operations (block 3730), the call may be processed as normal, and a LCR final route selection may be determined for the call (block 3740).

Figure 38:
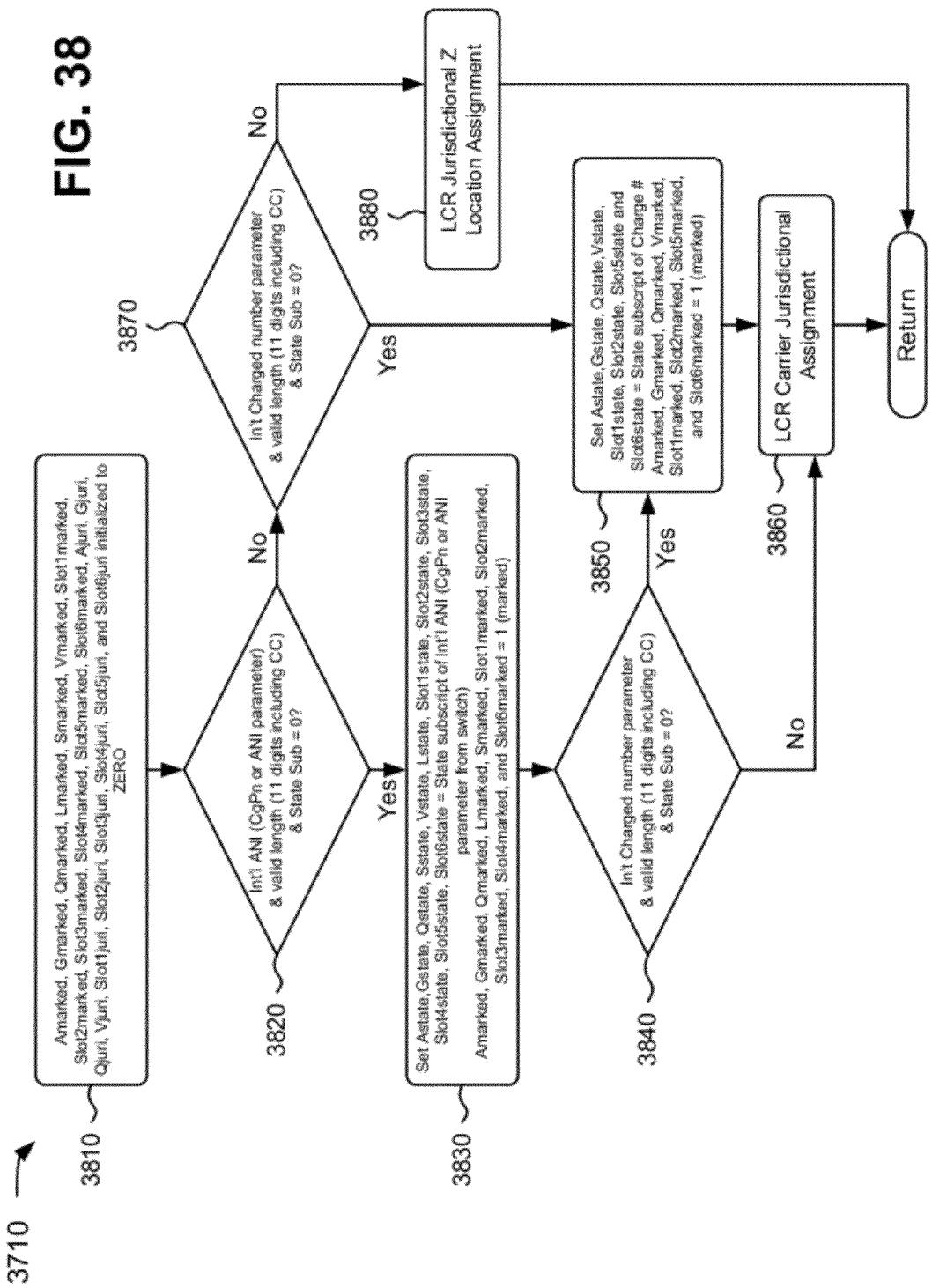

Process block 3710 may include the process blocks depicted in FIG. 38. Generally, FIG. 38 may depict determining a jurisdictional assignment for a selected LCR of a call. As shown in FIG. 38, marked call indicators ("marked") and jurisdictional index indicators ("juri") for different carriers may be initialized to zero (block 3810). The letters provided in block 3810 may represent different carriers. For example, the letter "A" may represent AT&T, the letter "G" may represent Global Crossing, the letter "Q" may represent Qwest, the letter "L" may represent Level 3, the letter "S" may represent Sprint, the letter "V" may represent Verizon, and the letters "Slot1," "Slot2," "Slot3," "Slot4," "Slot5," and "Sloth" may represent undefined (e.g., future) carriers.

As further shown in FIG. 38, if the call has an international ANI, a valid length, and a valid state (block 3820—YES), the call may be set to marked for certain carriers and a state indicator for certain carriers may be set to the state subscript of the international ANI (block 3830). If the call has an international charged number, a valid length, and a valid state (block 3840—YES), the call may be set to marked for certain carriers and a state indicator for certain carriers may be set to the state subscript of the charged number (block 3850), and a carrier jurisdictional assignment may be provided for the call (block 3860). If the call does not have an international charged number, a valid length, and a valid state (block 3840—NO), a carrier jurisdictional assignment may be provided for the call (block 3860).

If the call does not have an international ANI, a valid length, and a valid state (block 3820—NO) and if the call does not have an international charged number, a valid length, and a valid state (block 3870—NO), a jurisdictional Z location assignment may be provided for the call (block 3880). If the call has an international charged number, a valid length, and a valid state (block 3870—YES), the call may be set to marked for certain carriers and a state indicator for certain carriers may be set to the state subscript of the charged number (block 3850), and a carrier jurisdictional assignment may be provided for the call (block 3860).

Figure 39:
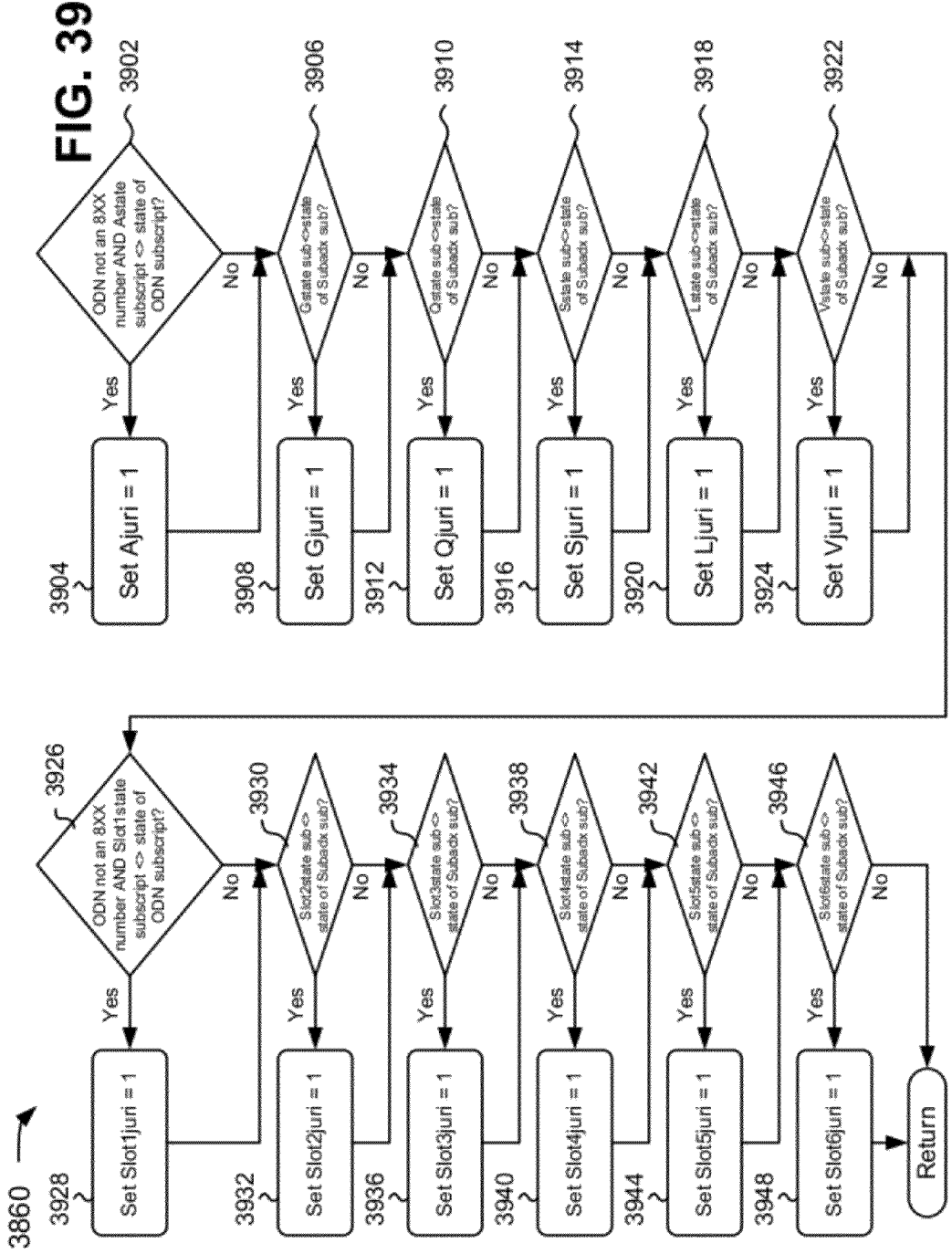

Process block 3860 may include the process blocks depicted in FIG. 39. Generally, FIG. 39 may depict determining a carrier jurisdictional assignment for a selected LCR of a call. As shown in FIG. 39, if the call is not an "8XX" number and the state indicator for AT&T does not equal the state ODN subscript of the call (block 3902—YES), the jurisdictional index indicator for AT&T may be set to one (e.g., interstate call) (block 3904). If the state indicator for Global Crossing does not equal the state of subadx subscript of the call (block 3906—YES), the jurisdictional index indicator for Global Crossing may be set to one (block 3908). If the state indicator for Qwest does not equal the state of subadx subscript of the call (block 3910—YES), the jurisdictional index indicator for Qwest may be set to one (block 3912). If the state indicator for Sprint does not equal the state of subadx subscript of the call (block 3914—YES), the jurisdictional index indicator for Sprint may be set to one (block 3916). If the state indicator for Level 3 does not equal the state of subadx subscript of the call (block 3918—YES), the jurisdictional index indicator for Level 3 may be set to one (block 3920). If the state indicator for Verizon does not equal the state of subadx subscript of the call (block 3922—YES), the jurisdictional index indicator for Verizon may be set to one (block 3924).

As further shown in FIG. 39, if the call is not an "8XX" number and the state indicator for Slot1 does not equal the state ODN subscript of the call (block 3926—YES), the jurisdictional index indicator for Slot1 may be set to one (block 3928). If the state indicator for Slot2 does not equal the state of subadx subscript of the call (block 3930—YES), the jurisdictional index indicator for Slot2 may be set to one (block 3932). If the state indicator for Slot3 does not equal the state of subadx subscript of the call (block 3934—YES), the jurisdictional index indicator for Slot3 may be set to one (block 3936). If the state indicator for Slot4 does not equal the state of subadx subscript of the call (block 3938—YES), the jurisdictional index indicator for Slot4 may be set to one (block 3940). If the state indicator for Slot5 does not equal the state of subadx subscript of the call (block 3942—YES), the jurisdictional index indicator for Slot5 may be set to one (block 3944). If the state indicator for Slot6 does not equal the state of subadx subscript of the call (block 3946—YES), the jurisdictional index indicator for Slot6 may be set to one (block 3948).

Figure 40:
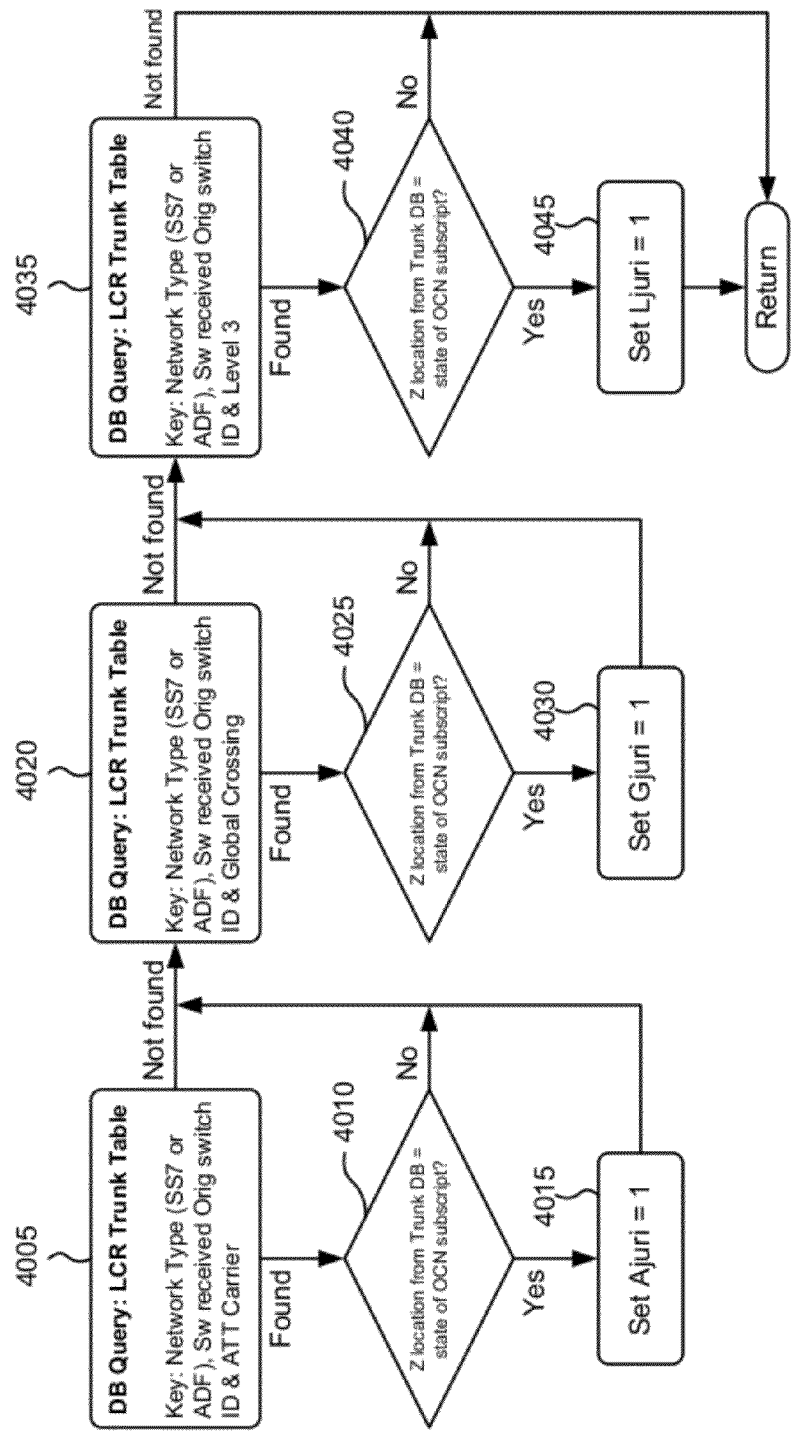

Process block 3880 may include the process blocks depicted in FIG. 40. Generally, FIG. 40 may depict determining a jurisdictional Z location assignment for a selected LCR of a call. As shown in FIG. 40, a database query (e.g., of a LCR trunk table) may be performed to determine if a network type, an originating switch ID, and a carrier (e.g., AT&T) of the call are found in the database (block 4005). If the network type, originating switch ID, and carrier of the call are found in the database (block 4005—FOUND), it may be determined if a Z location from a trunk database equals a state of an OCN subscript of the call (block 4010). If a Z location from the trunk database equals the state of the OCN subscript of the call (block 4010—YES), a jurisdictional index indicator for AT&T may be set to one (block 4015). If a Z location from the trunk database does not equal the state of the OCN subscript of the call (block 4010—NO) or if the network type, originating switch ID, and carrier of the call are not found in the database (block 4005—NOT FOUND), a database query (e.g., of the LCR trunk table) may be performed to determine if the network type, the originating switch ID, and another carrier (e.g., Global Crossing) of the call are found in the database (block 4020).

If the network type, originating switch ID, and carrier of the call are found in the database (block 4020—FOUND), it may be determined if a Z location from the trunk database equals the state of the OCN subscript of the call (block 4025). If a Z location from the trunk database equals the state of the OCN subscript of the call (block 4025—YES), a jurisdictional index indicator for Global Crossing may be set to one (block 4030). If a Z location from the trunk database does not equal the state of the OCN subscript of the call (block 4025—NO) or if the network type, originating switch ID, and carrier of the call are not found in the database (block 4020—NOT FOUND), a database query (e.g., of the LCR trunk table) may be performed to determine if the network type, the originating switch ID, and another carrier (e.g., Level 3) of the call are found in the database (block 4035).

If the network type, originating switch ID, and carrier of the call are found in the database (block 4035—FOUND), it may be determined if a Z location from the trunk database equals the state of the OCN subscript of the call (block 4040). If a Z location from the trunk database equals the state of the OCN subscript of the call (block 4040—YES), a jurisdictional index indicator for Level 3 may be set to one (block 4045). If a Z location from the trunk database does not equal the state of the OCN subscript of the call (block 4040—NO) or if the network type, originating switch ID, and carrier of the call are not found in the database (block 4035—NOT FOUND), process block 3880 may return.

Figure 41:
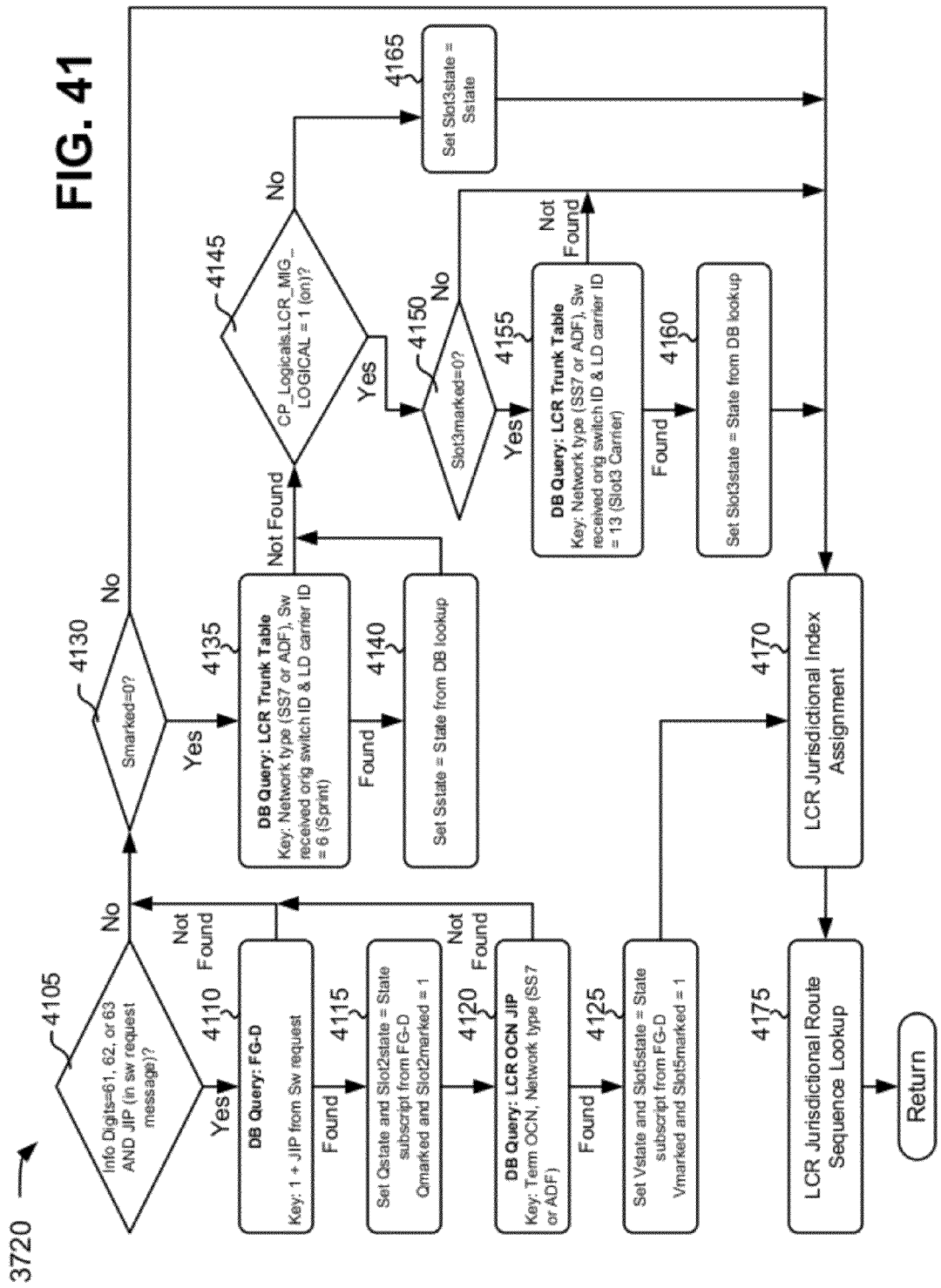

Process block 3720 may include the process blocks depicted in FIG. 41. Generally, FIG. 41 may depict determining a jurisdictional JIP assignment for a selected LCR of a call. As shown in FIG. 41, if the information digits of a call equal certain numbers and JIP is provided in a switch request message (block 4105—YES), a database query (e.g., of a FG-D database) may be performed to determine if JIP from the switch request is found in the database (block 4010). If the JIP is found in the database (block 4010—FOUND), state indicators for certain carriers may be set to a state subscript from the FG-D and marked indicators for certain carriers may be set to one (block 4115). A database query (e.g., of a LCR OCN JIP database) may be performed to determine if a terminating OCN and network type of the call are found in the database (block 4125). If the terminating OCN and network type of the call are found in the database (block 4125—FOUND), state indicators for certain carriers may be set to a state subscript from the FG-D and marked indicators for certain carriers may be set to one (block 4125), a LCR jurisdictional index assignment may be performed for the call (block 4170), and a LCR jurisdictional route sequence lookup may be performed for the call (block 4175).

If the information digits of the call do not equal certain numbers or JIP is not provided in the switch request message (block 4105—NO), if the JIP is not found in the database (block 4010—NOT FOUND), or if the terminating OCN and network type of the call are not found in the database (block 4125—NOT FOUND), it may be determined if a marked indicator for Sprint is equal to zero (block 4130). If the marked indicator for Sprint equals zero (block 4130—YES), a database query (e.g., of a LCR trunk table) may be performed to determine if a network type and an originating switch ID of the call and Sprint's LD ID are found in the database (block 4135). If the network type and originating switch ID of the call and Sprint's LD ID are found in the database (block 4135—FOUND), a state indicator for Sprint may be set to a state from the trunk table (block 4140). If the network type and originating switch ID of the call or Sprint's LD ID are not found in the database (block 4135—NOT FOUND), it may be determined if a CP value equals one (block 4145).

If the CP value equals one (block 4145—YES) and if a marked indicator for Slot3 equals zero (block 4150—YES), a database query (e.g., of a LCR trunk table) may be performed to determine if the network type and originating switch ID of the call and Slot3's LD ID are found in the database (block 4155). If the network type and originating switch ID of the call and Slot3's LD ID are found in the database (block 4155—FOUND), a state indicator for Slot3 may be set to a state from the trunk table (block 4160). If the CP value does not equal one (block 4145—NO), a state indicator for Slot3 may be set to Sprint's state indicator (block 4165).). If the marked indicator for Sprint does not equal zero (block 4130—NO), if a marked indicator for Slot3 does not equal zero (block 4150—NO), or if the network type and originating switch ID of the call and Slot3's LD ID are not found in the database (block 4155—NOT FOUND), a LCR jurisdictional index assignment (block 4170) and a LCR jurisdictional route sequence lookup (block 4175) may be performed for the call.

Figure 42:
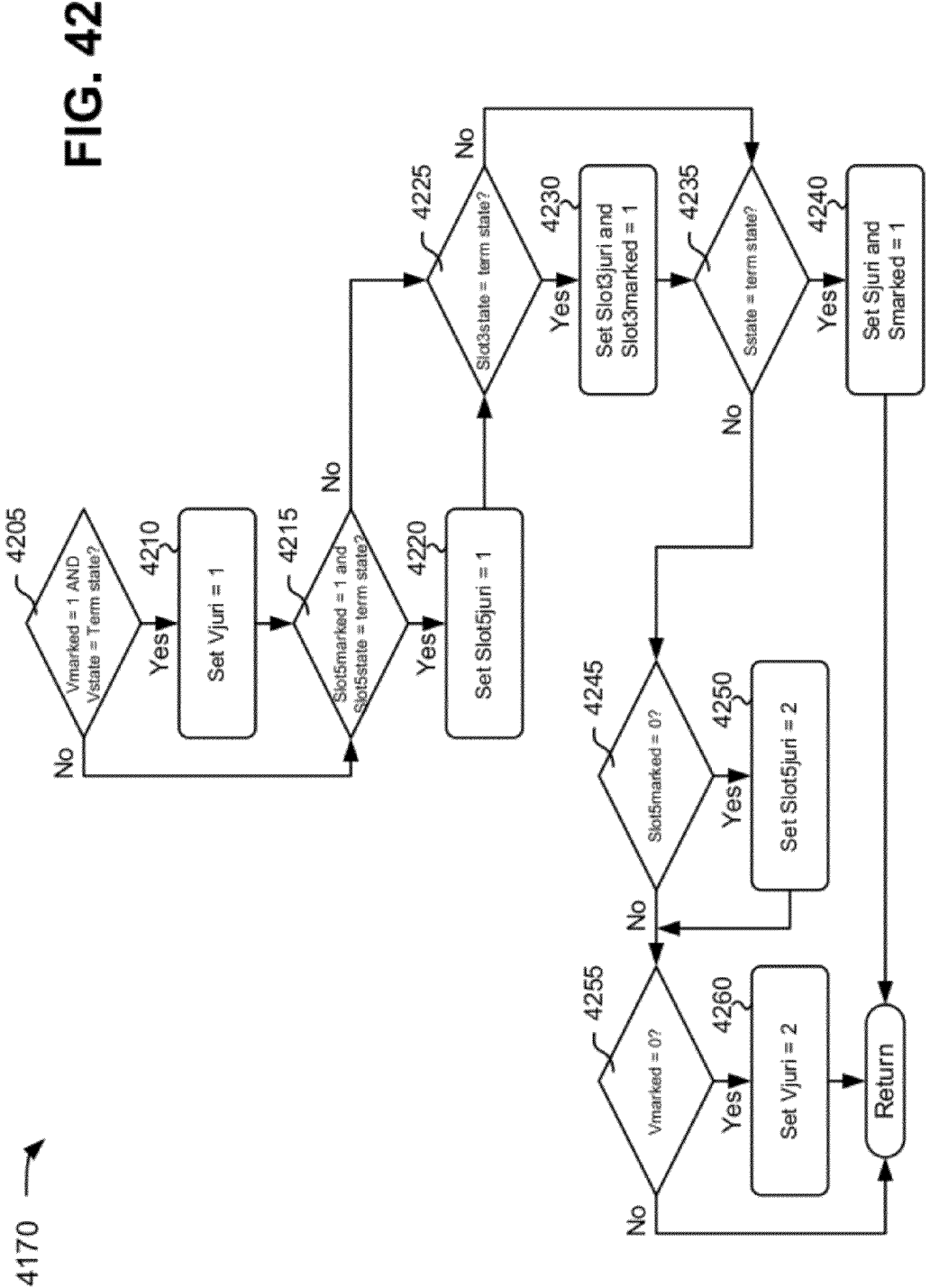

Process block 4170 may include the process blocks depicted in FIG. 42. Generally, FIG. 42 may depict determining a jurisdictional index assignment for a selected LCR of a call. As shown in FIG. 42, if a marked indicator for Verizon equals one and a state indicator for Verizon equals a terminating state for the call (block 4205—YES), a jurisdictional index indicator for Verizon may be set to one (block 4210). If the marked indicator for Verizon does not equal one or the state indicator for Verizon does not equal the terminating state for the call (block 4205—NO), and if a marked indicator for Slot5 equals one and a state indicator for Slot5 equals the terminating state for the call (block 4215—YES), a jurisdictional index indicator for Slot5 may be set to one (block 4220). If the marked indicator for Slot5 does not equal one or the state indicator for Slot5 does not equal the terminating state for the call (block 4215—NO), and if a state indicator for Slot3 equals the terminating state for the call (block 4225—YES), a jurisdictional index indicator and a marked indicator for Slot3 may be set to one (block 4230). A jurisdictional index of zero may represent an intrastate call, a jurisdictional index of one may represent an interstate call, and a jurisdictional index of two may represent an unmarked call.

If the state indicator for Slot3 does not equal the terminating state for the call (block 4225—NO), and if a state indicator for Sprint equals the terminating state for the call (block 4235—YES), a jurisdictional index indicator and a marked indicator for Sprint may be set to one (block 4240) and process block 4170 may return. If the state indicator for Sprint does not equal the terminating state for the call (block 4235—NO), and if a marked indicator for Slot5 equals zero (block 4245—YES), a jurisdictional index indicator for Slot5 may be set to two (block 4250). If the marked indicator for Slot5 does not equal zero (block 4245—NO), and if a marked indicator for Verizon equals zero (block 4255—YES), a jurisdictional index indicator for Verizon may be set to two (block 4260) and process block 4170 may return.

Figure 43:
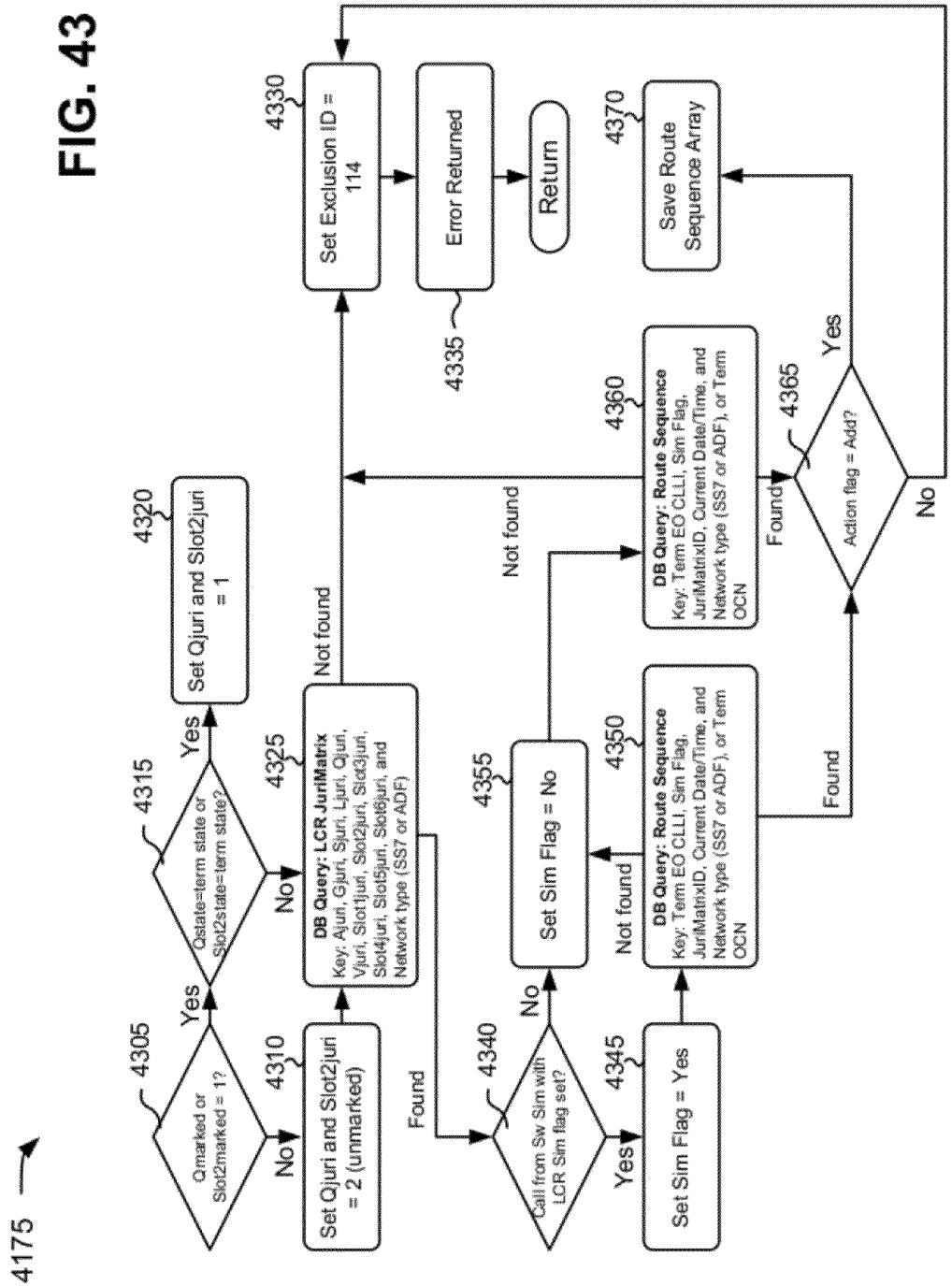

Process block 4175 may include the process blocks depicted in FIG. 43. Generally, FIG. 43 may depict performing a LCR jurisdictional route sequence lookup for a selected LCR of a call. As shown in FIG. 43, if marked indicators for Qwest or Slot2 equal one (block 4305—YES), jurisdictional index indicators for Qwest and Slot2 may be set to two (block 4310). If the marked indicators for Qwest or Slot2 do not equal one (block 4305—NO) and if state indicators for Qwest and Slot2 equal the terminating state of the call (block 4315—YES), jurisdictional index indicators for Qwest and Slot2 may be set to one (block 4320). If state indicators for Qwest and Slot2 do not equal the terminating state of the call (block 4315—NO), a database query (e.g., of a LCR Jurimatrix database) may be performed to determine if jurisdictional indices associated with carriers are found in the database (block 4325).

If the jurisdictional indices associated with carriers are not found in the database (block 4325—NOT FOUND), an exclusion ID may be set to a value (block 4330) and an error may be returned (block 4335). If the jurisdictional indices associated with carriers are found in the database (block 4325—FOUND), and if the call is from switch with a set SIM flag (block 4340—YES), a SIM flag may be set to "Yes" (block 4345). Otherwise (block 4340—NO), the SIM flag may be set to "No" (block 4355). A database query (e.g., of a route sequence database) may be performed to determine if a terminating EO CLLI, a SIM flag, a jurisdictional matrix ID, a current date/time, a network type, and a terminating OCN of the call are found in the database (block 4350). If the call information is found in the database (block 4350—FOUND) and if an action flag is set to "Add" (block 4365—YES), a route sequence array may be saved (block 4370).

If the call information is not found in the database (block 4350—NOT FOUND), the SIM flag may be set to "No" (block 4355) and a database query (e.g., of a route sequence database) may be performed to determine if the terminating EO CLLI, SIM flag, jurisdictional matrix ID, current date/time, network type, and terminating OCN of the call are found in the database (block 4360). If the call information is found in the database (block 4360—FOUND) and if the action flag is set to "Add" (block 4365—YES), a route sequence array may be saved (block 4370). If the call information is not found in the database (block 4360—NOT FOUND) or if the action flag is not set to "Add" (block 4365—NO), an exclusion ID may be set to a value (block 4330) and an error may be returned (block 4335).

Figure 44:
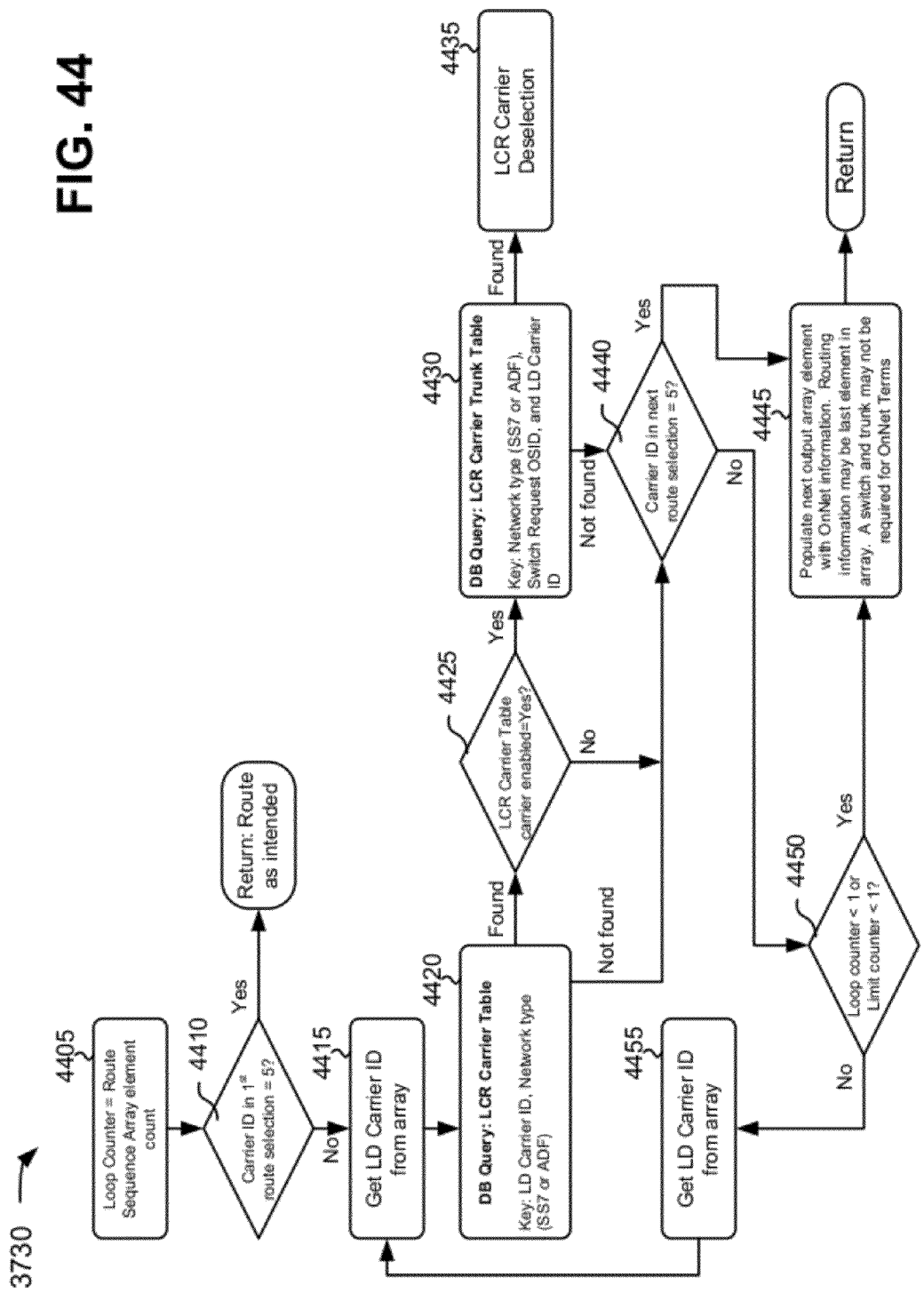

Process block 3730 may include the process blocks depicted in FIG. 44. Generally, FIG. 44 may depict performing LCR hubbing and unmarked operations for a selected LCR of a call. As shown in FIG. 44, a loop counter may be set to a route sequence array element count (block 4405), and, if a carrier ID in a first route selected equals a number (e.g., five) (block 4410—YES), the call may be routed as intended. Otherwise (block 4410—NO), a LD carrier ID may be obtained from the array (block 4415), and a database query (e.g., of a LCR carrier table) may be performed to determine if a LD carrier ID and a network type of the call are found in the database (block 4420). If the LD carrier ID and network type of the call are found in the database (block 4420—FOUND) and if LCR carrier table is enabled (block 4425—YES), a database query (e.g., of a LCR carrier trunk table) may be performed to determine if the LD carrier ID, the network type, and a switch request OSID of the call are found in the database (block 4430). If the LD carrier ID, network type, and switch request OSID of the call are found in the database (block 4430—YES), a LCR deselection process may be performed (block 4435).

Otherwise (blocks 4420 and 4430—NOT FOUND or block 4425—NO), it may be determined if a carrier ID in a next route selected equals a number (block 4440). If the carrier ID in a next route selected equals the number (block 4440—YES), a next output array element may be populated with OnNet information (block 4445) and process block 3730 may return. Otherwise (block 4440—NO), it may be determined if the loop counter is less than one or if a limit counter is less than one (block 4450). If the loop counter is less than one or if the limit counter is less than one (block 4450—YES), a next output array element may be populated with OnNet information (block 4445) and process block 3730 may return. Otherwise (block 4450—NO), a LD carrier ID may be obtained from the array (block 4455) and process block 3730 may return to block 4415.

Figure 45:
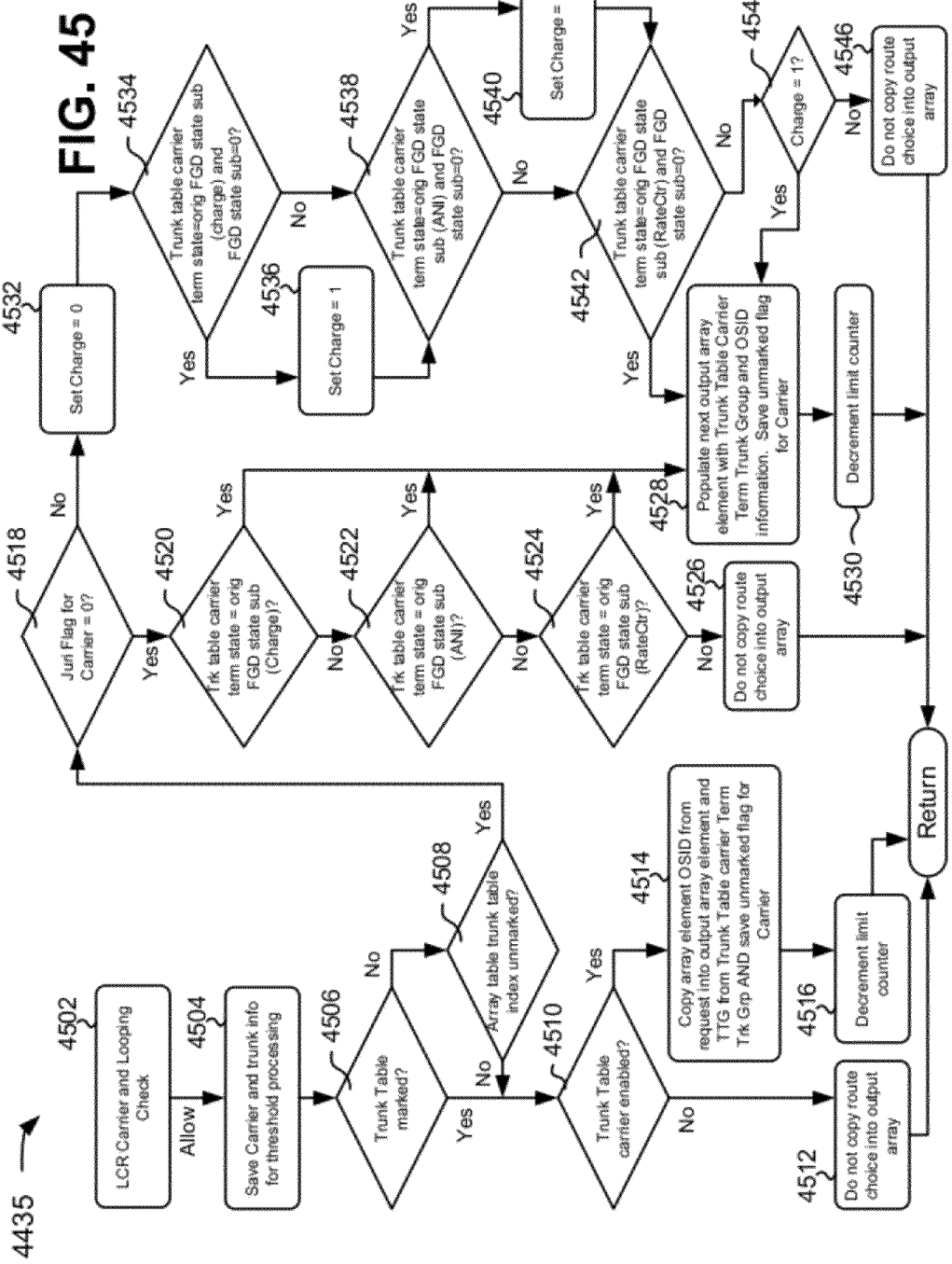

Process block 4435 may include the process blocks depicted in FIG. 45. Generally, FIG. 45 may depict performing LCR carrier deselection for a selected LCR of a call. As shown in FIG. 45, if a LCR carrier and looping check allows a route (block 4502—ALLOW), carrier and trunk information may be saved (block 4504) and it may be determined if a trunk table is marked (block 4506). If the trunk table is not marked (block 4506—NO) and if an array table trunk table index is not unmarked (block 4508—NO), it may be determined if a trunk table carrier is enabled (block 4510). If the trunk table carrier is not enabled (block 4510—NO), the route choice may not be copied into an output array (block 4512) and process block 4435 may return. If the trunk table carrier is enabled (block 4510—YES), an output array element may include an array element OSID from a request, a TTG from a trunk table carrier terminating trunk group, and an unmarked flag for the carrier (block 4514), a limit counter may be decremented (block 4515), and process block 4435 may return.

If an array table trunk table index is unmarked (block 4508—YES) and if a jurisdictional flag for a carrier equals zero (block 4518—YES), it may be determined if a trunk table carrier terminating state equals an originating FGD state charge (block 4520). If the trunk table carrier terminating state does not equal the originating FGD state charge (block 4520—NO), if the trunk table carrier terminating state does not equal and the originating FGD state ANI (block 4522—NO), and if the trunk table carrier terminating state does not equal and the originating FGD state rate center (block 4524—NO), the route choice may not be copied into an output array (block 4526) and process block 4435 may return. Otherwise (blocks 4520-2424—YES), a next output array element may be populated with a trunk table carrier terminating trunk group and OSID information (block 4528), the limit counter may be decremented (block 4530), and process block 4435 may return.

If the jurisdictional flag for a carrier does not equal zero (block 4518—NO), a charge may be set to zero (block 4532) and it may be determined if a trunk table carrier terminating state equals an originating FGD state charge (block 4534). If the trunk table carrier terminating state equals the originating FGD state charge (block 4534—YES), the charge may be set to one (block 4536). If the trunk table carrier terminating state does not equal the originating FGD state charge (block 4534—NO) and if the trunk table carrier terminating state equals the originating FGD state ANI (block 4538—YES), the charge may be set to one (block 4540). If the trunk table carrier terminating state does not equal the originating FGD state ANI (block 4538—NO) and if the trunk table carrier terminating state does not equal the originating FGD state rate center (block 4542—NO), it may be determined if the charge equals one (block 4544). If the charge does not equal one (block 4544—NO), the route choice may not be copied into an output array (block 4546) and process block 4435 may return. If the trunk table carrier terminating state equals the originating FGD state rate center (block 4542—YES) or if the charge equals one (block 4544—YES), a next output array element may be populated with a trunk table carrier terminating trunk group and OSID information (block 4528), the limit counter may be decremented (block 4530), and process block 4435 may return.

Figure 46:
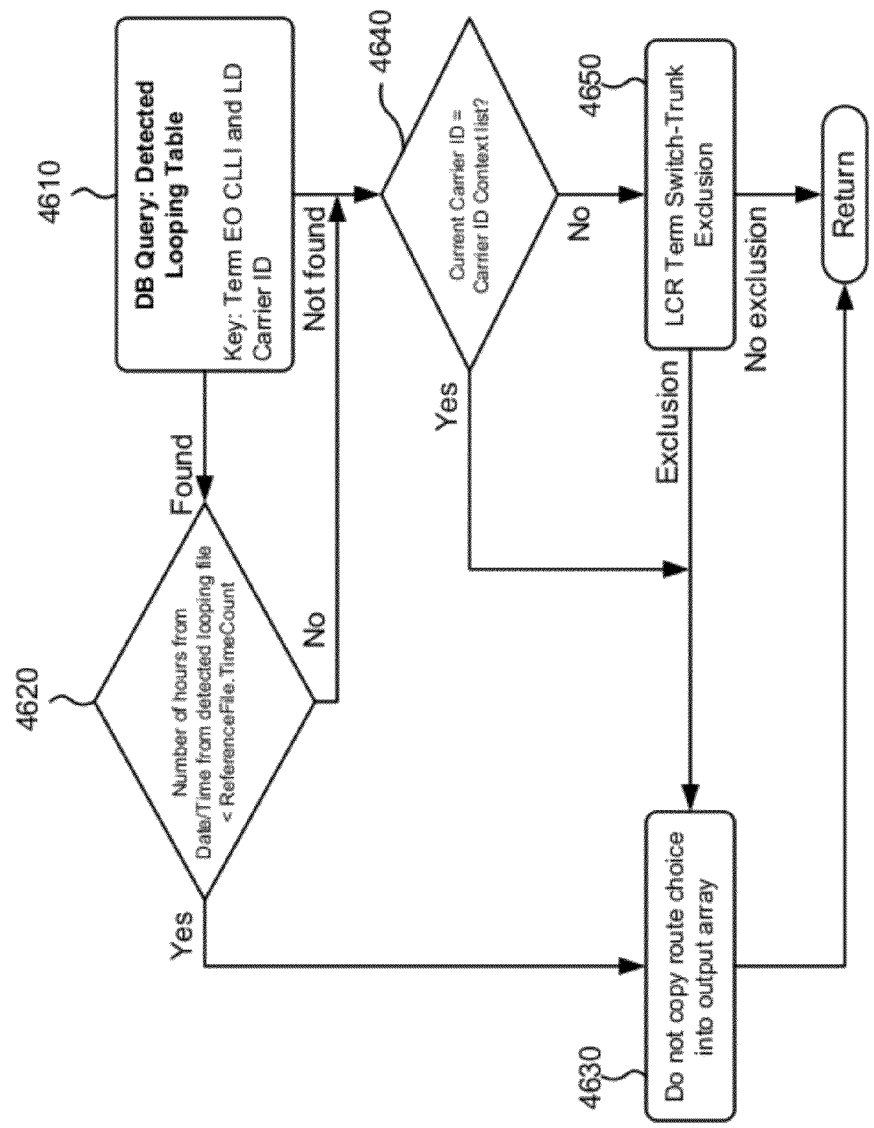

Process block 4502 may include the process blocks depicted in FIG. 46. Generally, FIG. 46 may depict performing a LCR carrier and looping check for a selected LCR of a call. As shown in FIG. 46, a database query (e.g., of a detected looping table) may be performed to determine if a terminating EO CLLI and a LD carrier ID of the call are found in the database (block 4610). If the terminating EO CLLI and LD carrier ID of the call are found in the database (block 4610—FOUND) and if a number of hours from a date/time from a detected looping file is less than a time count (block 4620—YES), the route choice may not be copied into an output array (block 4630) and process block 4502 may return. If the terminating EO CLLI and LD carrier ID of the call are not found in the database (block 4610—NOT FOUND) of if a number of hours from a date/time from a detected looping file is not less than a time count (block 4620—NO), it may be determined if a current carrier ID equals a carrier ID context list (block 4640). If the current carrier ID does not equal the carrier ID context list (block 4640—NO), a LCR terminating switch-trunk exclusion process may be performed (block 4650). If the current carrier ID equals the carrier ID context list (block 4640—YES) or if the LCR terminating switch-trunk exclusion process generates an exclusion (block 4650—EXCLUSION), the route choice may not be copied into an output array (block 4630) and process block 4502 may return. Otherwise (block 4650—NO EXCLUSION), process block 4502 may return.

Figure 47:
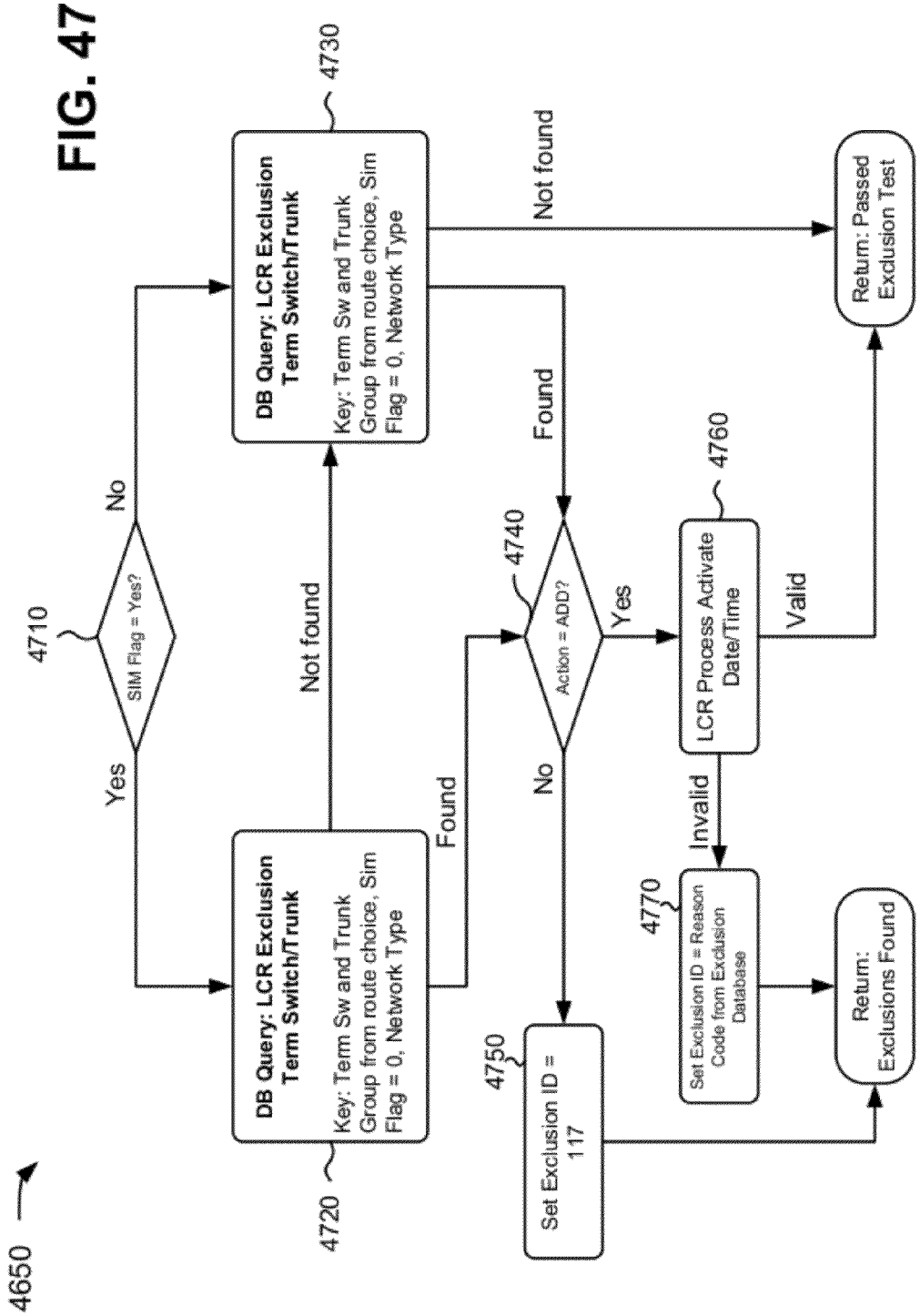

Process block 4650 may include the process blocks depicted in FIG. 47. Generally, FIG. 47 may depict determining terminating switch and trunk exclusions for a selected LCR of a call. As shown in FIG. 47, if a SIM flag is set (block 4710—YES), a database query (e.g., of a LCR exclusion terminating switch/trunk database) may be performed to determine if a terminating switch and trunk group of a route choice are found in the database (block 4720). If the terminating switch and trunk group of the route choice are not found in the database (block 4720—NOT FOUND), a database query (e.g., of the LCR exclusion terminating switch/trunk database) may be performed to determine if the terminating switch and trunk group of the route choice (e.g., with the SIM flag set to zero) are found in the database (block 4730). If the terminating switch and trunk group of the route choice are found in the database (blocks 4720 or 4730—FOUND) and if an action does not equal "Add" (block 4740—NO), an exclusion ID may be set (block 4750) and process block 4650 may return exclusions.

If the action equals "Add" (block 4740—YES), a LCR process activate date/time process may be performed (block 4760). If the LCR process activate date/time process returns an valid indication (block 4760—VALID), process block 4650 may return a passed exclusion test indication. Otherwise (block 4760—INVALID), an exclusion ID may be set (block 47700 and process block 4650 may return exclusions.

Figure 48:
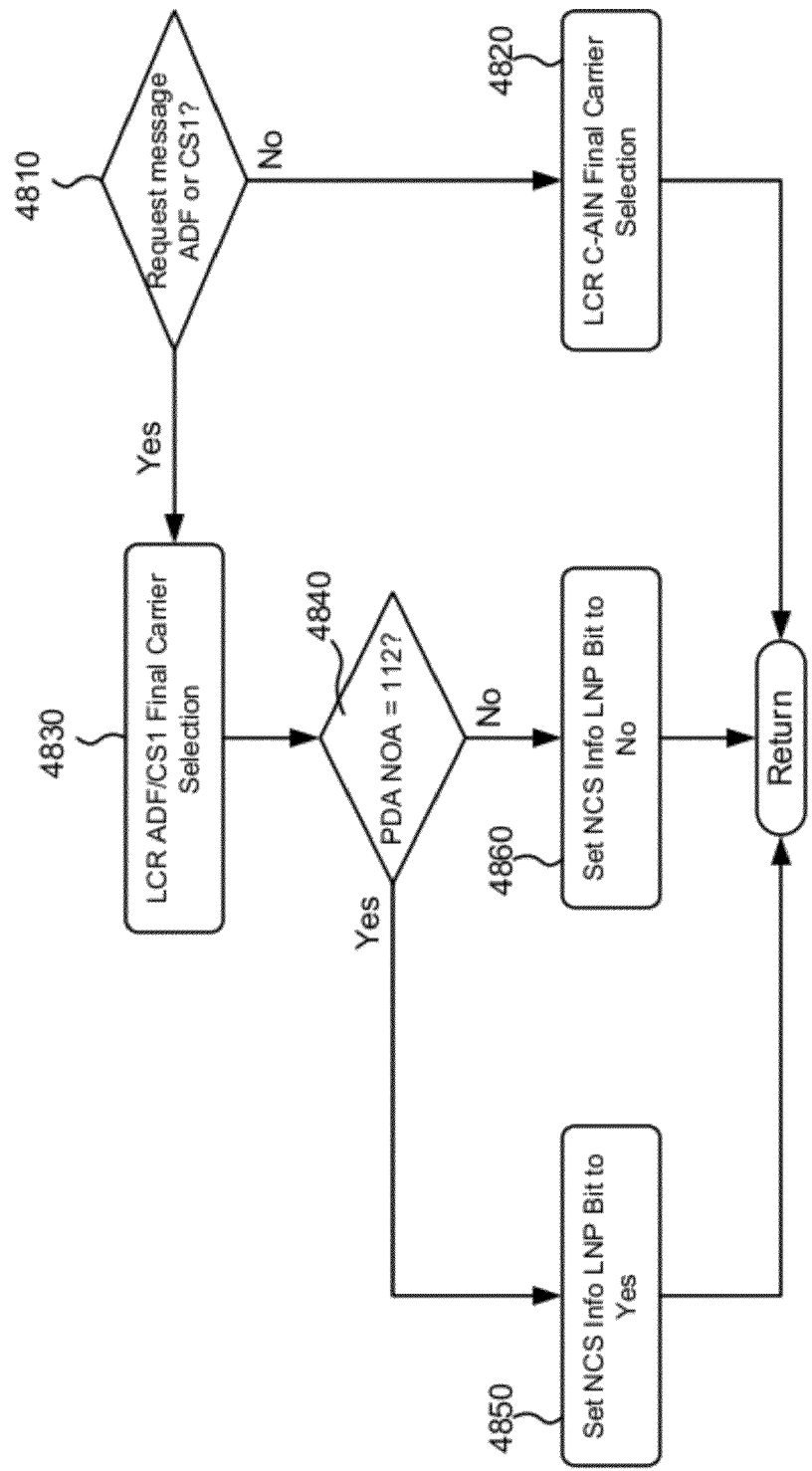

Process block 3740 may include the process blocks depicted in FIG. 48. Generally, FIG. 48 may depict determining a LCR final route selection for a selected LCR of a call. As shown in FIG. 48, if a request message of the call is not an ADF message (block 4810—NO), a LCR C-AIN final carrier selection process may be performed for the call (block 4820). Otherwise (block 4810—YES), a LCR ADF final carrier selection process may be performed for the call (block 4830) and it may be determined if a port destination address of the call is set to a value (block 4840). If the port destination address of the call is set to the value (block 4840—YES), a network control system (NCS) information local number portability (LNP) bit may be set to "Yes" (block 4850) and process block 3740 may return. Otherwise (block 4840—NO), the NCS information LNP bit may be set to "No" (block 4860) and process block 3740 may return.

Systems and/or methods described herein may provide jurisdictionally optimized least cost call routing. For example, in one implementation, the systems and/or methods may receive network information, LCR forecast information (e.g., jurisdictional indices or matrices), network administrator inputs, and looping exceptions. The systems and/or methods may receive a call, from an originating location, to a terminating location, and may determine a LCR for the call based on one or more of the network information, the LCR forecast information, the network administrator inputs, and the looping exceptions. The systems and/or methods may generate routing instructions for the determined LCR, and may provide the routing instructions to network elements associated with the LCR. The systems and/or methods may route the call to the terminating location via the LCR and based on the routing instructions.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 18-48, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, network information, least cost route (LCR) forecast information, network administrator inputs, and looping exceptions;
   receiving, by the computing device, a call, from an originating location, to a terminating location;
   determining, by the computing device, a LCR for the call based on the network information, the LCR forecast information, the network administrator inputs, and the looping exceptions,
      determining the LCR including:
         generating a first set of possible LCRs for the call,
         determining exclusions from the first set of possible LCRs to create a second set of possible LCRs for the call,
         determining hubbing and routing for the second set of possible LCRs, and
         selecting, from the second set of possible LCRs, the LCR based on the determined hubbing and routing;
   generating, by the computing device, routing instructions for the LCR; and
   providing, by the computing device, the routing instructions to one or more network elements associated with the LCR.

2. The method of claim 1, where the call is routed to the terminating location via the LCR and based on the routing instructions.

3. The method of claim 1, where the call is received from a Signaling System 7 (SS7) network based user device or a C7 network based user device.

4. The method of claim 1, where the call is received from a application data format (ADF) network based user device.

5. The method of claim 1, further comprising:
   storing, in the memory, information associated with the LCR.

6. The method of claim 5, where the information associated with the LCR comprises one or more of:
   information associated with the call,
   information associated with the network elements associated the LCR, or
   information associated with the routing instructions.

7. A device comprising:
   a processor to:
      receive network information, least cost route (LCR) forecast information, network administrator inputs, and looping exceptions,
      receive a call, from an originating location, to a terminating location,
      determine a LCR for the call based on the network information, the LCR forecast information, the network administrator inputs, and the looping exceptions,
         when determining the LCR, the processor is to:
            generate a first set of possible LCRs for the call,
            determine exclusions from the first set of possible LCRs to create a second set of possible LCRs for the call,
            determine hubbing and routing for the second set of possible LCRs, and
            select the LCR, based on the determined hubbing and routing, from the second set of possible LCRs,
      the processor being further to:
         generate routing instructions for the LCR, and
         provide the routing instructions to one or more network elements associated with the LCR,
         the call being routed to the terminating location via the one or more network elements associated with the LCR and based on the routing instructions.

8. The device of claim 7, where the device comprises one of a Toll Free transaction server, a Local Number Portability (LNP) transaction server, or a virtual network (VNET) transaction server.

9. The device of claim 7, where the call is received from a Signaling System 7 (SS7) network based user device or a C7 network based user device.

10. The device of claim 7, where the call is received from an application data format (ADF) network based user device.

11. The device of claim 7, where the processor is further to:
    store, in a memory of the device, information associated with the LCR.

12. The device of claim 11, where the information associated with the LCR comprises one or more of:
    information associated with the call,
    information associated with the network elements associated with the LCR, or
    information associated with the routing instructions.

13. One or more non-transitory computer-readable media storing instructions, the instructions comprising:
    one or more instructions that, when executed by at least one processor, cause the at least one processor to:

receive network information, least cost route (LCR) forecast information, network administrator inputs, and looping exceptions;

receive a call, from an originating location, to a terminating location;

determine a LCR for the call based on the network information, the LCR forecast information, the network administrator inputs, and the looping exceptions;

generate routing instructions for the LCR;

provide the routing instructions to one or more network elements associated with the LCR; and route the call to the terminating location via the determined LCR and based on the routing instructions, the one or more instructions to determine the LCR including one or more instructions that, when executed by at least one processor, cause the at least one processor to:

generate a first set of possible LCRs for the call, determine exclusions from the first set of possible LCRs to create a second set of possible LCRs for the call, determine hubbing and routing for the second set of possible LCRs and select, from the second set of possible LCRs, the LCR based on the hubbing and routing.

* * * * *